United States Patent [19]

Ueda et al.

[11] Patent Number: 5,037,223
[45] Date of Patent: Aug. 6, 1991

[54] SERIAL PRINTING APPARATUS WITH CONTROLLABLE PITCH

[75] Inventors: Hiroyuki Ueda, Kanagawa; Yasuaki Yamada; Toshiaki Ozawa, both of Chiba; Hiroharu Nakajima, Tokyo; Hiroatsu Kondo, Kanagawa, all of Japan

[73] Assignee: Canon Kabushiki Kaisha, Tokyo, Japan

[21] Appl. No.: 442,418

[22] Filed: Nov. 22, 1989

Related U.S. Application Data

[60] Continuation of Ser. No. 351,294, May 10, 1989, abandoned, which is a continuation of Ser. No. 22,524, Mar. 9, 1987, abandoned, which is a continuation of Ser. No. 807,777, Dec. 11, 1985, abandoned, which is a continuation of Ser. No. 532,441, Aug. 15, 1983, abandoned, which is a division of Ser. No. 314,441, Oct. 23, 1981, abandoned.

[30] Foreign Application Priority Data

| Oct. 31, 1980 | [JP] | Japan | 55-152103 |
| Oct. 31, 1980 | [JP] | Japan | 55-152104 |
| Oct. 31, 1980 | [JP] | Japan | 55-152105 |
| Oct. 31, 1980 | [JP] | Japan | 55-152106 |
| Nov. 17, 1980 | [JP] | Japan | 55-160692 |
| Nov. 17, 1980 | [JP] | Japan | 55-160693 |
| Nov. 17, 1980 | [JP] | Japan | 55-160694 |
| Nov. 25, 1980 | [JP] | Japan | 55-164527 |
| Nov. 25, 1980 | [JP] | Japan | 55-164530 |
| Nov. 28, 1980 | [JP] | Japan | 55-166635 |

[51] Int. Cl.⁵ .................................................... B41O 29/42
[52] U.S. Cl. ............................... 400/705.1; 400/279; 400/307.2; 400/320; 400/347
[58] Field of Search ............. 400/63, 70, 76, 279, 400/303, 307.2, 320, 328, 347, 611, 705, 705.1, 708, 711

[56] References Cited

U.S. PATENT DOCUMENTS

| 3,346,087 | 10/1967 | Colombo et al. | 400/705.1 X |
| 3,403,386 | 9/1968 | Perkins et al. | 400/63 X |
| 3,557,929 | 1/1971 | Schaaf | 400/611 |
| 3,618,032 | 11/1971 | Goldsberry et al. | 400/63 X |
| 3,888,340 | 6/1975 | Hoffman | 400/611 |
| 4,147,440 | 4/1979 | Mishark et al. | 400/611 |
| 4,169,685 | 10/1979 | Gruber | 400/279 X |
| 4,240,758 | 12/1980 | Acosta | 400/63 X |
| 4,272,204 | 6/1981 | Quinn, Jr. et al. | 400/708 X |
| 4,365,903 | 12/1982 | Zeller et al. | 400/711 X |

FOREIGN PATENT DOCUMENTS 0148679 9/1982 Japan ........................... 400/705.1

OTHER PUBLICATIONS

IBM Technical Disclosure Bulletin, "Selectable Margin Scale", Brown, vol. 20, No. 10, Mar. 1978, pp. 4006-4007.
IBM Technical Disclosure Bulletin, "Illuminated Margin Scales", Taylor, vol. 21, No. 11, Apr. 1979, p. 4588.
IBM Technical Disclosure Bulletin, "Digital Margin Scale", Lisk et al., vol. 22, No. 1, Jun. 1979, pp. 196-197.
IBM Technical Disclosure Bulletin, "Electronic Print Position Indicator and Margin Scale Indicator for Interactive Ink Jet Printers", Hill et al., vol. 22, No. 7, Dec. 1979, pp. 2814-2815.
IBM Technical Disclosure Bulletin, "Enhanced Margin Cursor", vol. 24, No. 8, Jan. 1982, pp. 4354-4355.

Primary Examiner—David A. Wiecking
Assistant Examiner—John S. Hilten
Attorney, Agent, or Firm—Fitzpatrick, Cella, Harper & Scinto

[57] ABSTRACT

An electronic apparatus for drawing up documents. The apparatus includes an indicator for indicating registration of information, a keyboard for entering indicia and print pitch information, a memory including a first area for storing keyboard information, a second area for storing entered print pitch information, and a third area for storing registration information according to an indication by the indicator. The apparatus further includes a controller for, in response to the registration indication, storing the indicia information stored in the first area and the pitch information stored in the second area in the third area.

59 Claims, 46 Drawing Sheets

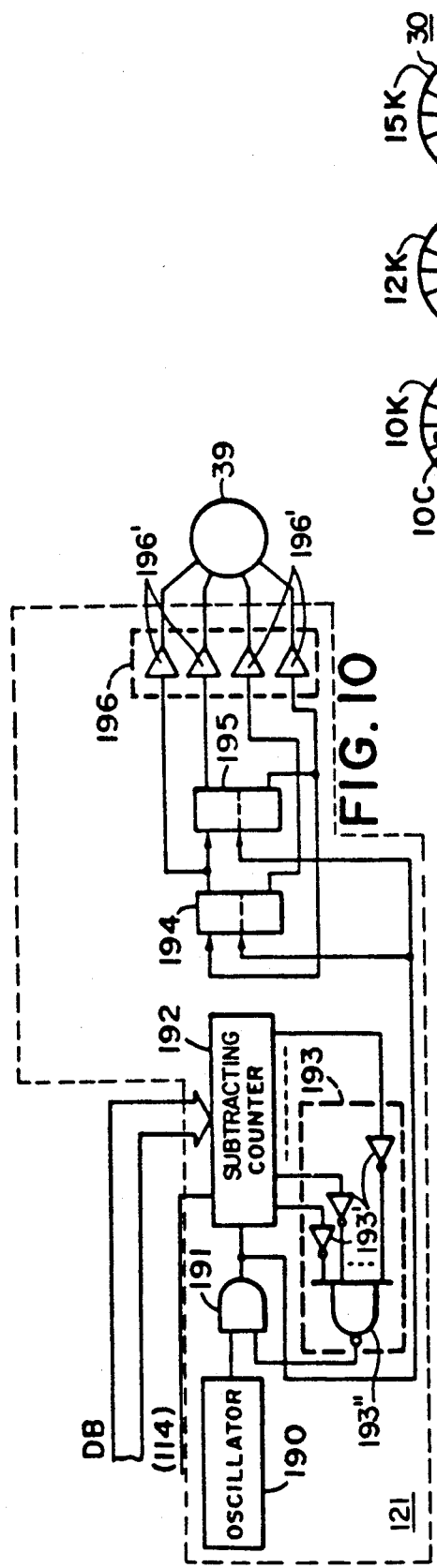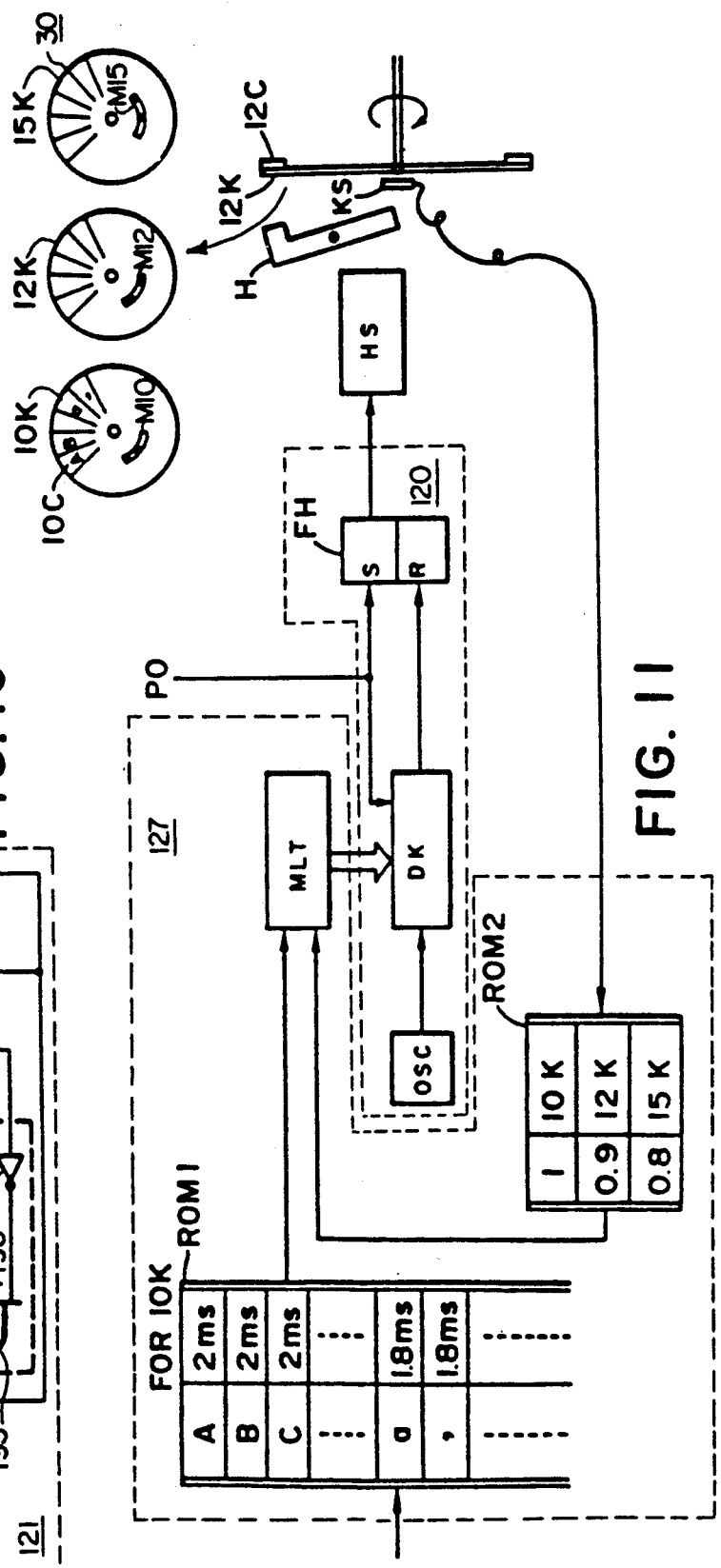

| FIG. 18-1 |
|---|
| FIG. 18-2 |

FIG. 18

| FIG. 19B-1 | FIG. 19B-2 |
|---|---|

FIG. 19B

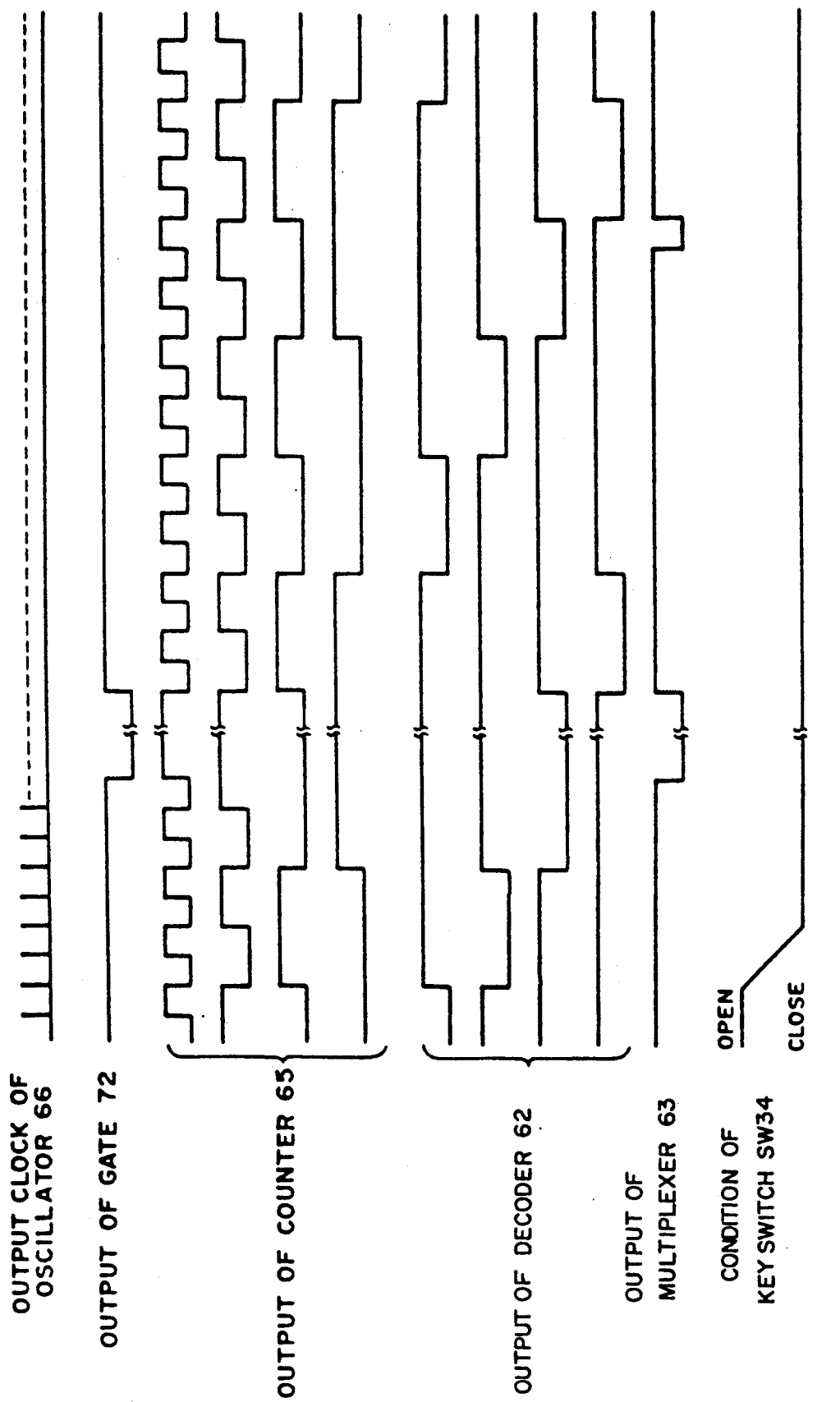

FIG. 22

| LEPT | CRGPT |
| PRTEPT | DCRGPT |
| PITCH | LNSP |
| FMC | OPCONT |
| SSW 1 | SSW 2 |
| LM | RM |
| TAB 1 | DLM |
| TAB 2 | CPT |
| TAB 3 | LC |
| TAB n-1 | |
| TAB n | |
| WORK | |

| KB2 | INDENT | STR | TR |
|---|---|---|---|
| NP | SC | CMV | TCNT |
| MCNT | PCNT | WCNT | |

50

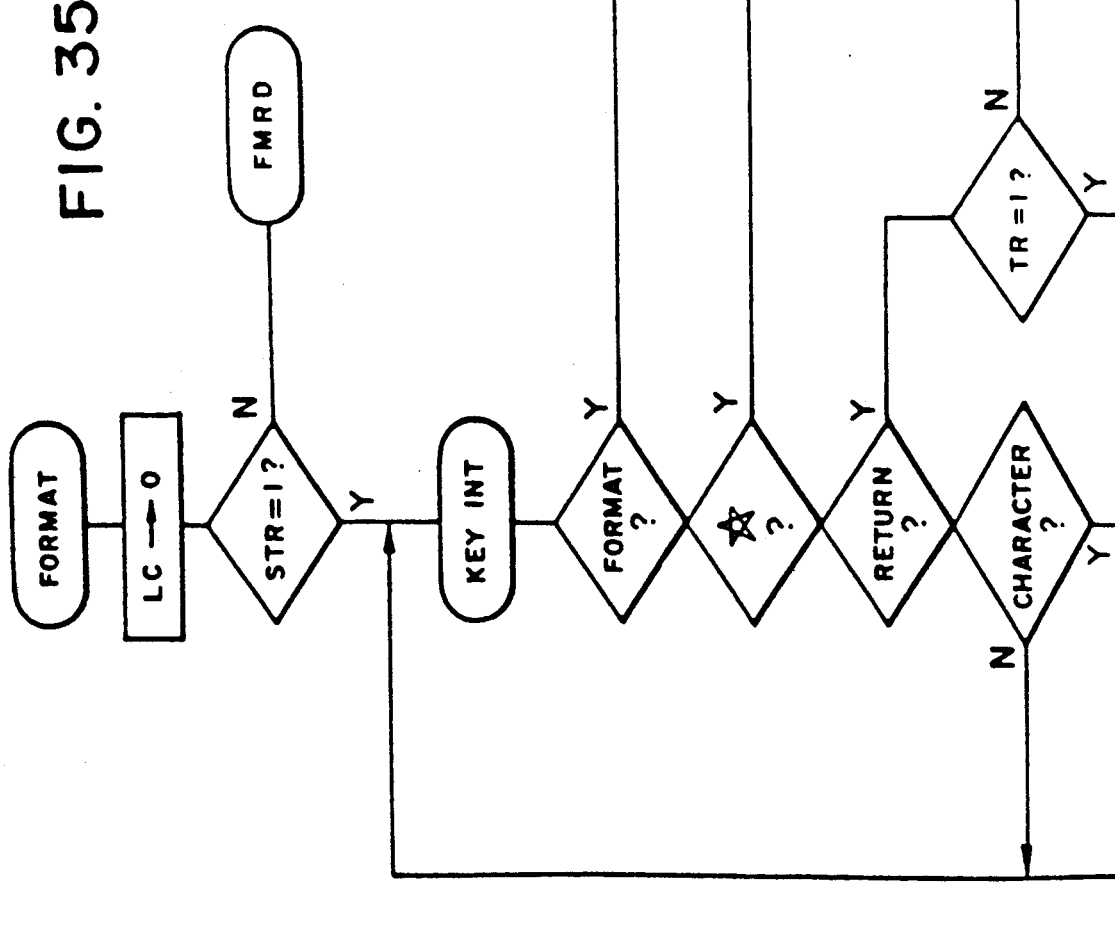

| FIG. 39-1 |
| FIG. 39-2 |

FIG. 39-1

| CHARACTER DIGIT | 1 | | | 2 | | | 3 | | | 4 | | | 5 | | | 6 | | | 7 | | | 8 | | |
|---|---|---|---|---|---|---|---|---|---|---|---|---|---|---|---|---|---|---|---|---|---|---|---|---|
| | A | | | B | | | C | | | D | | | R E 4 T | S P S | N M P | S P A | I P P | N O P | , | R E | I P P | N M P | E | I P P | N M P | F | I P P | N M P |
| | I | II | III | I | II | III | I | II | III | I | II | III | I | II | III | I | II | III | I | II | III | I | II | III |

| | 9 | | | 10 | | | 11 | | | 12 | | | 13 | | | 14 | | | 15 | | | 16 | | |
|---|---|---|---|---|---|---|---|---|---|---|---|---|---|---|---|---|---|---|---|---|---|---|---|---|
| | G | H | I | R6 E T | S3/4 P T | N M P F | S P S | I P P | N O P | S P A | I P P | N O P | a | I P P | N M P | b | I P P | N M P |
| | I | II | III | I | II | III | I | II | III | I | II | III | I | II | III | I | II | III | I | II | III | I | II | III |

| | 17 | | | 18 | | | 19 | | | 20 | | | 21 | | | 22 | | | 23 | | | 24 | | |
|---|---|---|---|---|---|---|---|---|---|---|---|---|---|---|---|---|---|---|---|---|---|---|---|---|
| | c | d | e | f | g | R9 E T | S3/4 P T | N O P F | S P A | I P P | N O P | S P A | I P P | N O P |
| | I | II | III | I | II | III | I | II | III | I | II | III | I | II | III | I | II | III | I | II | III | I | II | III |

|     | DSP         |
| --- | ----------- |
| I   | 1 2         |
| II  | 3 4         |
| III | 1 2 3 4 5 6 |
| IV  | 7 8 9       |
| V   | 7 6 5 4     |
| VI  | 3 2 1       |

FIG. 46A

PRT

------------
     1 2.              I
------------
     1 2. 3 4          II
------------
1 2 3  4 5 6.          III
------------
1 2 3  4 5 6. 7 8 9    IV
------------
     7, 6 5 4.         V
------------
     7, 6 5 4. 3 2 1   VI

FIG. 46B

| FIG. 47-1 |
| FIG. 47-2 |

FIG. 47

SERIAL PRINTING APPARATUS WITH CONTROLLABLE PITCH

This application is a continuation of application Ser. No. 351,294 filed May 10, 1989, now abandoned, which is a continuation application of Ser. No. 022,524 filed Mar. 9, 1987, now abandoned, which is a continuation application of Ser. No. 807,777 filed Dec. 11, 1985, now abandoned, which is a continuation application of Ser. No. 532,441 filed Aug. 15, 1983, now abandoned, which is a continuation application of Ser. No. 314,441 filed Oct. 23, 1981, now abandoned.

BACKGROUND OF THE INVENTION

1. Field of the Invention

The present invention relates to a serial printing apparatus in which the font wheel and the carriage are stopped before each printing action, and more particularly to such printing apparatus provided with a sentence memory and a display device for performing word processing function.

2. Description of the Prior Art

The conventional large word processor with a cathode ray tube display is bulky, expensive and requires expertise in use. Also there are known electronic typewriters which function as small word processors but they are still associated with various shortcomings requiring improvements and are complicated and expensive in structure.

SUMMARY OF THE INVENTION

The object of the present invention is to provide certain improvements on such apparatus.

BRIEF DESCRIPTION OF THE FIGURES

The attached Figures illustrate an embodiment of the electronic typewriter of the present invention, wherein:

FIGS. 6-1 and 6-2 are block diagrams of the entire control system grouped in various functions;

FIGS. 9 and 11 are circuit diagrams of the printing hammer control unit shown in FIG. 7;

FIGS. 10 and 12 are circuit diagrams of the ribbon feed motor control unit shown in FIG. 7;

FIGS. 18-1 and 18-2 are circuit diagrams showing an example of a key input circuit;

FIGS. 19A, 19B-1 and 19B-2 are waveform charts showing the function thereof;

FIG. 21 is a detailed view of the flag group shown in FIG. 6-2;

FIG. 22 is a detailed view of the register group shown in FIG. 6-2;

FIGS. 28-1 and 28-2 are control flow charts for key operations at the reviewing of characters or a sentence;

FIGS. 29-1 and 29-2 are flow charts showing the function thereof;

FIGS. 35-1 and 35-2 are flow charts showing the functions of registration of page format and tabulator stop positions;

FIGS. 39-1 and 39-2 are views showing an example of the content of line buffer;

FIGS. 46A and 46B are schematic views showing the changes in the display and print;

FIGS. 47-1 and 47-2 are block diagrams showing another embodiment of the electronic typewriter.

DESCRIPTION OF THE PREFERRED EMBODIMENT

Now the present invention and its various features will be clarified in detail by the following description to be taken in conjunction with the attached Figures.

Figure 1:
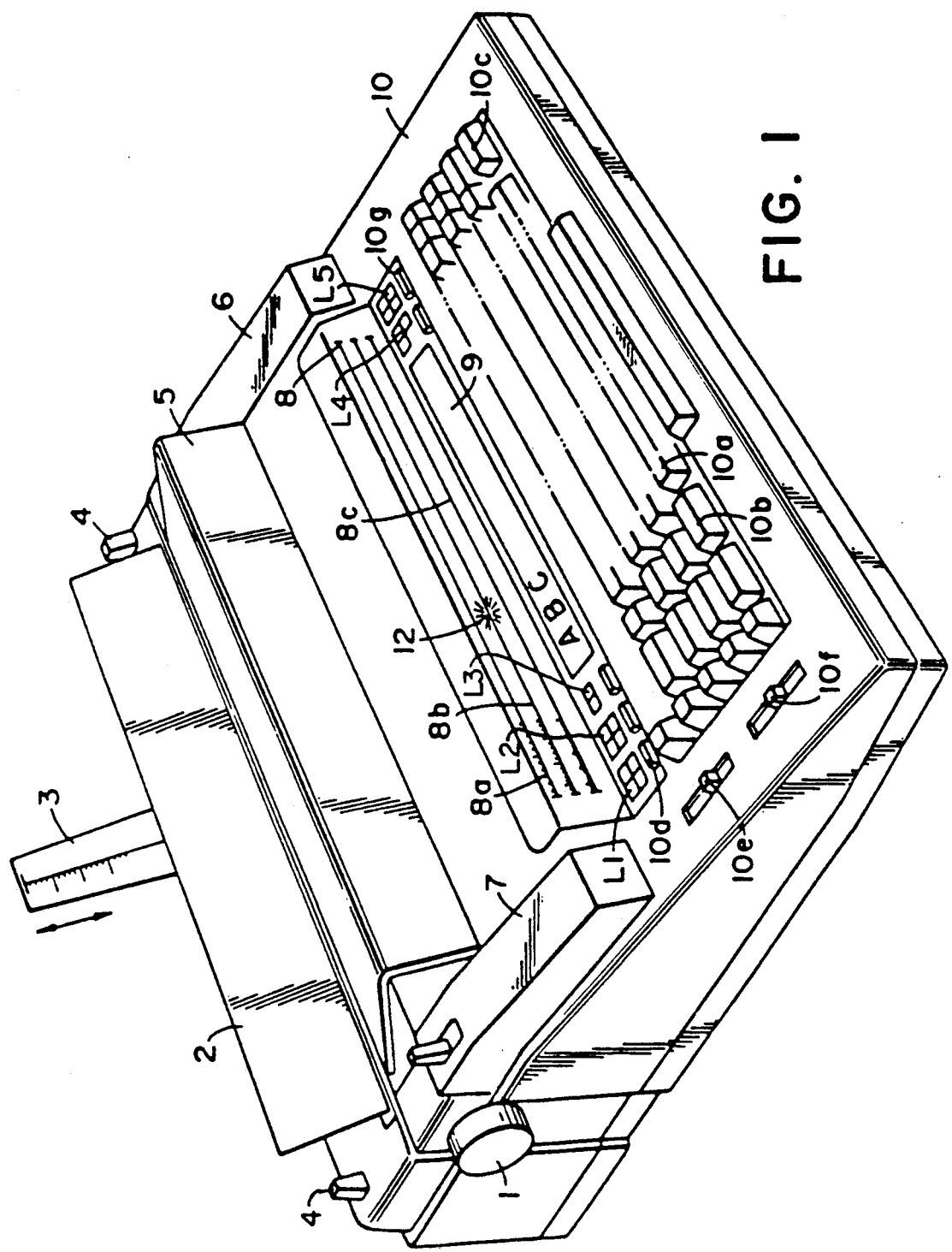
FIG. 1 is a schematic perspective external view of the electronic typewriter.
Figure 2:
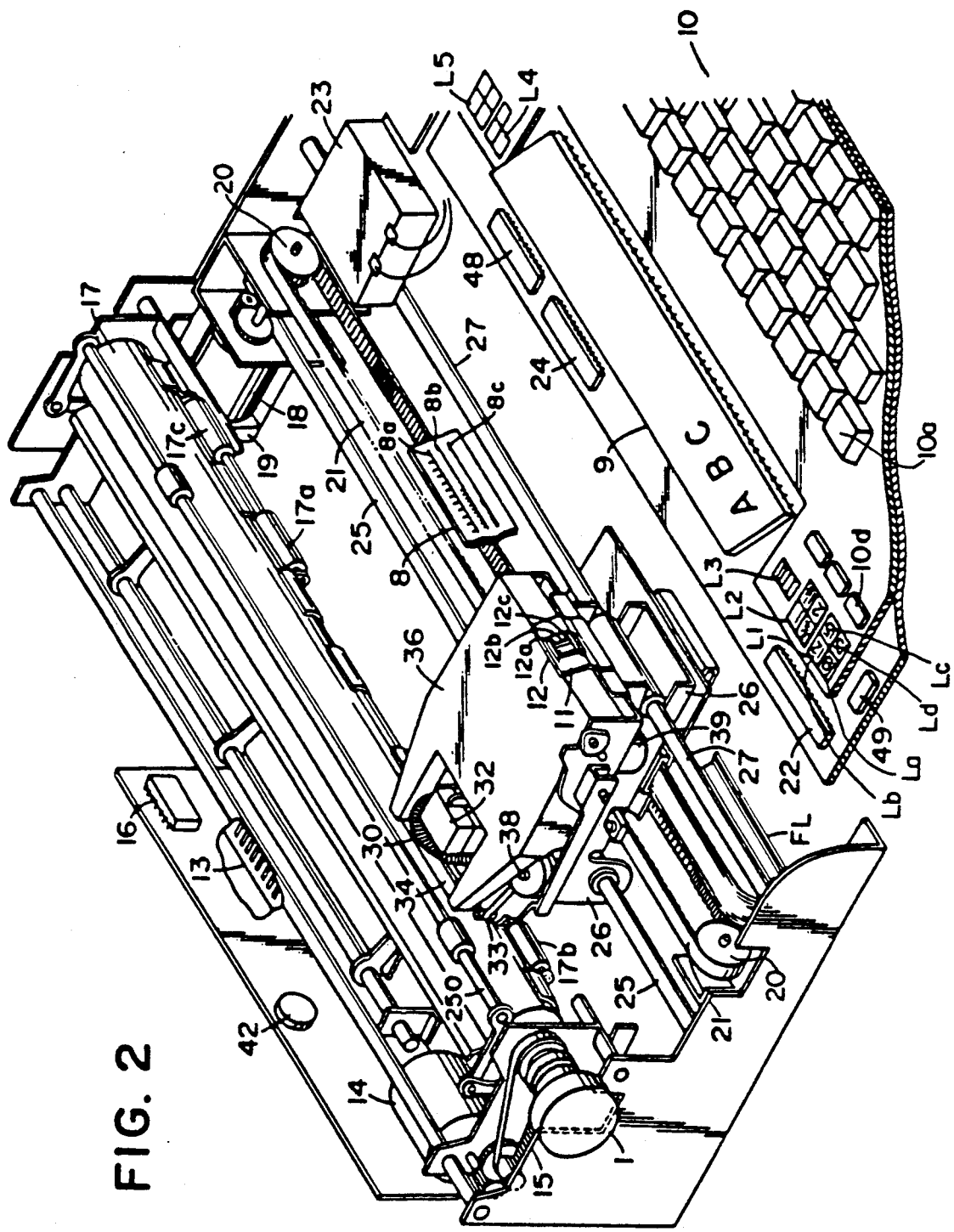
FIG. 2 is a schematic perspective view showing the internal structure thereof.

At first reference is made to FIGS. 1 to 5 showing the basic structures of an electronic typewriter embodying the present invention, wherein a platen knob 1 is provided for manual loading of an unrepresented printing sheet or for fine adjustment of the print position in the vertical direction. Said knob 1, when pressed inwards, is disengaged from a stepping motor 14 (FIG. 2) to allow manual rotation of said knob 1. A paper support 2 guides the printing sheet in such a manner that the printed face of even a thin sheet is directed toward the operator. A page end indicator 3 is a scale indicating the length to the last line of the sheet and is manually adjusted in advance by the operator in the vertical direction indicated by the arrow, whereby the position of the last line can be known when the upper end of the printing sheet coming out from a platen 17 (FIG. 2) reaches a determined scale line on the indicator 3. A paper bail 250 (FIG. 2) maintains the printing sheet in contact with the platen 17. A release lever 4 (FIG. 1) releases pinch rollers 17a, 17b and 17c (FIG. 2) provided under the platen 17, thus allowing the inclination of the printing sheet to be manually corrected. A cover 5, made of transparent acrylic resin, reduces the noise of impact printing and still allows the operator to see the printed characters. An upper cover 6, 7 can be swung open to the back for replacement of a typefont wheel 30 or a ribbon cassette 36 mounted on a carriage 26 as shown in FIG. 2. The printing hammer 32, printing ribbon 34, correcting ribbon 33, winding spool 38, and stepping motor 39 are discussed later in connection with FIGS. 3A and 3B.

The illustrated electronic typewriter can achieve four printing pitches in the lateral direction, i.e. 10, 12 or 15 characters per inch or proportional spacing in which the printing pitch is variable according to the size of each type. A scale 8 has three gradations, represented on scales 8a, 8b and 8c, respectively for 10, 12 and 15 characters per inch. An indicator mount 11 mounted on the carriage 26 as shown in FIG. 2, holds a carriage indicator 12 which lights a light-emitting diode, 12a, 12b, or 12c, respectively, corresponding to a printing pitch instructed from a keyboard 10 to indicate the carriage position on said scale 8a, 8b, or 8c, respectively.

Figure 6:
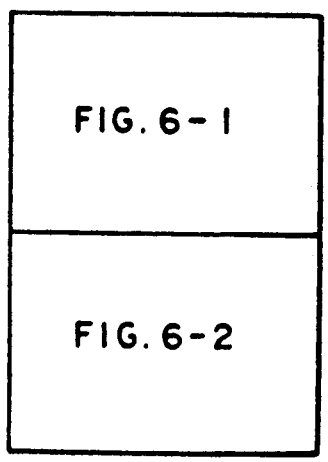
FIG. 6 shows the manner in which FIGS. 6-1 and 6-2 should be arranged.
Figures 1, 6:
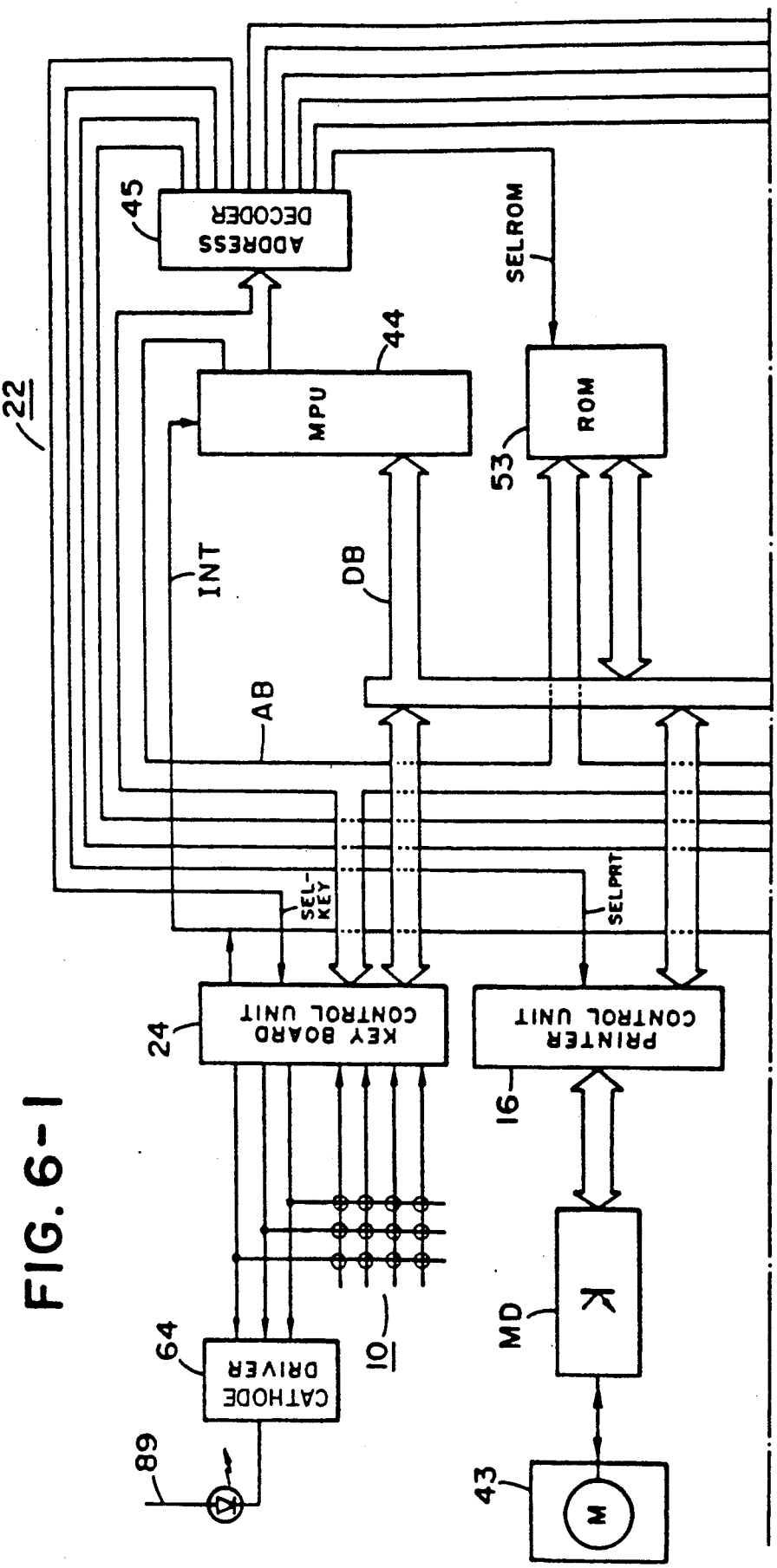
Figures 2, 6:
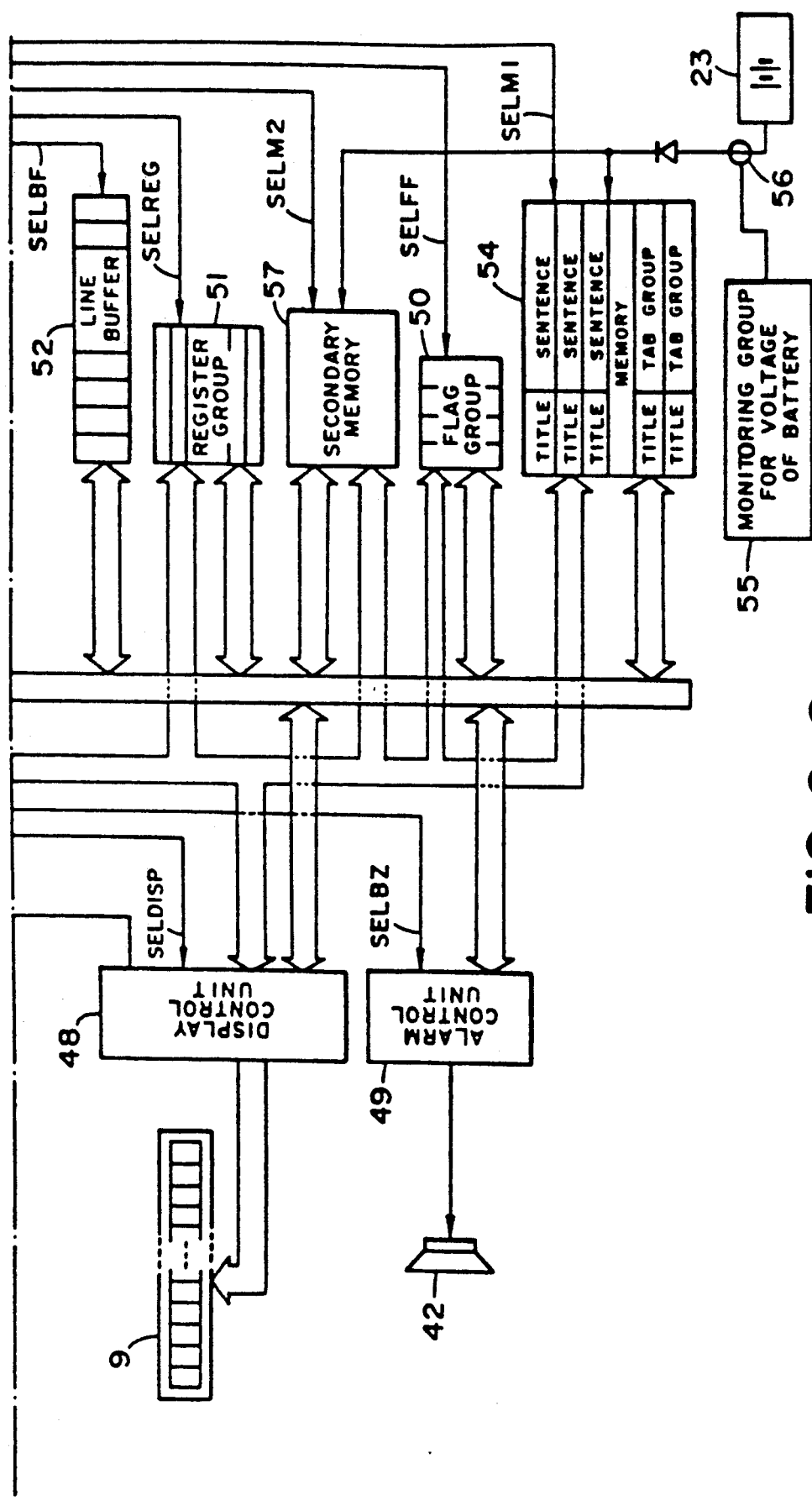

The keyboard 10 is composed of character keys 10a for entering characters, control keys 10b, 10c provided on both sides, mode keys 10d, 10g provided on both sides and locking slide keys 10e, 10f for selecting the print modes, and the entered key signals are identified by a keyboard control unit 24 (FIG. 2) and supplied to a main control unit 22 (FIG. 2) containing a microprocessor unit (MPU) which is shown in FIG. 6-1 as element 44. In case of key entries for printing, related data are supplied from the unit 22 to a printer control unit 16. A block diagram for the printer control circuit is shown in FIG. 6-1 and will be discussed later. In case of key entries for display, related data are supplied from the unit 22 to a display control unit 48 for display on a display unit 9. A block diagram for the display control circuit is shown in FIG. 6-2 and will be discussed later. Also in case of key entries for changing the LED (light-emitting diode) display units L1, L2, L3, L4, and L5 on the keyboard 10, such as changing the printing pitch (indicated by L1), line spacing (indicated by L2), or character selection keys (indicated by L3), data for controlling LED's L1–L5 are supplied from the main control unit 22 to the keyboard control unit 24. A paper feed stepping motor 14 for advancing the printing sheet rotates platen 17 through a transmission belt 15 under the control of the printer control unit 16.

A servo motor 18 for carriage displacement causes the lateral displacement of the carriage 26 along guide rods 25 and 27 through gears 20 and a belt 21. A photoencoder 19 for detecting the rotation angle of said carriage driving motor 18 provides a feedback signal to the printer control unit 16, thus constituting a servo control loop. A back-up battery 23 for the memory 54 (FIG. 6-2) in the main control unit 22 prevents the loss of stored information when the power supply is cut off. A loud speaker 42 is provided for giving a sound alarm and is controlled by an alarm control unit 49. A power supply unit 13 positioned behind the printer supplies electric power to various units. A flexible conductor FL supplies signals to the stepping motor 39 etc. on the carriage 26.

Figure 3A:
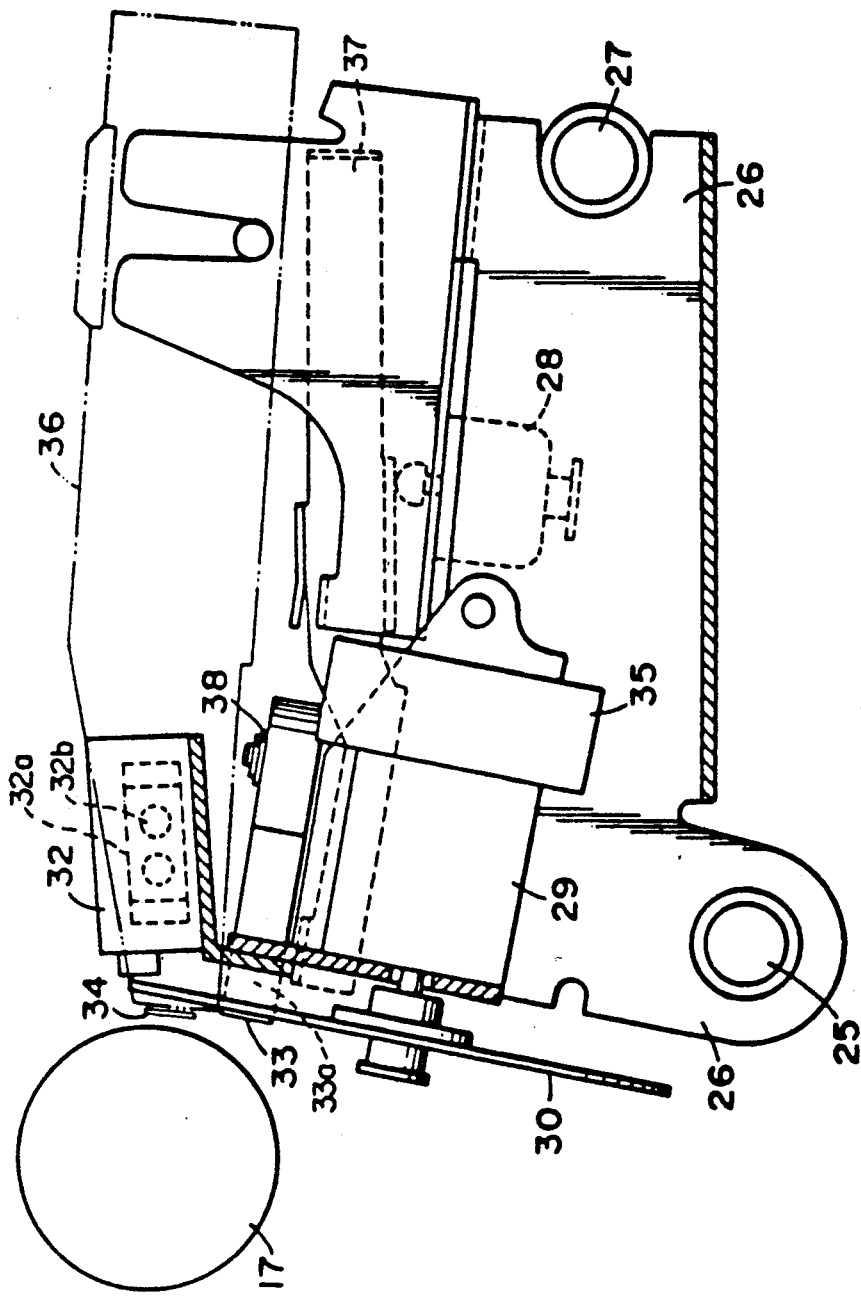
FIGS. 3A and 3B are cross-sectional and lateral views respectively of a carriage unit shown in FIG. 2.
Figure 3B:
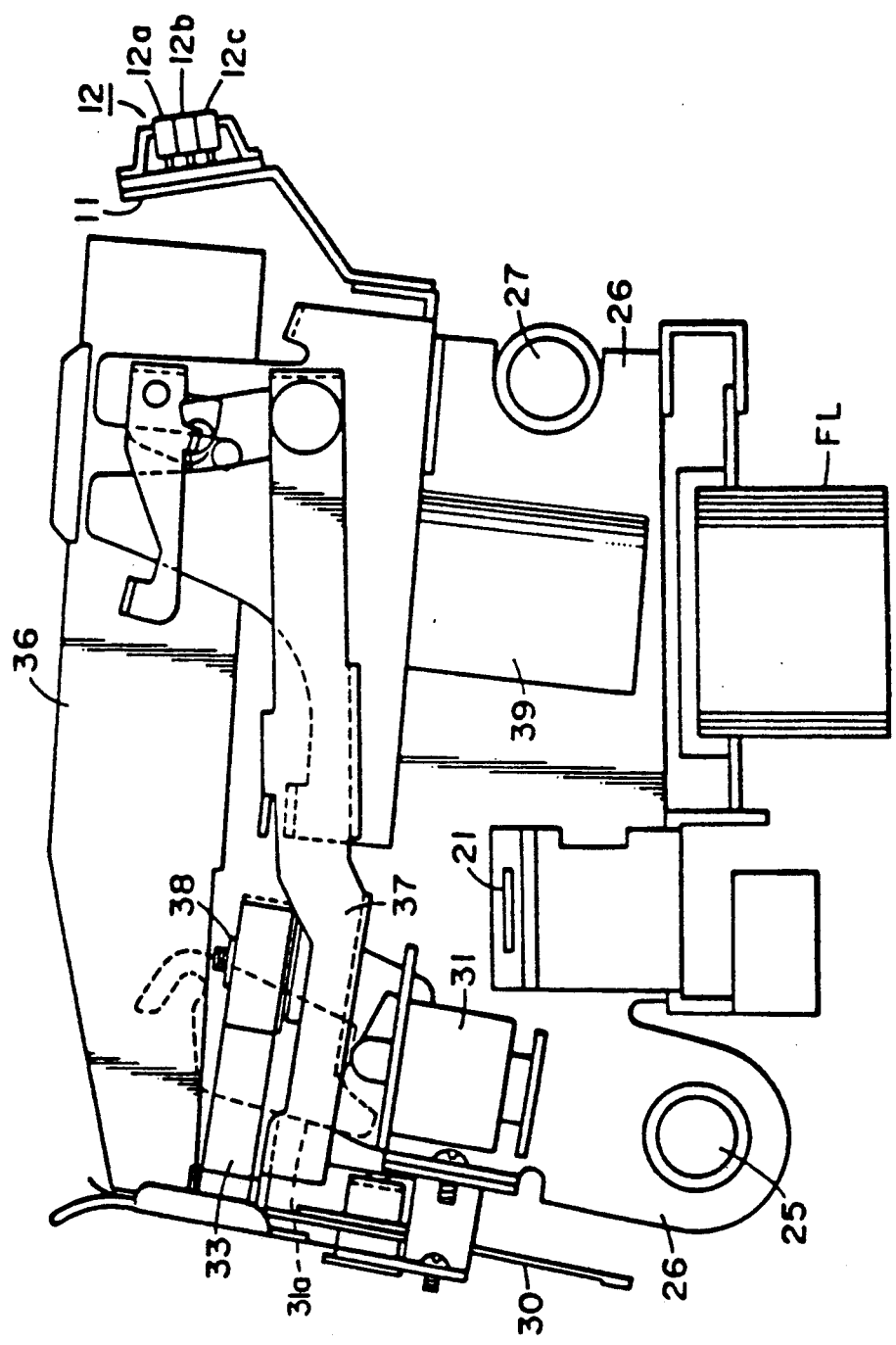
Figure 4:
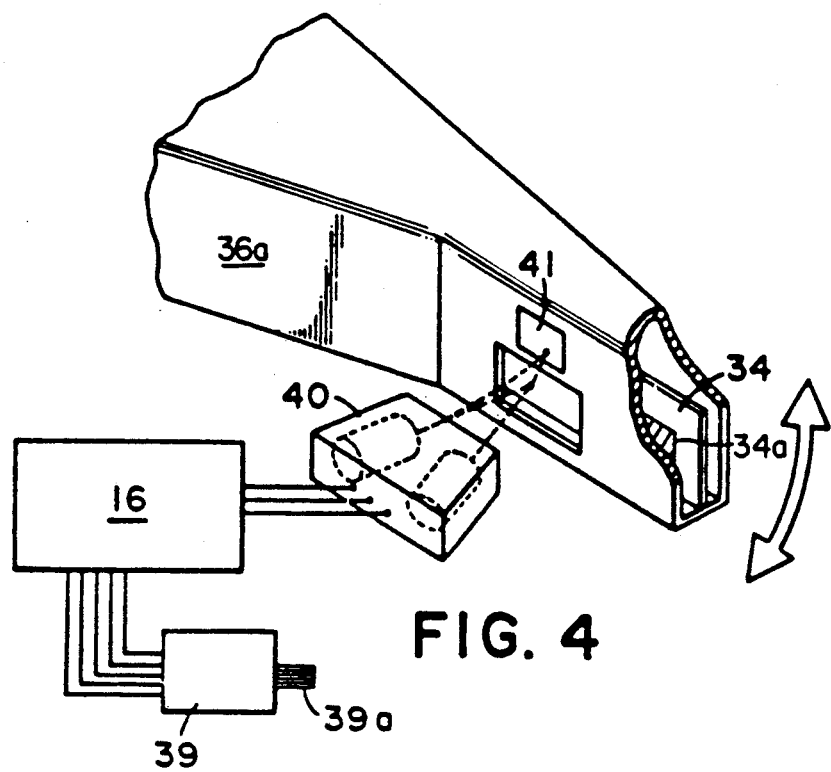
FIG. 4 is a perspective view showing the positional relationship between a ribbon cassette and a ribbon detector.

FIGS. 3A and 3B show the structure of carriage 26 in cross-sectional and lateral views. In the cross-sectional view in FIG. 3A, there is shown a servo motor 29 for character selection, which is provided on an end thereof with a typefont wheel 30 and on the other end thereof with a photoencoder 35. A printing hammer 32 is composed of a linear motor 32a in which the driving direction of the hammer 32 is varied according to the direction of the energizing current in the coil 32b. In the movement towards the platen 17 said hammer 32 hits a selected type of the typefont wheel 30 against the printing sheet on the platen 17 through a printing ribbon 34 in the printing action or through a correcting ribbon 33 in a correcting action. In the lateral view in FIG. 3B, there is shown a printing ribbon cassette 36 in which is provided a printing ribbon 34 (as shown in FIGS. 2, 3A, and 4), which is advanced by a determined amount in each printing action by a stepping motor 39. On an arm portion 36a of the ribbon cassette 36, as shown in FIG. 4, is a reflecting plate 41 for indicating the species of the printing ribbon 34, and correspondingly the carriage 26 (FIG. 3A) is provided with a reflective photodetector 40. Under the ribbon cassette 36 is a frame 37 (FIG. 3B) for the correcting ribbon 33 on which is mounted a supply mechanism 33a for said ribbon 33 supporting a winding spool 38 (FIG. 3B). The mechanism 33a operates on said spool 38 to take up the correcting ribbon 33. Said ribbons 33 and 34 are moved to a desired position when required by energizing solenoids 28 (FIG. 3A) and 31 (FIG. 3B), respectively, to raise the print ribbon cassette 36 alone, and to raise both the correcting ribbon frame 37 and the print ribbon cassette 36 together.

Figure 5:
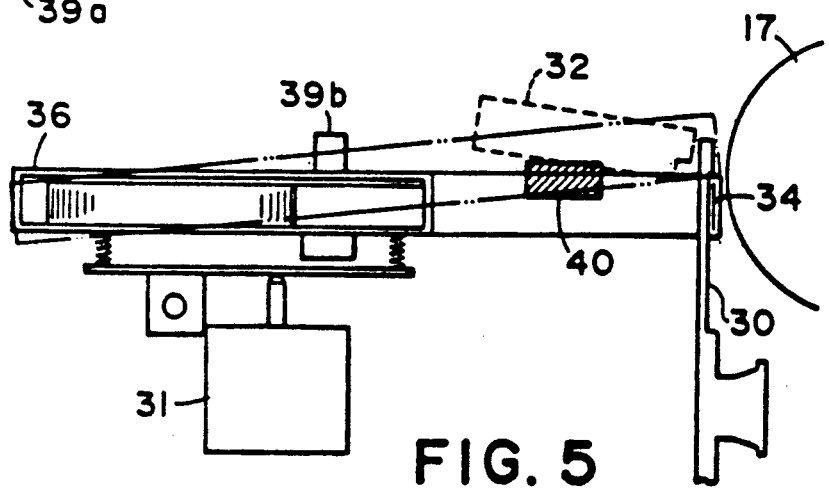
FIG. 5 is a lateral view showing the cassette position in a print action and in a stand-by state.

FIGS. 4 and 5 show the positional relationship of the ribbon cassette 36 in the print action and in the stand-by state, and of the photodetector 40. In the stand-by state said detector 40 detects the presence or absence of the reflecting plate 41 in the arm portion 36a of the cassette 36. When the solenoid 31 is not energized and the photodetector 40 produces a signal indicating the presence of a reflecting plate 41, the printer control unit 16 invokes the proportional spacing process discussed more fully in connection with FIG. 12. When the detector 40 produces a signal indicating the presence of said reflecting plate 41, which means that the cassette 36 contains a single-use ribbon 34, the printer control unit 16 controls the pulses to the stepping motor 39 for winding the printing ribbon 34 in response to the signal from the detector 40 to modify the advancing amount of the ribbon 34 according to the width of the characters printed. Also in the absence of said signal from the detector 40, which means that the cassette 36 contains a multiple-use ribbon 34, the printer control unit 16 so controls said ribbon advancing stepping motor 39 as to advance the ribbon 34 by a constant amount. The rotating shaft 39a (FIG. 4) of the ribbon advancing stepping motor 39 is connected for example with a ribbon drive shaft 39b (FIG. 5) to control the advancing amount of the ribbon 34 according to the rotation of said motor 39. In a print action the solenoid 31 alone is energized to lift the print ribbon cassette 36 alone through connecting means 31a (FIG. 3B) as represented by broken lines in FIG. 5, whereby the printing ribbon 34 becomes positioned facing the uppermost typefont on the typefont wheel 30. The position of the printing hammer 32 and the platen 17 are also shown. In this state the detector 40 no longer faces the reflecting plate 41 but faces the printing ribbon 34 passing through the arm portion 36a of the cassette 36. Said ribbon 34 is provided at the end portion thereof with a reflecting member 34a such as aluminum foil, whereby the printer control unit 16 identifies the end of the printing ribbon 34 when a signal is obtained from the detector 40 while the solenoid 31 is energized.

In a correcting operation the solenoid 28 shown in FIG. 3A is energized to lift the correcting ribbon frame 37 together with the printing ribbon cassette 36 thereby bringing the correcting ribbon 33 in front of the uppermost font position of the typefont wheel 30. The printing hammer 32 is activated in the same manner as in the printing action to correct the already printed character by "lifting off" or "covering up".

The control for the printing and for the display of the above device is explained in the following. FIG. 6 shows the manner in which FIGS. 6-1 and 6-2 should be arranged.

FIGS. 6-1 and 6-2 show basic block diagrams around the main control unit 22 for printing control and display control, respectively. As shown in FIG. 6-1 a microprocessor unit (MPU) 44 identifies the key signals received from the keyboard 10 through data bus DB and performs control of the print unit 43, as well as of the display unit 9, sentence memory 54, and loud speaker 42 as shown in FIG. 6-2, according to the sequence control programs stored in a read-only memory (ROM) 53. An address decoder 45, under the control of the MPU 44 through an address bus AB as shown in FIG. 6-1, generates signals SELROM, SELBF, SELREG, SELM2, SELFF, SELM1, SELKEY, SELPRT, SELDISP, and SELBZ to respectively control the ROM 53, line buffer 52, register group 51, secondary memory 57, flag group 50, sentence memory 54, keyboard control unit 24, printer control unit 16, display control unit 48, and alarm control unit 49. The display control unit 48 can provide an interruption signal INT to the MPU 44 when necessary, as explained more fully in connection with FIG. 18-1. The printer control unit 16 in turn provides signals to a motor M of the print unit 43 through a motor drive MD. The keyboard control unit 24 also provides signals to an LED matrix 89 through a cathode driver 64, the operation of which will be more fully explained in connection with FIG. 18-2. The keyboard 10, display unit 9, print unit 43, sentence memory 54, read-only memory (ROM) 53, etc. have respective addresses for processing by the MPU 44.

The function of the components shown in FIG. 6-2 will now be explained. The flag group 50 stores the designated state and various modes of the typewriter. The register group 51 is used for storing for example the intermediate results of the processing. The line buffer 52 stores the information of characters already printed and to be printed in the line-unit or word-unit printing mode. In the correcting operation the MPU 44 retrieves the already printed characters from said line buffer 52 and automatically performs the corrections. The sentence memory 54 stores sentences, characters, tabulator group information, etc. with or without title names entered by the operator according to a certain procedure (which is explained in connection with FIGS. 28-1 and 28-2), and is backed up by a battery 23 against information loss when the power supply unit 13 is cut off. Said battery 23 is inspected by a sensor 56 and an inspection unit 55 as long as the power supply unit 13 is turned on, and an alarm is given to the operator through alarm control unit 49 and loud speaker 42 in case of a voltage decrease for example due to the expiration of the service life of the battery 23. The secondary memory 57, similarly backed up by the battery 23, stores various modes immediately prior to the turning off of the power supply unit 13.

Figure 7:
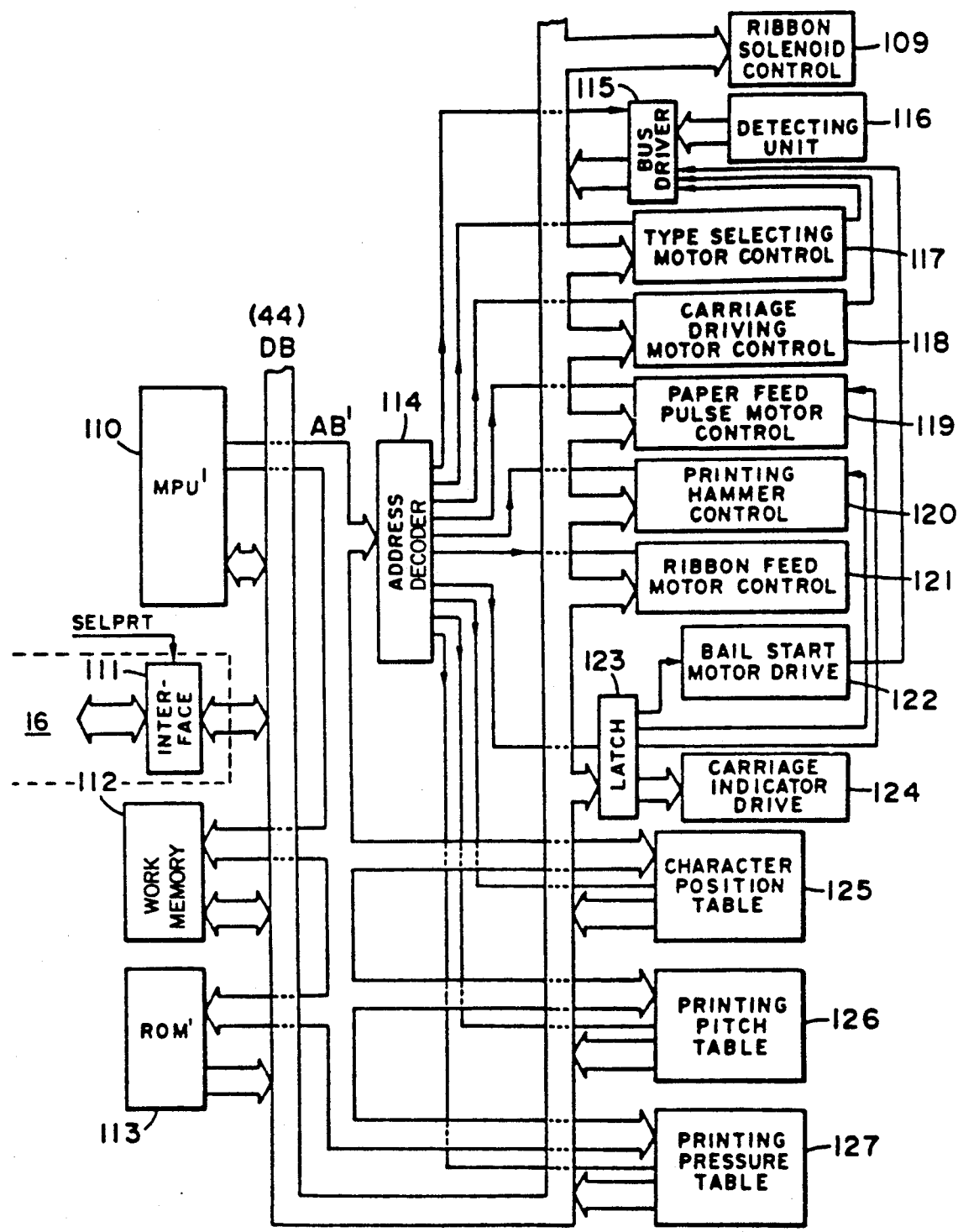
FIG. 7 is a detailed block diagram of the printer control unit shown in FIG. 6-1.

FIG. 7 shows the details of the printer control unit 16, wherein provided are a microprocessor unit (MPU') 110; an interface 111 for receiving instructions from the microprocessor unit 44 for the entire control and transmitting the information on the printer during the print function thereof to said microprocessor unit 44; a work memory 112 for storing intermediate data etc. generated by the MPU' 110; a read-only memory (ROM') 113 for storing the control programs for the MPU' 110; an address bus AB'; an address decoder 114 for generating various signals designating various control loads such as the motors and solenoids having addresses allotted thereto; a ribbon solenoid control unit 109 for controlling the solenoids 31 (FIG. 3B) and 28 (FIG. 3A) for displacing the printing ribbon 34 and correcting ribbon 33, respectively; a detecting unit 116 including the detector 40 shown in FIG. 4 for identifying the species of the printing ribbon 34 and the end point of said ribbon 34, said detecting unit 116 supplying data to the MPU' 110 through a bus driver 115 in response to a request from the MPU' 110; and control units 117, 118 for the type selecting motor 29 (FIG. 3A) and the carriage drive motor 18 (FIG. 2) respectively, which rotate said motors 29 and 18 by determined angles instructed by the MPU' 110 and transmit signals thereto through the bus driver 115 upon completion of said rotation.

There are also shown a paper feed pulse motor control unit 119 for driving the stepping motor 14 for sheet advancing according to the number of pulses supplied from the MPU' 110; a printing hammer control unit 120 for energizing the printing hammer 32 during a period instructed by the MPU' 110; a ribbon feed motor control unit 121 for driving the ribbon feed stepping motor 39 for advancing the ribbon 34 according to the number of pulses supplied from the MPU' 110; a DC bail start motor drive unit 122 to be actuated by the instruction from the MPU' 110 to liberate a paper bail 250 pressing the printing sheet; a latch circuit 123 for selectively lighting one of three light-emitting diodes 12a, 12b, and 12c constituting the carriage indicator 12 through a carriage indicator drive unit 124 in response to the data from the MPU' 110; a character position table 125 composed of a read-only memory for converting the key signal transferred from the MPU 44 to MPU' 110 into positional information of a corresponding character on the typefont wheel 30 relative to a reference index position thereon; and a printing pitch table 126 which is utilized, in the proportional spacing mode, to determine the type spacing or the amount of lateral displacement of the carriage 26 according to the width of each type and has memory contents as shown in the following:

| Type | A | B | a | i | , |
|---|---|---|---|---|---|
| Type spacing | 1 | 1 | ¾ | ½ | ½ |

Also in case the detector 40 identifies a single-use ribbon, the ribbon advancement is controlled to the width of each character in order to minimize the ribbon consumption, and said printing pitch table 126 is also utilized for determining the amount of ribbon advancement. Furthermore, in case the typefont wheel 30 is changed, the table 126 is utilized to enable variable ribbon advancement optimum for each character of each typefont wheel 30.

A printing pressure table 127 is utilized for controlling the energizing period of the hammer 32 according to the size of characters in order to obtain a uniform print density, and stores a hammer energizing period such as 2 msec. or 1.5 msec. for each character in a manner similar to the aforementioned printing pitch table 126. Generally the typefont wheel 30 is changed according to the character size or the character pitch, and the content of said printing pressure table 127 should also be changed accordingly. However a memory of a large capacity will be required for providing the printing pressure tables for all the pitches. For this reason, in order to economize the memory, there is provided only one printing pressure table 127 for a particular typefont wheel 30, and other tables are obtained by multiplying coefficients in the MPU' 110 in response to the information of character pitch supplied from the MPU 44.

Figure 8:
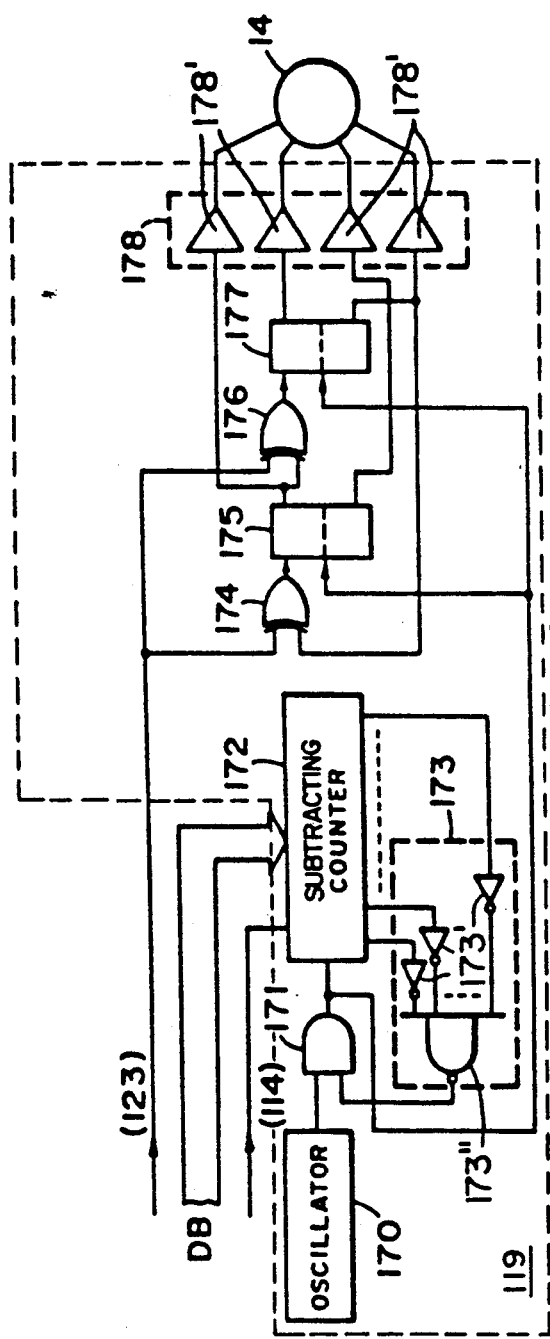
FIG. 8 is a circuit diagram of the paper feed pulse motor control unit shown in FIG. 7.

FIG. 8 shows the details of the paper advance pulse motor control unit 119 (FIG. 7) for the paper feeding stepping motor 14, wherein provided are an oscillator 170 oscillating at a frequency meeting the self-starting frequency of said stepping motor 14; an AND gate 171; a presettable subtracting counter 172; a circuit 173 (comprising three inverters 173' and a NAND gate 173") for detecting a count zero state of the counter 172, providing an L-level, that is LOW-level, output signal upon detecting said state; exclusive OR gates 174, 176; D-type flip-flops 175, 177 constituting a pulse generating circuit for 2-phase forward/reverse drive of the stepping motor 14; a stepping motor driver 178 (including four single-input AND gates 178'); and a 4-phase stepping motor 14.

In response to a sheet feed instruction including the amount of sheet feeding supplied from the keyboard 10 through the MPU 44, the MPU' 110 sets the feeding direction in the latch 123 and the feed amount in the counter 172. If the feed amount is not zero, the zero detecting circuit 173 releases an H-level, that is HIGH-level, output signal to open the AND gate 171, whereby the counter 172 counts the output pulses of the oscillator 170 by subtraction until the count reaches zero. The output signals of the oscillator 170 transmitted through the AND gate 171 are supplied to a pulse generating circuit composed of elements 174, 175, 176, and 177 for driving the stepping motor 14 to generate pulses of a number stored in the counter 172, thereby rotating the stepping motor 14 by the instructed amount in a direction stored in the latch 123.

Figure 9:
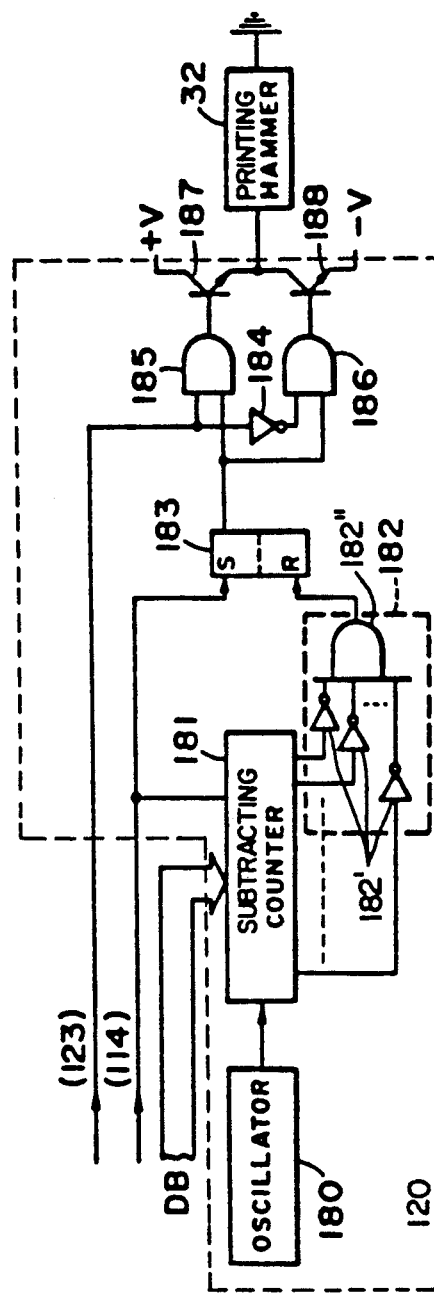

FIG. 9 shows the details of the printing hammer control unit 120 shown in FIG. 7, wherein provided are an oscillator 180; a subtracting counter 181; a zero detecting circuit 182 (comprising three inverters 182' and an AND gate 182") releasing an H-level signal in response to the zero count of the counter 181; a set-reset type flip-flop 183; AND gates 185, 186; an inverter 184; and a printing hammer 32. In response to the print instruction supplied from the MPU 44, the MPU' 110 controls the type selecting motor 29 in the aforementioned manner through the character position table 125 shown in FIG. 7, thereby stopping the typefont wheel 30 at a desired position. Then, for the printing action the MPU' 110 stores "1" in the latch 123, opens the gate 185, refers to the printing pressure table 127 and stores the hammer energizing period for each character obtained therefrom in the counter 181. Also the flip-flop 183 is set by the set signal to said counter 181. As the AND gate 185 is opened, a transistor 187 is activated to drive the printing hammer 32 for a period corresponding to each character, thus performing the printing action with optimum pressures. In the standby state between print instructions, a "0" signal is provided from the latch 123 to the AND gate 185, which is closed. The same "0" signal is received by the inverter 184, which supplies a "1" signal to the AND gate 186. As the AND gate 186 is opened, a transistor 188 is activated to retract the printing hammer 32 from the typefont wheel 30.

Now FIG. 10 shows the details of the ribbon feed motor control unit 121 (FIG. 7) for the ribbon advancing stepping motor 39. Pulses of an instructed number are generated in the same manner as in the circuit of FIG. 8 for the sheet advancing motor 14, except that the D-type flip-flops 194, 195 are so arranged as to generate pulses for 2-phase drive in the forward direction alone.

In case the signal from the ribbon detector 40 indicates a multiple-use ribbon 34, the MPU' 110 sets a constant value in the subtracting counter 192 to perform a constant ribbon feeding. Also in case said signal indicates a single-use ribbon 34, the MPU' 110 detects the width of the printed character from the printing pitch table 126 shown in FIG. 7 and sets a corresponding pulse number for ribbon advancing in the counter 192. If the advancing amount is not zero, the zero detecting circuit 193 (comprising three inverters 193' and a NAND gate 193") provides an H-level signal to open the AND gate 191, whereby the counter 192 counts the output pulses from the oscillator 190 until the count zero state. In this manner the stepping motor 39 is driven through the flip-flops 194, 195 and a stepping motor driver 196 (including four single-input AND gates 196') by pulses of a number stored in the counter 192.

FIG. 11 shows an embodiment of the printer capable of providing uniform printing from various typefont wheels 30 (10K, 12K, 15K), by utilization of a printing pressure table 127 to regulate the printing hammer control unit 120.

The conventionally known apparatus of this sort, such as the electronic typewriter, utilizes typefont wheels with different character sizes for example for character pitches 10, 12, and 15 characters per inch, and even in each wheel there are types of different sizes, so that uneven density is unavoidable if the printing is performed with a constant pressure. On the other hand, in order to store the information of printing pressure there is required a memory of an extremely large capacity, leading to an elevated cost.

The present embodiment provides a printing apparatus not associated with such drawback and capable of providing uniform density from an arbitrary typefont wheel 10K, 12K, 15K, etc. by means of two read-only memories ROM1, ROM2, each of limited capacity.

FIG. 11 shows said embodiment in a block diagram, wherein a printing hammer H, when activated by a hammer solenoid HS, performs the printing action in the known manner by hitting a type 12C of a typefont daisy wheel 12K, which is provided with types for printing 12 characters per inch and is replaceable for example by other typefont wheels 10K or 15K for printing 10 or 15 characters per inch.

Since each character has a different area in the typefont wheels 10K, 12K and 15K, as shown, for example, by type 10C on typefont wheel 10K, it is desirable to regulate the printing pressure of the hammer H accordingly in order to obtain uniform print quality.

It is also desirable for obtaining uniform print quality to use different pressures for example for a large type "A" and for a small type ",", even within the same typefont wheel.

For this purpose there can be provided a memory for setting a particular print pressure, for example a particular hammer energizing period for each character, but such memory has to be of a large capacity if the information for the printing pressure is stored for all the types in all the typefont wheels 10K, 12K, 15K. It is however possible to avoid an excessive capacity by providing a read-only memory ROM1 for the typefont wheel 10K for printing 10 characters per inch and by calculating the hammer energizing times for other typefont wheels 12K, 15K, etc. from the information stored in said memory ROM1 for the wheel 10K.

Thus the memory ROM1 stores the hammer energizing times 2 msec., 1.8 msec., 1.5 msec., etc. in the coded forms for the types A, B, C, ..., a, ... as shown in FIG. 11.

Also another read-only memory ROM2 stores the coefficients 1, 0.9, 0.8, etc. in the coded forms respectively for the typefont wheels 10K, 12K, 15K, etc.

There are also provided a multiplier MLT, a subtracting counter DK, an oscillator OSC, and a flip-flop FH. Now, upon mounting for example of the typefont wheel 12K in the printing unit, a typefont wheel detector KS identifies said mounting by a code mark M12 on the wheel 12K and designates an address corresponding to 12K in the memory ROM2. When the typefont wheel 12K is rotated and a desired type 12C is brought to the position of the hammer H by the known character selecting operation, an address corresponding to said type 12C in the memory ROM1 is designated to supply the corresponding hammer energizing period, for example 2 msec., for "A" or 1.8 msec. for "a", to the multiplier MLT. The multiplier MLT also receives the coefficient 0.9 corresponding to the typefont wheel 12K from the memory ROM2 to effect a multiplication such as 2×0.9 or 1.8×0.9, and the result is stored in the subtraction counter DK in synchronization with a print instruction PO.

Simultaneously the flip-flop FH is set by said print instruction PO to energize the solenoid HS, thereby initiating the motion of the printing hammer H.

The subtracting counter DK step reduces the content thereof in response to each output signal from the oscillator OSC, and releases an output signal upon reaching zero count state to reset the flip-flop FH, thereby terminating the function of the printing hammer H. In this manner the set period of the flip-flop FH is changed according to the result of multiplication to regulate the energizing period of the printing hammer H thereby differentiating the printing pressure for each typefont wheel, 10K, 12K, or 15K. Also the characters within a typefont wheel can be printed uniformly as the hammer energizing period is regulated for each character, 10C for example, in the typefont wheel, 10K for example.

The instruction for the typefont wheels 10K, 12K, and 15K can also be supplied from the keyboard (not shown).

As explained in the foregoing, the present embodiment allows obtaining beautiful printing with a uniform printing pressure for all the types and in all the typefont wheels of different character sizes with a limited amount of stored information, by storing the information of printing pressures for the types of a determined typefont wheel and by multiplying a suitable coefficient corresponding to the selected typefont wheel thereby obtaining optimum pressures matching the type sizes and thus effecting the pressure control in the printing operation.

Figure 12:
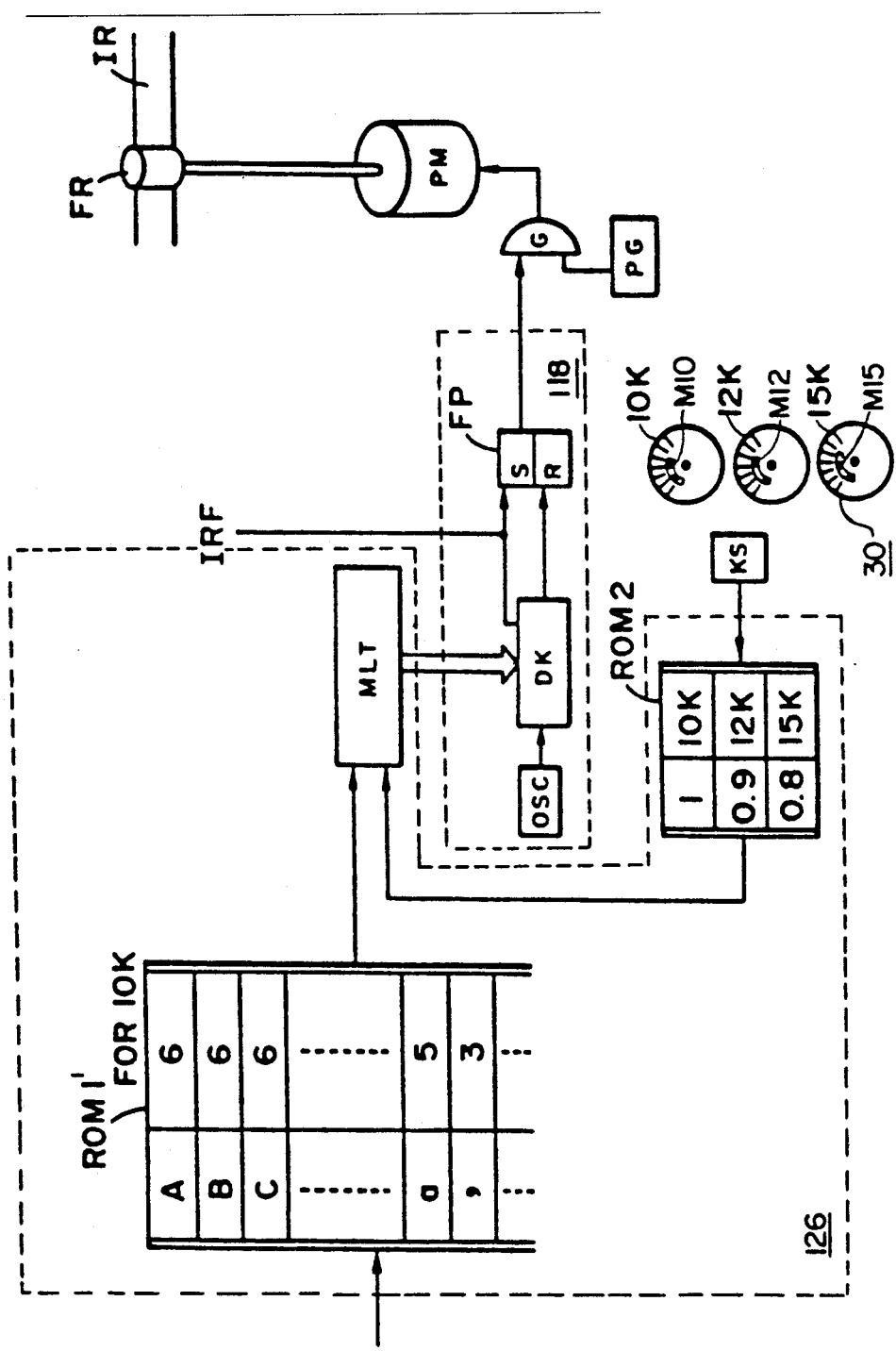

Now reference is made to FIG. 12 showing an embodiment of the printer capable of varying the type spacing corresponding to the size of different characters on a typefont wheel 30, by utilization of a printing pitch table 126 to regulate the carriage driving motor control unit 118.

The conventional apparatus of this sort utilizing a single-use printing ribbon is inevitably associated with the waste of printing ribbon since the advancing amount thereof is determined to a type of largest width, which is usually "—".

The present embodiment provides a printer capable of achieving maximum economy in the printing ribbon, particularly the single-use printing ribbon, with a simple structure.

The type spacing information, utilized for controlling the lateral displacement of the carriage 26 in the proportional spacing mode in which the type spacing is made variable according to the character size, in fact represents the width of types and is utilized in the present embodiment for controlling the advancing amount of the printing ribbon 34, thereby reducing the consumption thereof. In the use of the typefont wheels 12K or 15K with smaller types for printing 12 or 15 characters per inch respectively, the above-mentioned information is multiplied by the coefficient of each typefont wheel 12K, 15K to further reduce the ribbon consumption.

FIG. 12 shows said embodiment in a block diagram, wherein shown are the printing ribbon IR; a feed roller FR therefore; a stepping motor PM for advancing said ribbon IR; typefont wheels 10K, 12K, and 15K respectively for printing 10, 12, and 15 characters per inch; a typefont wheel detector KS; a read-only memory ROM1' storing the character width information for the types on the typefont wheel 10K for example in the form of numbers of steps 6, 5, 3, etc. of the stepping motor PM; a read-only memory ROM2 storing coefficients 1, 0.9, 0.8, etc. for the typefont wheels 10K, 12K, 15K, etc. having code marks M10, M12, M15, etc., respectively to be multiplied by the character width information stored in the memory ROM1'; a multiplier MLT for multiplying the character width information stored in ROM1' by the coefficients stored in ROM2; a subtracting counter DK; an oscillator OSC for generating subtracting pulses; a flip-flop FP for controlling a gate G; and a motor driving pulse generator PG.

In case the wheel 10K is mounted on the printing unit, the detector KS identifies the code mark M10 of said wheel 10K and designates an address for said wheel 10K in the memory ROM2 thereby supplying a coefficient "1" to the multiplier MLT. Then the typefont wheel 10K is rotated to perform the character selecting operation in the known manner, and the printing hammer H is activated when a desired type 10C or 12C (FIG. 11) is brought to the printing position to perform the print action. Subsequently an address in the memory ROM1' corresponding to the printed character is designated, and the character width information in said address, for example "6" for a character "A" or "5" for "a" is supplied to the multiplier MLT for conducting a multiplication such as $6 \times 1$ or $5 \times 1$. Then the result of said multiplication is stored in the subtracting counter DK in synchronization with the ribbon advancing instruction IRF. Simultaneously the flip-flop FP is set to open the gate G, whereby the stepping motor PM initiates rotation by the pulses from the pulse generator PG to advance the printing ribbon IR. The subtracting counter DK step reduces the content thereof in response to each output pulse from the oscillator OSC, and releases an output signal upon reaching zero count state to reset the flip-flop FP, whereby the gate G is closed to terminate the rotation of the stepping motor PM, thus stopping the advancement of the printing ribbon IR. In this manner the set period of the flip-flop FP is changed according to the result of said multiplication, thus regulating the functioning period of the stepping motor PM and thereby controlling the advancing amount of the printing ribbon IR corresponding to the pitch of each type.

Also in case the typefont wheel is changed to 12K, a coefficient 0.9 in the memory ROM2 is supplied to the multiplier MLT to multiply said coefficient by the character width information supplied from the memory ROM1', thus reducing the advancing amount of the printing ribbon IR compared to the case of wheel 10K.

In this manner a memory of a large capacity can be dispensed with by storing the information for a determined wheel, for example 10K, alone in the memory ROM1' and by employing a memory ROM2 for storing coefficients for different wheels 12K, 15K, etc. and a multiplier MLT.

As explained in the foregoing, the present embodiment, utilizing the information of printing pitch obtained from means for proportional spacing mode, allows reduction of the consumption of the single-use printing ribbon IR thus achieving maximum economy in the utilization of ribbon IR.

Figure 13:
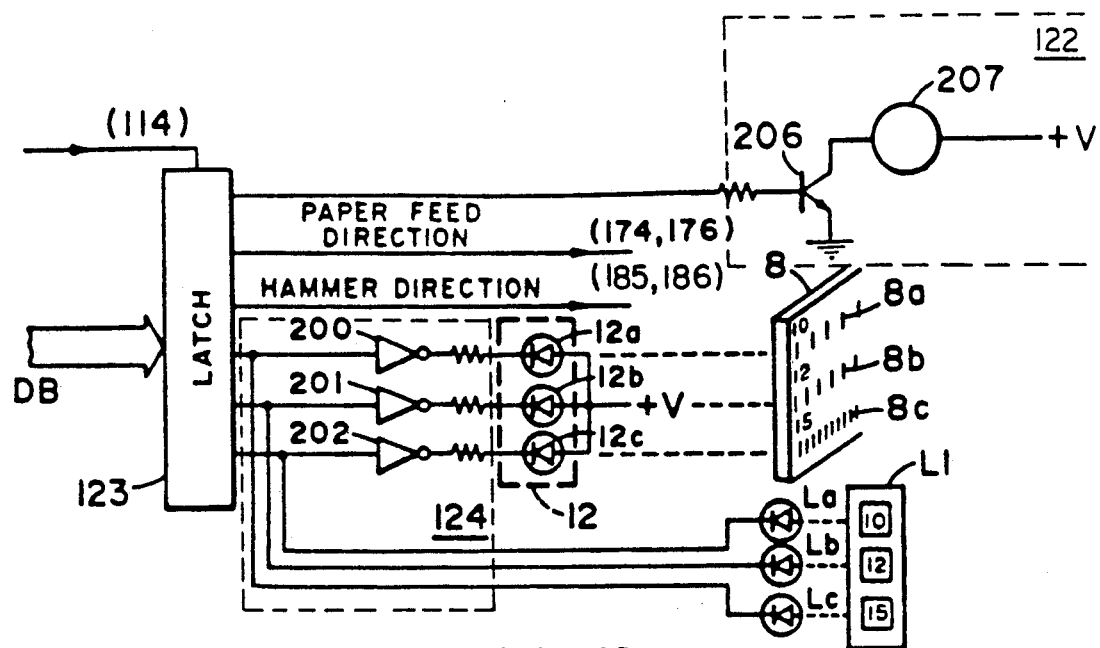
FIGS. 13 and 14 are circuit diagrams respectively of the bail start motor drive unit and the carriage indicator unit shown in FIG. 7.

FIG. 13 shows part of the bail start motor drive unit 122 and the carriage indicator drive unit 124 shown in FIG. 7. Upon actuation of the pitch selecting key 10d provided in the keyboard 10 in FIG. 2, the corresponding data are supplied through the keyboard control unit 24 to the MPU 44, thereby storing a signal for activating one of the light-emitting diodes 12a–12c in the latch 123 under the control of the address decoder 45. As an example, the key 10d is actuated once for the mode of 10 characters per inch to light the LED 12a through the inverter 200 thereby indicating the gradation 8a, then is actuated again to light the LED 12b through the inverter 201 thereby indicating the gradation 8b for 12 characters per inch, and is actuated once again to light the LED 12c through the inverter 202 thereby indicating the gradation 8c for 15 characters per inch. Also the printer control unit 16 controls the carriage driving motor 18 so as to cause the displacement of the carriage 26 according to the thus selected printing pitch. The lighted LED, being mounted on said carriage 26, also serves to indicate the carriage position. Also in response to each actuation of the key 10d, one of light-emitting diodes La, Lb, or Lc is lighted in a display unit L1 in the keyboard 10 to indicate which printing pitch is selected, 10 characters, 12 characters, or 15 characters per inch, respectively.

As explained in the foregoing, the present embodiment, being provided with plural indicating means La, Lb, Lc for different printing pitches, activates one of said indicating means La, Lb, Lc corresponding to the selected print pitch, thereby allowing the operator to easily confirm the printing pitch on a scale indicated by said indicating means La, Lb, Lc, as well as the print position or the number of characters that can be printed.

Figure 14:
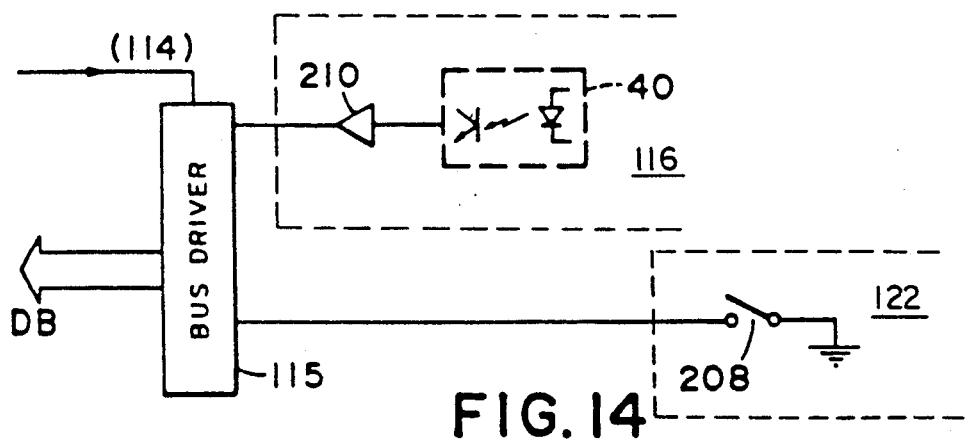

FIG. 14 shows part of the detecting unit 116 and part of the bail start motor drive unit 122 shown in FIG. 7. A transistor 206 is provided to drive a paper bail start DC motor 207 to which a paper bail 250 (FIG. 2) and a microswitch 208 (FIG. 14) are linked. Thus, in response to an instruction for the automatic loading of the printing sheet from the keyboard 10, the transistor 206 is activated through the latch 123 to drive the DC motor 207, which releases the paper bail 250 from the platen 17 and subsequently closes the microswitch 208. A bus driver 115 receives a signal when the microswitch 208 is closed and also receives a signal through a single-input AND gate 210 from the detector 40 in the presence of a reflecting plate 41. In response to the microswitch function detected through the bus driver 115, the MPU' 110 sets a number determined by the MPU 44 in the counter 172 in FIG. 8 and drives the paper feeding stepping motor 14 until the counter 172 reaches the zero count state. Thereafter the paper bail 250 again comes into contact with the printing sheet, and microswitch 208 is opened. In response to said opening the MPU' 110 turns off the transistor 206 through the latch 123 thereby stopping the DC motor 207.

Figure 15:
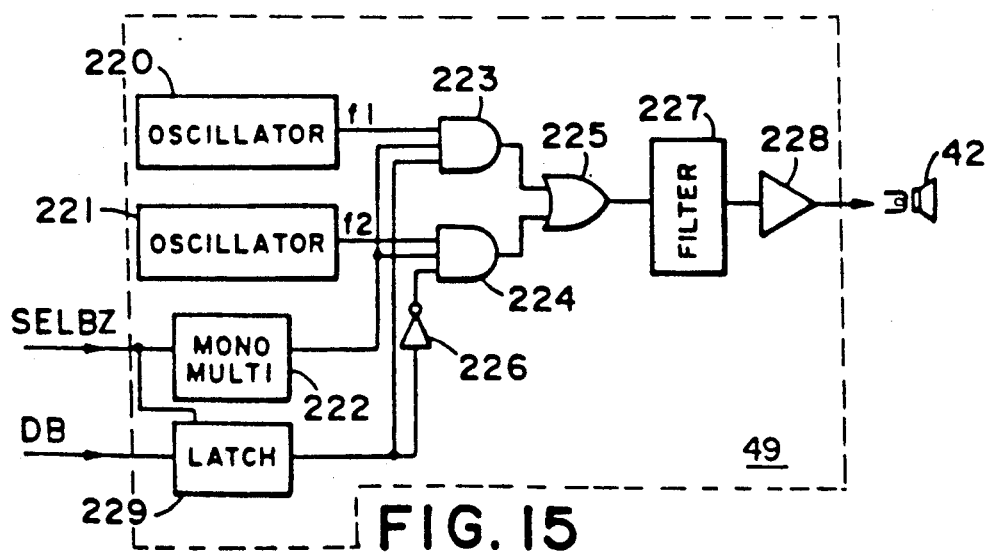
FIG. 15 is a circuit diagram of the alarm control unit shown in FIG. 6-2.

FIG. 15 shows the details of the alarm control unit 49 shown in FIG. 6-2 wherein provided are oscillators 220, 221 oscillating at mutually different frequencies f1 and f2; a monostable multivibrator 222 for determining the duration of the sound alarm in response to the signal SELBZ; a latch 229 for supplying the output signal of the oscillator 220 or 221 to the loud speaker 42 through AND gates 223, 224 and OR gate 225 under the control of the MPU 44; an inverter 226 to ensure that at most one AND gate 223, 224 is open; and a filter 227 for modulating the square waves from the gate 225 to a pleasant waveform for supply to said loud speaker 42 through an amplifier 228.

As explained in the foregoing, the present embodiment is provided with counting means in various control units for controlling the printing pressure, amount of ribbon advancement, amount of sheet feeding, etc.

according to the characters to be printed, and, the digital control of the apparatus is facilitated in this manner.

Figure 16:
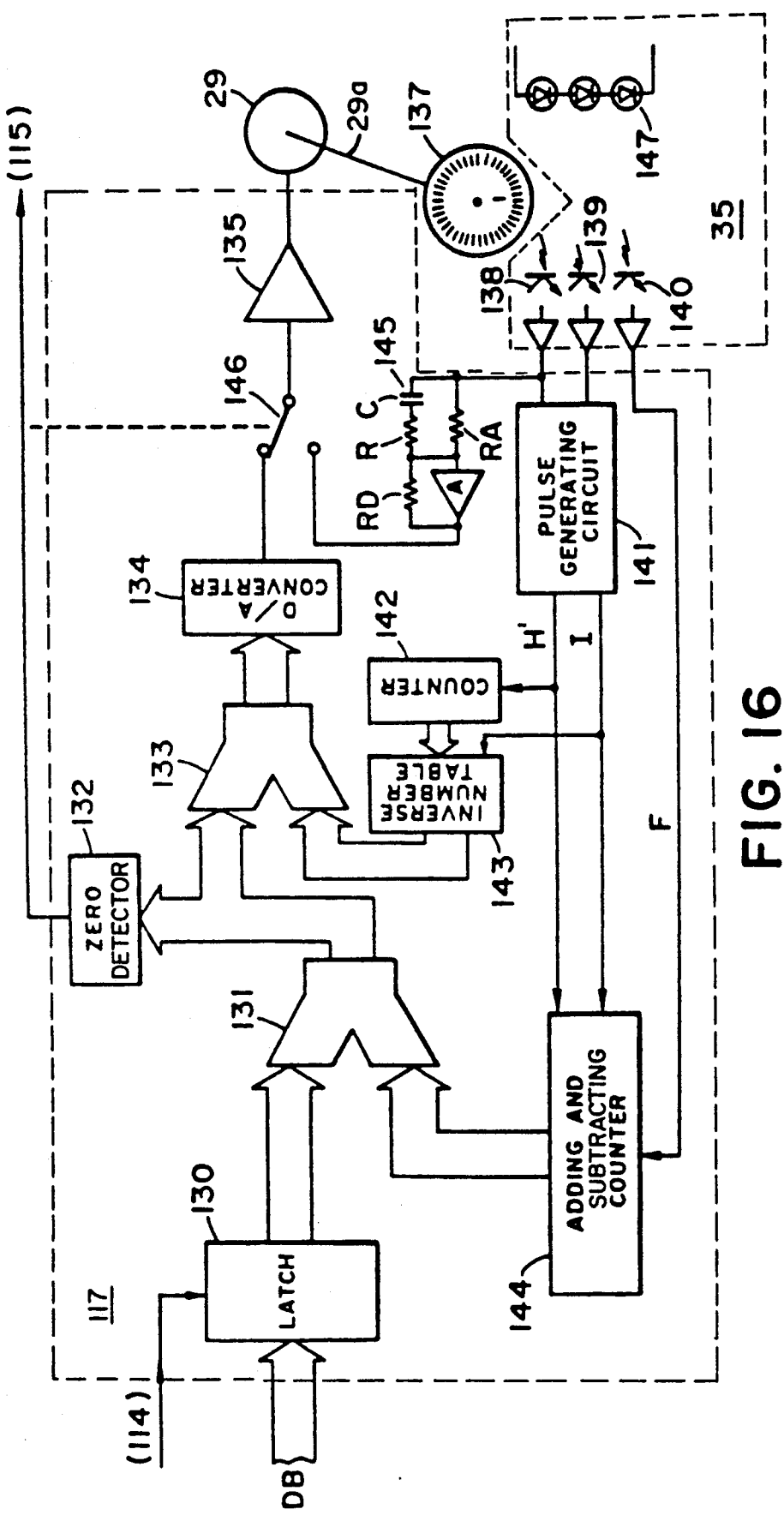
FIG. 16 is a circuit diagram of the type selecting motor control unit shown in FIG. 7.

Now reference is made to FIG. 16 showing the details of the type selecting motor control unit 117 (FIG. 7) for the type selecting motor 29, wherein provided are a latch 130 for storing key information supplied from the MPU 44 to the MPU' 110 and converted into the positional information on the typefont wheel 30 by the aforementioned character position table 125; adder/subtracters 131, 133; a zero detecting circuit 132; a digital-to-analog (D/A) converter 134 for converting the digital result of calculation by adder/subtracter 133 into a voltage; a power amplifier 135; a type selecting motor 29 of which the shaft 29a is directly connected to the typefont wheel 30 (not shown) and a slitted disk 137 constituting an encoder 35. Across said disk 137 there are provided LEDs 147 and phototransistors 138, 139, and 140, in which the phototransistors 138 and 139 are so positioned as to provide signals of a phase difference of 90° while the phototransistor 140 is so positioned as to provide an index output signal for each turn of the motor 29. Based on the signals from said phototransistors 138, 139 a pulse generating circuit 141 generates a signal I for identifying the rotating direction and a signal H' giving a pulse for each rotation corresponding to a character.

An adding and subtracting counter 144 adds or subtracts, according to the signal I, the count for each signal H', and the counter 149 is reset upon receipt of a signal F. In this manner the count of the counter 144 indicates the rotation angle of the slitted disk 137 or the typefont wheel 30 with respect to a determined position of said disk 137.

An interval counter 142 counts the time interval of the pulses H' from the circuit 141, and the obtained count, being inversely proportional to the rotating speed of the motor 29, is converted by an inverse number table 143 to a value proportional to the speed.

A servo control is obtained by calculating the positional error in the adder/subtracter 131, then subtracting the speed obtained from the inverse number table 143 from the above-mentioned positional error, and driving the motor 29 according to the thus obtained difference. The circuit 132 for detecting zero positional error transmits the zero detection to the MPU' 110 through the bus driver 115 and simultaneously changes over a switch 146 from the side of the D/A converter 134 to the side of a circuit 145 for forming a signal in the interval between slits. Said circuit 145 is composed of a resistor RA for passing the substantially sinusoidal signal from the phototransistor 138 in parallel with a serial circuit comprising a condenser C and a resistor R for passing said sinusoidal signal and a second resistor RD in parallel with an amplifier A. Thus, after the MPU' 110 detects the zero error signal detected by the zero detecting circuit 132, the wheel 30 is stopped by the circuit 145 and the printing hammer 32 is activated to perform the printing. In this manner it is rendered possible to provide a preferable servo control process in which the wheel 30 can be stopped exactly and rapidly at the destination with the extremely simple and inexpensive structure explained above.

Figure 17:
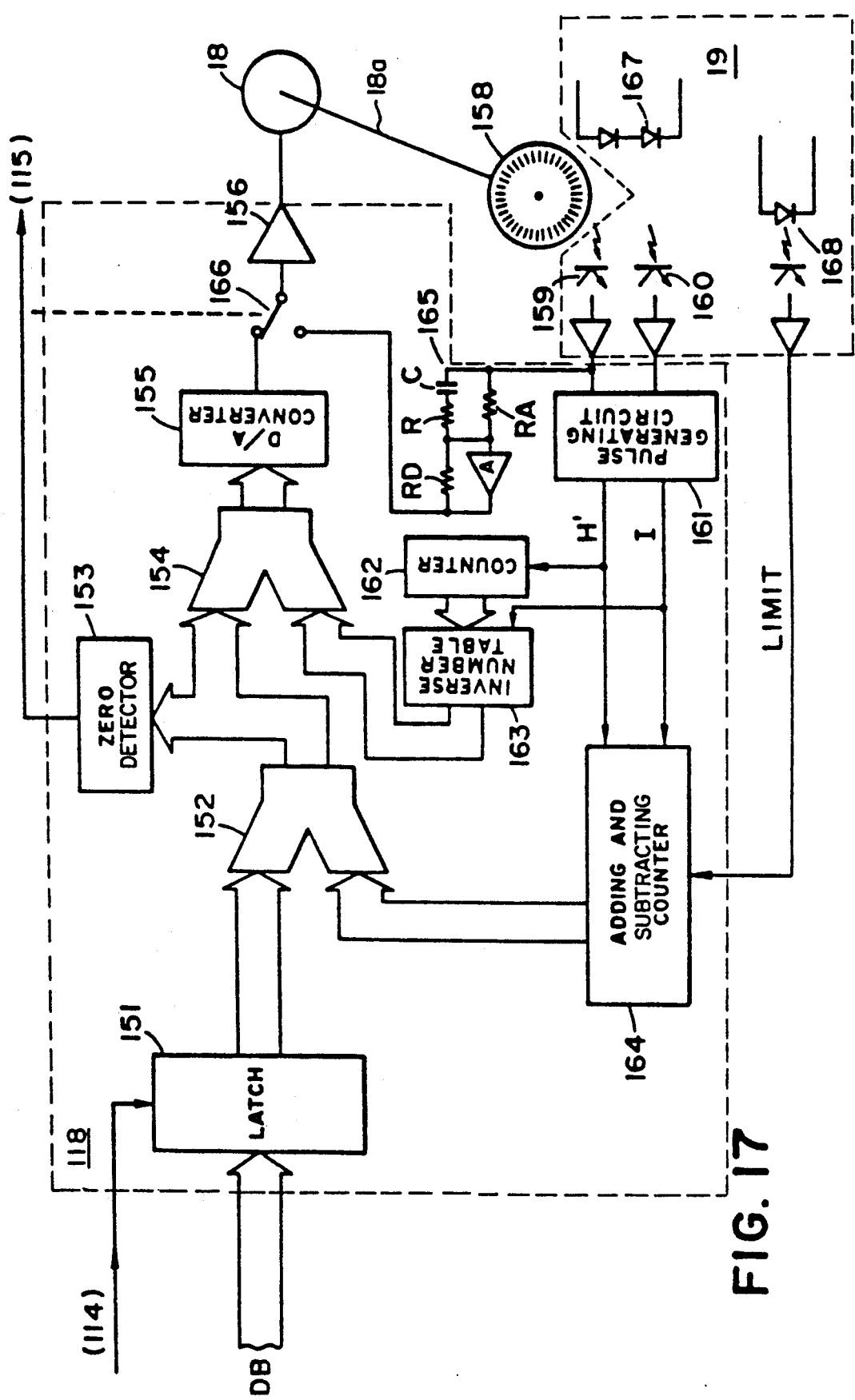
FIG. 17 is a circuit diagram of the carriage driving motor control unit shown in FIG. 7.

FIG. 17 shows the details of the carriage driving motor control unit 118 for the carriage driving motor 18 shown in FIG. 7, having a servo control structure similar to that employed in the type selecting motor 29.

The MPU 44 transfers, to the MPU' 110, the instruction on the relative amount of displacement and direction from the present location of the carriage 26. The MPU' 110 adds or subtracts the relative amount to or from the present location according to the direction of displacement and transfers the obtained destination to a latch 151. The latched value and the output from an adding and subtracting counter 164 obtained according to the signal from a pulse generating circuit 161 are subjected to the addition or subtraction in an adder/subtracter 152 to obtain a positional error. An adder/subtracter 154 subtracts the speed of the carriage driving motor 18 obtained through a counter 162 and an inverse number table 163 from said positional error, thus achieving a servo control of the motor 18 through a D/A converter 155 and an amplifier 156. Upon zero detection by the zero detecting circuit 153, a switch 166 is changed over to stop the carriage displacement in a similar manner as explained in the foregoing. Signals similar to the foregoing are obtained from LEDs 167 and phototransistors 159, 160 positioned across a slitted disk 158 mounted on the shaft 18a of said motor 18. In this case, however, a counter 164 receives a LIMIT signal obtained from an element 168 comprising an LED and a phototransistor indicating the left-hand end of the carriage displacement, instead of the index signal F generated at each turn in the case of the type selecting motor 29. Also a circuit 165 similar to the circuit 145 is provided.

Figures 1, 18:
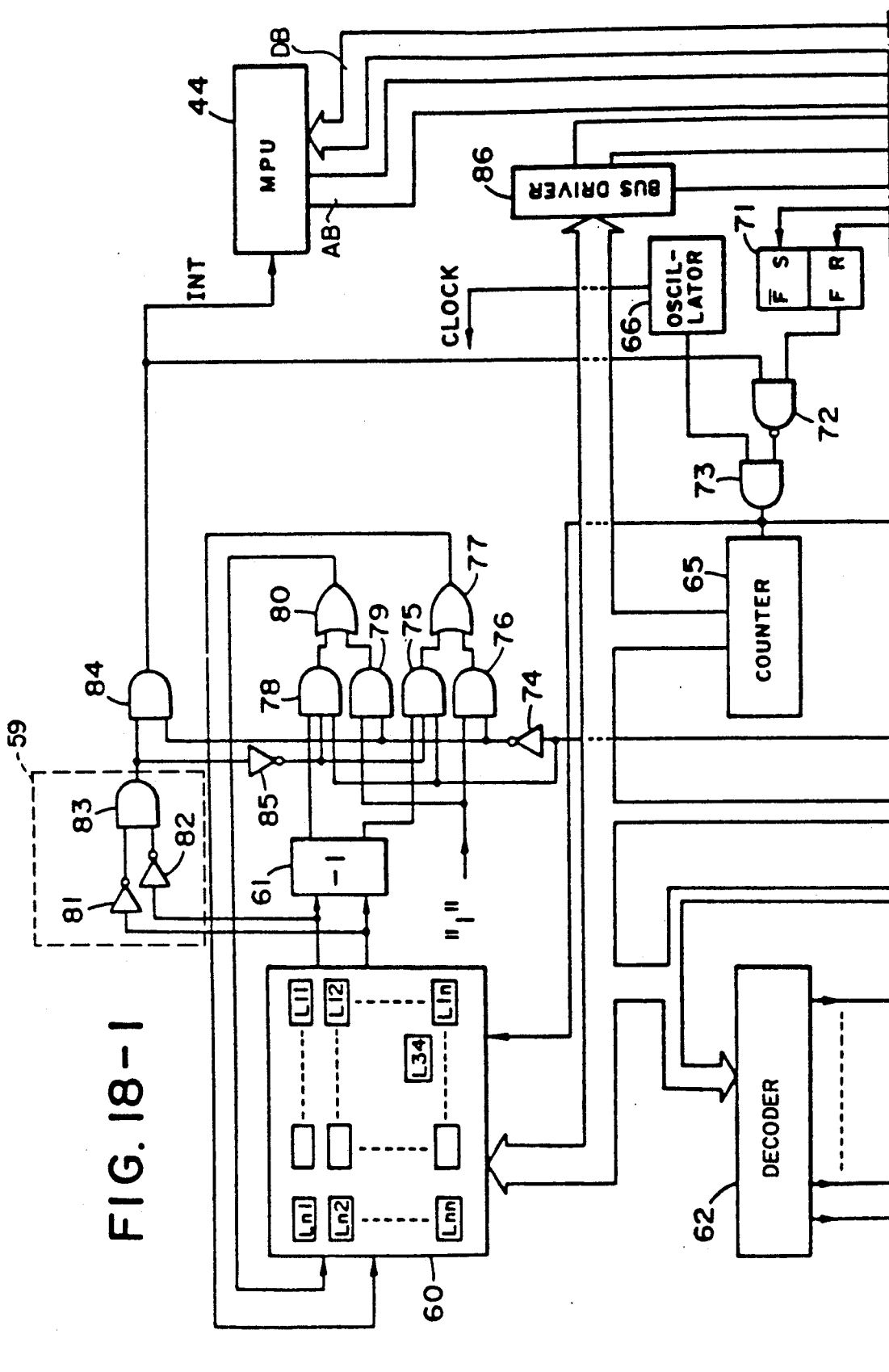
FIG. 18 shows the manner in which FIGS. 18-1 and 18-2 should be arranged.
Figures 2, 18:
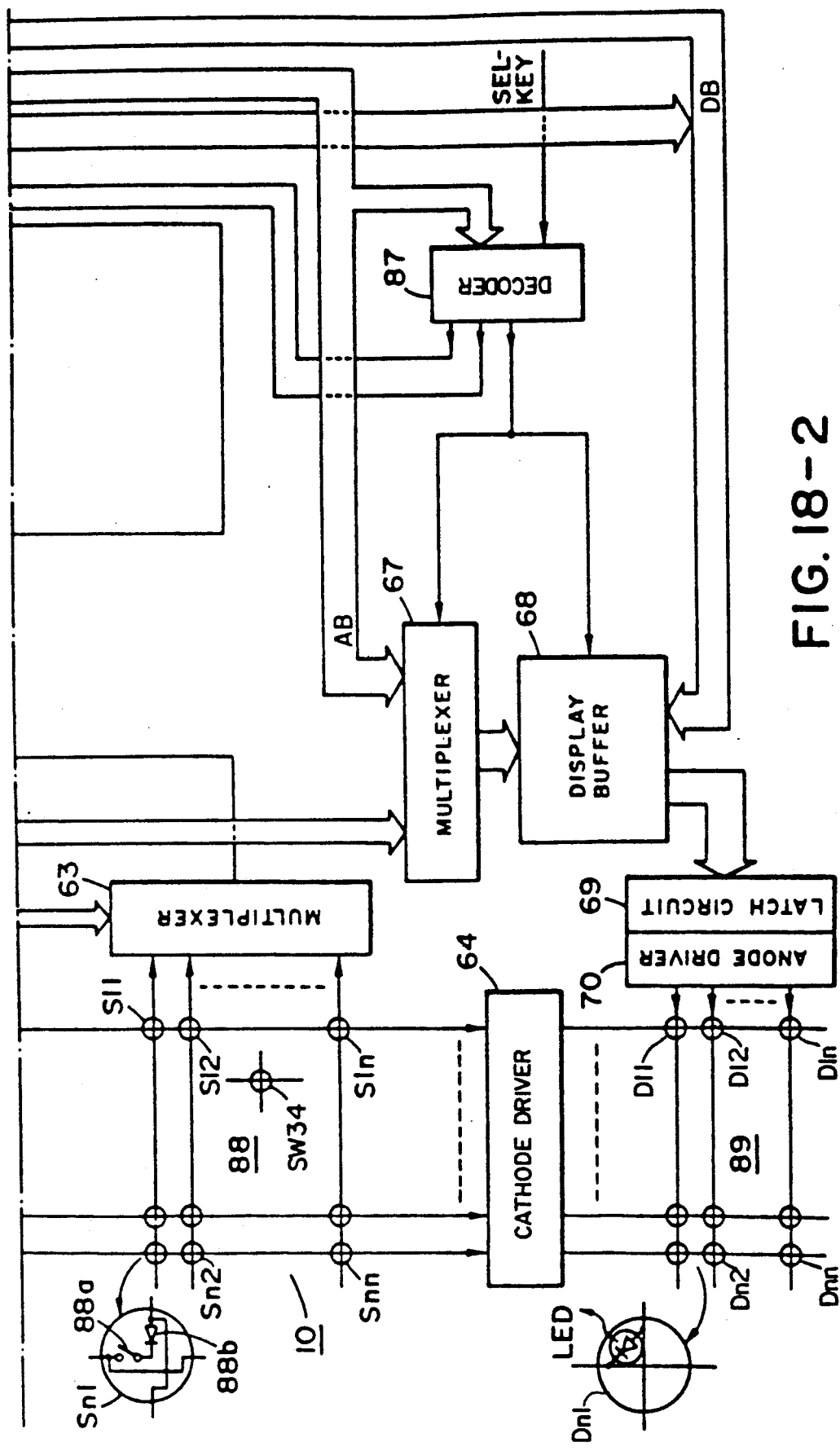

FIG. 18 shows the manner in which FIGS. 18-1 and 18-2 should be arranged. Now reference is made to FIGS. 18-1 and 18-2 showing key input devices allowing rapid and secure key entries and adapted for use in an electronic typewriter.

In the conventional key input device there is generally employed a method of accepting the key input information only after the key signal is stabilized or plural readings of the key signal have resulted in a same result. For this reason a rapid key information entry is difficult.

Also in case a key signal during the course of stabilization is interrupted for some reason, the apparatus may regard that the key has been actuated twice despite the fact that the key was actuated only once.

The embodiment shown in FIGS. 18-1 and 18-2 provides key input devices not associated with the above-mentioned drawbacks and allowing rapid and accurate key entries with a simple structure.

In FIGS. 18-1 and 18-2 groups of addressable latches 60 are provided with memory cells or latches Lll–Lnn respectively corresponding to the lattice points Sll–Snn of a key matrix 88 of the keyboard 10. Said lattice points Sll–Snn of said key matrix 88 correspond to the input keys shown in FIG. 1, including not only the unlocking keys such as character keys 10a, control keys 10b and 10c, but also the locking slide keys 10e and 10f. Each of the latches Lll–Lnn, corresponding to each key, has a structure of 2 bits constituting a memory for storing the key signal. All the latches Lll–Lnn of the addressable latch group 60 are reset to "0" at the turning on of the power supply unit 13.

Each key switch 88a of the key matrix 88 is provided with a diode 88b in order to avoid stray signals in case plural keys are actuated simultaneously. In the following discussion, the key switches 88a will be designated as switches SWll–Swnn at corresponding lattice points.

There are shown also a decrementer 61; a logic circuit 59 composed of inverters 81, 82 and an AND gate 83 for zero detection of the signal read from the group of latches 60, providing a signal "1" from said AND gate 83 upon such zero detection; and AND gates 78, 79, 75, and 76 and OR gates 80 and 77 for resetting said group of latches 60.

An oscillator 66 generates synchronizing clock pulses for various units and basic signals for scanning the key matrix 88 and the LED matrix 89. The signals from said oscillator 66 are supplied through an AND gate 73 to a counter 65 so constructed as to repeat counting of the number of the lattice points Sll-Snn of the matrix 88. The counter 65 counts the signals from said oscillator 66, and the output signals on said counter 65 are utilized as the addressing signals for the addressable group of latches 60 and also divided into the upper-digit signals and lower-digit signals which are respectively supplied to a decoder 62, which may be, for example, part number 74154 supplied by the Texas Instruments Corp., and to a multiplexer 63. The microprocessing unit 44 is capable of sensing the content of said counter 65 any time through a bus driver 86 and a data bus DB. Said decoder 62 scans the key matrix 88 in the lateral direction with the increment of the counter 65, while the multiplexer 63 vertically scans the matrix 88 during one step advancement of the decoder 62.

If a key switch 88a is found closed during the vertical scanning, switch SW34 for example, the multiplexer 63 provides an output signal "0", which is inverted by an inverter 74 into "1" and supplied to the AND gates 76, 79, and 84 in order to show the content of the counter 65 at this point. At this state the latch L34 corresponding to the closed key switch SW34 releases an output "0" whereby the gate 83 provides an output signal "1" to the AND gate 84. Thus said gate 84 provides an output signal "1" which is supplied as an interruption signal INT to the MPU 44. At the same time the reset output signal F="1" of a flip-flop 71 already reset and the output signal "1" of the AND gate 84 are supplied to a NAND gate 72 to provide an output signal "0", whereby an input AND gate 73 for the counter 65 is closed to terminate the counting function of the counter 65 at a count corresponding to the closed key switch SW34. Also the output signal "0" from the multiplexer 63 retains the AND gates 75 and 78 closed but opens the AND gates 76 and 79 thereby causing the OR gates 77 and 80 to provide output signals "1", which are used as the input signals for the latch address by the counter 65 corresponding to the closed key switch SW34. The group of latches 60 are so structured as to latch the input signal in synchronization with the output signal from the input AND gate 73 for the counter 65, so that the latch address is not changed but remains corresponding to the closed key switch SW34 while the function of the counter 65 is stopped. In response to the aforementioned interruption signal INT, the MPU 44 reads the count of the counter 65 through the bus driver 86 to identify the closed key switch SW34, thus accepting the input information from key S34. Thereafter the MPU 44 releases an acknowledging signal "1" to the set input port of a flip-flop 71 through the address bus AB and a decoder 87 to release a set output signal $\bar{F}$="0" from said flip-flop 71, whereby a NAND gate 72 provides an output signal "1" to open the gate 73, thus re-starting the counting action of the counter 65. Simultaneously the output signal from said gate 73 sets "11" in binary code, or "3" in decimal code, in the latch L34 corresponding to the closed key switch SW34. In response to the re-start of counting by the counter 65, the flip-flop 71 is reset for the next key detection.

In case said key switch SW34 is still closed after the scanning of all the lattice points Sll-Snn of the key matrix 88 (this situation is normally encountered in the usually employed scanning speed), the multiplexer 63 again provides an output "0", but the corresponding latch L34 provides an output "3" to give output signals "0" from the gates 83 and 84, whereby the interruption signal INT is given to the MPU 44 and the AND gate 73 is closed. Consequently, the counter 65 continues the counting operation as if the key switch SW34 were not closed. However, since the AND gates 75 and 78 are closed by the output signal "0" from the multiplexer 63, a signal "3" is again set in the latch L34 corresponding to the closed key switch SW34 through the AND gates 76, 79 and OR gates 77, 80. In this manner the signal "3" is repeatedly set in said latch L34 while the corresponding key switch SW34 is closed. Then, when said key switch SW34 is opened, the multiplexer 63 provides an output signal "1" at each scanning to close the AND gates 76, 79 and to open the AND gates 75, 78 through the inverter 74, whereby a number step-decreased by the decrementer 61 is set in said latch L34 through the OR gates 77 and 80. In this manner the content of said latch L34 changes from "3" to "0" in succession. When said latch L34 finally releases an output signal "0", the AND gate 83 of the zero detection circuit 59 provides an output "1", which is converted to "0" by an inverter 85 and closes also the AND gates 75 and 78. Thus the OR gates 77, 80 release output signals "0" to set said latch L34 and all other latches Lll-Lnn to "0" in response to the counting operation of the counter 65.

Figures 1, 19B:
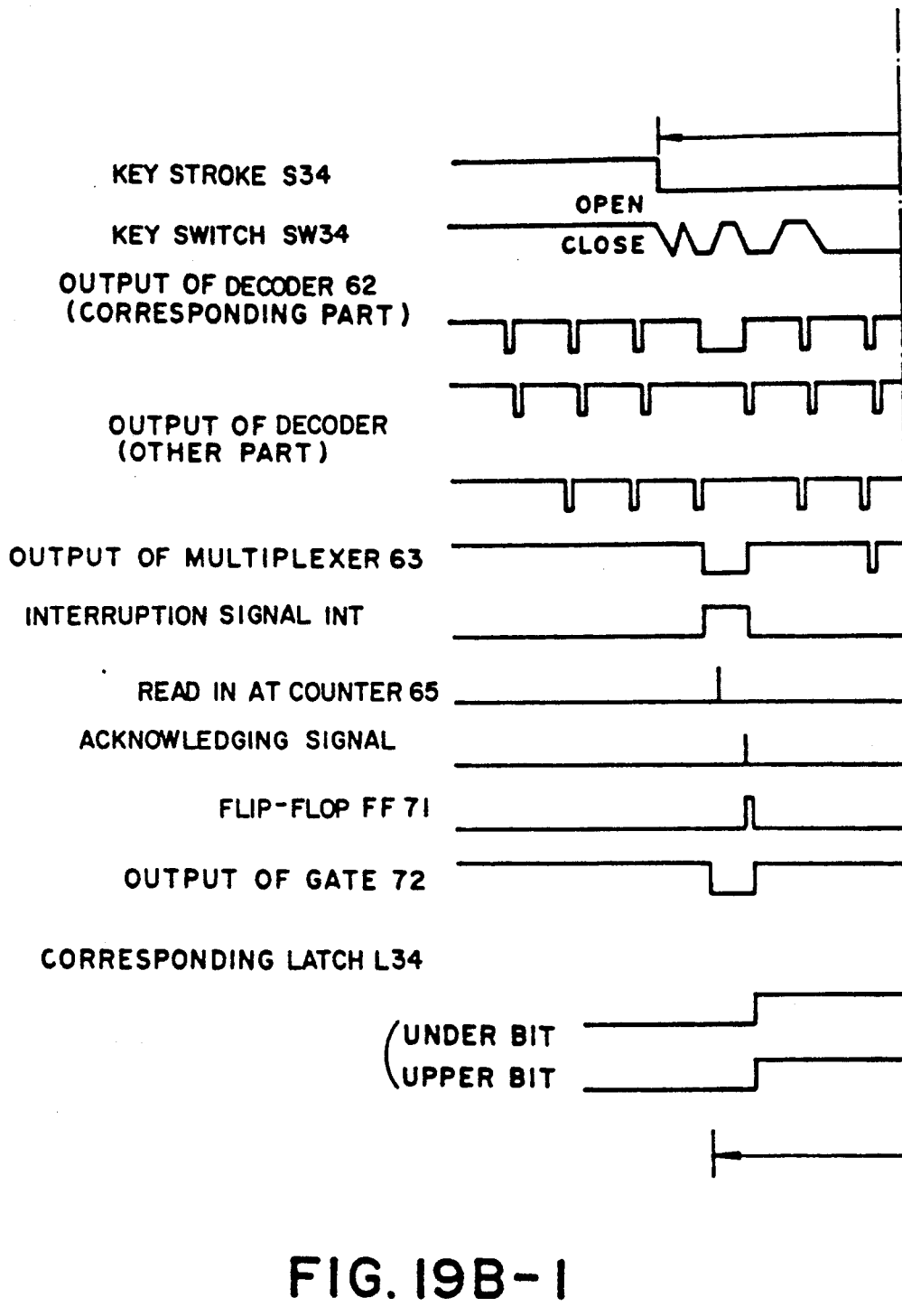
FIG. 19B shows the manner in which FIGS. 19B-1 and 19B-2 should be arranged.
Figures 2, 19B:
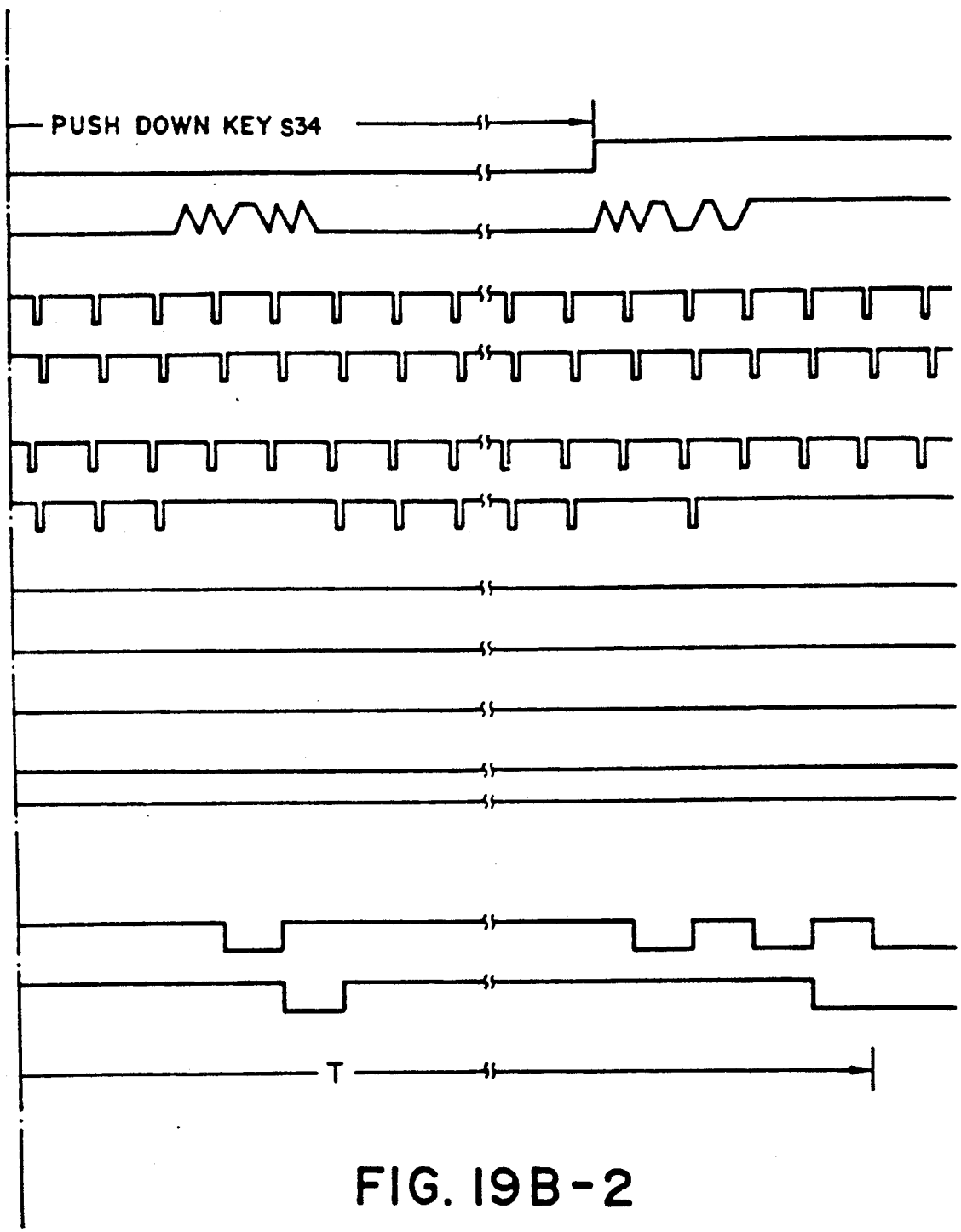

FIGS. 19A, 19B-1 and 19B-2 show the various signals when a key S34 is actuated in a 4×4 key matrix. FIG. 19B shows the manner in which FIGS. 19B-1 and 19B-2 should be arranged. In FIGS. 19B-1 and 19B-2, T represents the duration of the actuation of the key S34 as identified by the circuit.

As explained in the foregoing, the present key input device is so structured as to accept the key signal at the first scanning after the key switch is actuated and not to accept said key signal in the succeeding scannings by the output of the latch storing the key signal and is therefore capable of rapid signal reading, since even an unstable key signal is accepted at the first scanning and is not accepted thereafter.

Also the present key entry system, accepting the key signal only at the first scanning, allows to use the key matrix not only for momentary keys but also for locking slide keys such as the keys 10e, 10f shown in FIG. 1. For the same reason, the so-called N-key roll over method is easily applicable.

The key signals entered in this manner by the key actuations are processed by the MPU 44 and supplied to the printer control unit 16 for performing the determined printing operation.

As shown in FIG. 18-2 a circuit is provided for displaying the actuated input keys Sll-Snn with light-emitting diodes Dll-Dnn, wherein provided is a cathode driver 64 for dynamic driving of the light-emitting diodes Dll-Dnn in an LED matrix 89 in response to the output from the decoder 62. A multiplexer 67 receives the upper digit signals which are the same as those supplied to the decoder 62 from the counter 65 and an address bus AB for supplying the display information from the MPU 44 to a display buffer 68. The lighting operation is achieved by reading the content of an address in the buffer 68 corresponding to the count of said counter 65, storing said content in a latch circuit 69 and driving an anode driver 70 accordingly. Also a change in the lighting state is achieved by designating the buffer 68 by the decoder 87, whereby the multiplexer 67 connects the address bus AB to the buffer 68, and by designating the changed address from the address bus AB to transfer the changed data from the data bus DB to said buffer 68.

It is to be noted that the present embodiment is capable of allowing various functions not achievable with the conventional typewriters. In the following are explained such functions of which usefulness will be made evident from the corresponding key manipulations. Even the ordinary keys found in usual typewriters can perform unique functions when used in combination with certain keys belonging to the present embodiment. In the following the functions and operating procedure of the keys are explained first, and the control process relating to particular keys for specific functions will then be explained. In this manner the electronic typewriter of the present embodiment will be further clarified.

Figure 20:
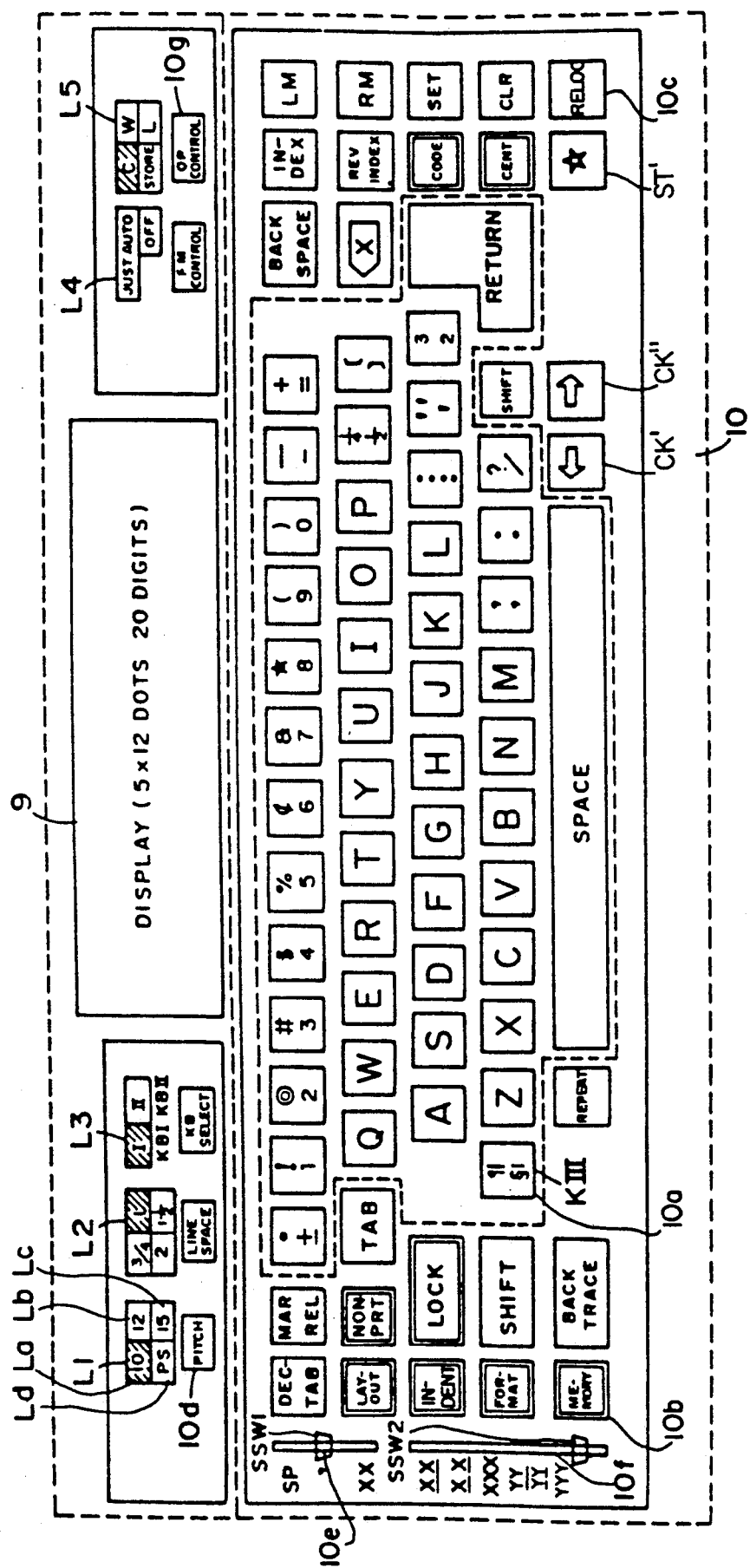
FIG. 20 is a detailed plan view showing an example of the control panel of an electronic typewriter shown in FIG. 1.

FIG. 20 shows, in a front view, the control panel of the electronic typewriter of the present embodiment, wherein one of the mode keys 10d is labeled PITCH and designates the number of characters, sometimes referred to hereinafter and in the claims as indicia, per inch as explained in the foregoing. Upon actuation of said PITCH key 10d the display in a display unit L1, composed for example of light-emitting diodes La, Lb, Lc, Ld, is shifted cyclically in the order of "10", "12", "15", and "PS", in which PS stands for proportional spacing with a variable number of characters per inch according to the characters printed. Another of the mode keys 10d is labeled LINE SPACE and selects the amount of the line space wherein 1/6 inch is taken as the unit amount. Similarly, the portions labeled "¾", "1", "1½", and "2" in the display unit L2 are cyclically lighted in turn upon actuation of said LINE SPACE key. Still another of the mode keys 10d is labeled KB SELECT and is utilized for selecting a character in a key 10a representing three characters, for example, a key KIII. In the present embodiment the lamp I in the display unit L3 indicates the characters " " and "§" which are further selectable by the control key 10b labeled SHIFT, while the lamp II indicates the character "|". Either of said lamps I and II is lighted by actuating the KB SELECT key.

One of the mode keys 10g is labeled FM CONTROL and selects one of three function codes JUST, AUTO, and OFF as indicated by the lamps of the display unit L4. The lamp JUST indicates a function of "right justification" in which right-hand ends of the lines are aligned, while a lamp AUTO indicates a function of automatic line feeding. A lamp OFF indicates no particular function instructed. Another of the mode keys 10g is labeled OP CONTROL and is utilized for determining the output printing mode of the electronic typewriter, wherein the lamps C, W, L, and STORE are cyclically lighted in the aforementioned manner. C, W, and L respectively indicate the printing by a character, by a word, and by a line, and STORE means the storage in an internal memory 54, in which the line printing mode L is employed.

A locking slide key 10e is designated in this embodiment as key SSW1 and is related to the decimal tabulator function for figures. It selects printing of figures in 3-digit groups separated by a space when positioned at "SP", or printing of figures in 3-digit groups separated by a comma when positioned at ",", or printing of figures without such grouping when positioned at "XX". A locking slide key 10f is designated in this embodiment as key SSW2 and selects the kind of type or underlined printing. "X X" stands for boldfaced type with a continuous underline, "X X" for boldfaced type with an underline for each word, "XXX" for boldfaced type, "Y Y" for ordinary type with a continuous underline, "Y Y" for ordinary type with an underline for each word, and "YYY" for ordinary type. There are also provided control keys 10b including keys labeled DECTAB for instructing the decimal tabulator function; LAYOUT with a lamp for instructing the column layout function; INDENT with a lamp for instructing an automatic indent mode; FORMAT with a lamp for giving instructions on page formatting; MAR REL for releasing left and right margins; MEMORY for initiating storage in the memory 54; NONPRT for reviewing the sentence memory; and REPEAT for repeated printing or entry of a character. Further provided are keys 10b labeled SHIFT for entering upper case characters or for certain special functions in combination with other keys; LOCK for locking said SHIFT key; BACK TRACE for correction of printing involving preceding lines; and TAB for advancing the carriage 26 to the next tabulator stop position. Also provided are control keys 10c including keys labeled BACK SPACE for shifting the printing position toward the left; X for erasing a character; INDEX for line feed of the printing sheet; REV INDEX for reverse line feed of the printing sheet; CODE with a lamp for special instructions in combination with other keys; CENT with a lamp for centering of the printing;   for interrupting the printing; LM for setting the left margin position; RM for setting the right margin position; SET for setting the tabulator stop positions; CLR for clearing the tabulator stop positions; RELOC for displacing the carriage 26 to the last printed position; and ← and → for moving the cursor on the display unit 9; as well as a second SHIFT key.

Surrounded by the broken line are character keys 10a, including keys labeled SPACE for shifting the carriage 26 towards the right for making a space and RETURN for returning the carriage 26 to the left-end position and line feeding the printing sheet.

FIG. 21 shows the internal structure of the flag group 50 shown in FIG. 6-2, wherein provided are the following flags.

A flag KB2 is set when the KB SELECT key is set to mode II to enable the key KIII to print "|" and is reset when the KB SELECT key is set to mode I. An INDENT flag is set at the start of the automatic indent mode in which the carriage 26 is always returned to a temporary left-hand margin stop position and is reset when said automatic indent mode is cancelled. An STR flag is set when the OP CONTROL key selects the mode STORE and is reset at the selection of any other mode. A flag TR is set at the input of a title followed by the actuation of the RETURN key for the purpose of referring to a character row and is reset when said reference is cancelled. A flag NP is set when the NONPRT is actuated and is reset when the reference to the character row is cancelled. A flag SC indicating the entry of a character row for searching is set upon entry of the character row for reference and is reset when the reference to the character row is cancelled. A flag CMV is set when one of four centering modes is established and is reset when the centering mode is cancelled. A flag TCNT is set when a centering mode between tabulator stop positions is instructed, a flag MCNT is set when a centering mode between the margin stop positions is instructed, a flag PCNT is set when a centering mode between designated positions is instructed, and a flag WCNT is set when a centering mode between words is instructed. Flags TCNT, MCNT, PCNT, and WCNT are reset when the corresponding centering mode is cancelled.

FIG. 22 shows the internal structure of the register group 51 shown in FIG. 6-2. A register LEPT indicates the last position of the characters stored in the line buffer 52. A register PRTEPT indicates the print end point in the characters stored in the line buffer 52. A register CRGPT indicates the position of the carriage 26 from the left margin stop position on the printing sheet, thus representing the displacing distance of the carriage 26 from said position. A register DCRGPT stores the amount of displacement to be performed by the carriage 26 in the word-unit (W-mode) or line-unit (L-mode) printing mode in which the carriage 26 is not displaced immediately after the entry of key signals. A register PITCH stores the printing pitch information selected by the PITCH key 10d, so that the MPU 44 can read the printing pitch from said register PITCH. A register LNSP stores the amount of line feed or the selection state of the LINE SPACE key. Registers FMC and OPCONT respectively store the states of the FM CONTROL key and the OP CONTROL key. Registers LM and RM store the left and right margin stop positions in the same unit as in the register CRGPT. Registers SSW1 and SSW2 store the state of the keys SSW1 and SSW2 on the control panel. A register DLM is utilized for diverting the left margin stop position in case of the automatic indentation mode.

Also registers TAB1 to TABn respectively store the tabulator stop positions in the same unit as in the register LM. A register WORK is utilized for temporary storage or diversion of the information during other control processes. A register CPT is utilized in the correction process and indicates a point in the line buffer 52 corresponding to the carriage position. This register WORK stores the data of printed characters and associated printing pitch, etc. and supplies, when a correction is needed, said data to the MPU 44 from the older data to the newer data in the same manner as in a first-in-first-out stack to inversely reproduce the displacement of the carriage 26 and the advancement of the printing sheet, thus allowing the carriage 26 to reach the final character position of the previously printed line. Also a register LC stores the number of lines advanced on the printing sheet.

Figure 23:
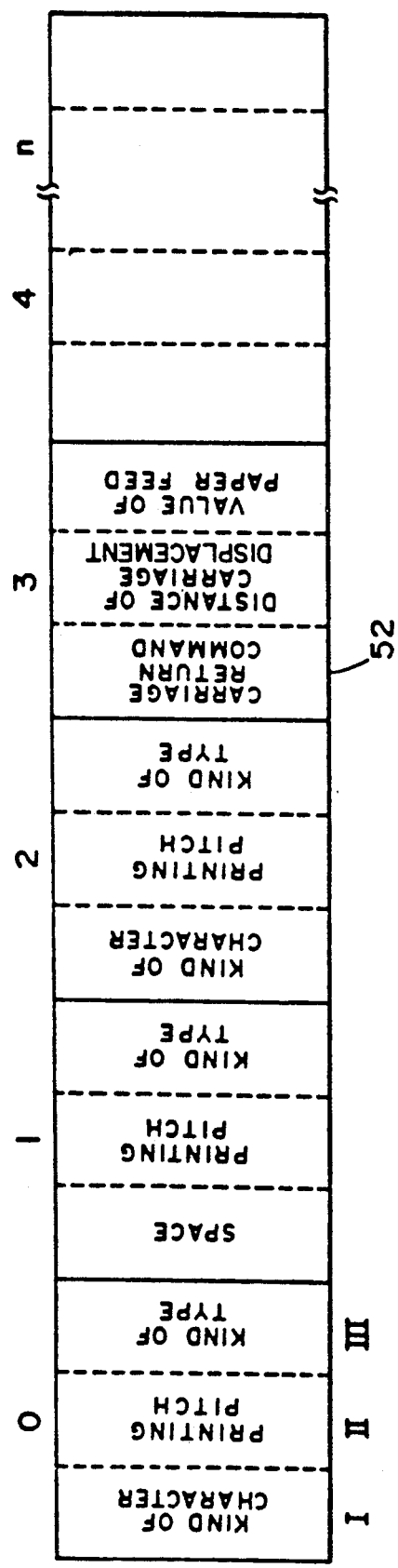
FIG. 23 is a detailed view of the line buffer shown in FIG. 6-2.

FIG. 23 shows the internal structure of the line buffer 52 shown in FIG. 6-2 having unit memories from 0 to n. In each unit memory, the addresses I, II, and III respectively store the kind of character, the printing pitch, and the kind of type which are utilized for the correction process and other purposes. The data stored in the address I are the character key information supplied from the keyboard control unit 24 shown in FIG. 6-1. The data stored in the address II represent the printing pitch corresponding to the state of the PITCH key 10d or to the content of the PITCH register. The data stored in the address III represent the kind of type corresponding to the state of the slide switch SSW2 shown in FIG. 20 or the content of the register SSW2 in the register group 51. The capacity of the line buffer 52 is so selected that it can store a number of characters in excess of the maximum number of characters in a line, for example 300 characters over 2 lines. Thus by actuation of the BACK SPACE key the carriage 26 can be returned from the left-hand end position to the final print position of the preceding line. Stated differently, such final print position of the preceding line can be calculated from the carriage displacing instruction, distance of carriage displacement, and amount of line feed, all stored in said line buffer 52. Even when said preceding line is printed with a blank space at the left-hand end of the line, a memory area of the line buffer 52 preceding to the first character in said line stores a code corresponding to a space in the address I, a printing pitch in the address II, and a non-print code in the address III as the kind of type, so that the displacement of the carriage 26 to the final print position of the preceding line is made possible by decoding the thus stored data by the MPU 44 in an order opposite to that in the data entry.

In the system as explained in the foregoing, the control sequence is initiated at the turning on of the power supply unit 13 to the electronic typewriter. Immediately after the start of power supply, the control units 24, 16, 48, 49, etc. shown in FIGS. 6-1 and 6-2 are initialized. Then the register group 51, line buffer 52, and flag group 50 are cleared. Subsequently, in order to restore the state before interruption, the data of the entire register group 51 stored in a non-volatile memory 57 shown in FIGS. 6-1 and 6-2 are recalled to the register group 51. At the same time, according to the states of various registers, the lamps for the PITCH, LINE SPACE, FM CONTROL, and OP CONTROL keys are controlled and the carriage indicator lamp 12 is lighted. Similarly the lamp of the KB SELECT key is controlled by the state of the KB2 register stored in the secondary memory 57.

In this manner it is possible to restore the state immediately before the interruption even when the power supply unit 13 is turned off or interrupted by a line failure. Then in response to the actuation of a key, 10a–10g, there is initiated a key discriminating sequence for distinguishing character keys 10a from control keys 10b, 10c. Said discrimination is achieved by the value of the key signals. The character keys 10a are distributed continuously on the key matrix 88 shown in FIGS. 18-1 and 18-2, and the control keys 10b, 10c are similarly distributed continuously, so that there results a boundary value between the group of character keys 10a and the group of the control keys 10b, 10c. Consequently, it is rendered possible to discriminate a key 10a–10g by comparing the corresponding key signal with said boundary value. In case a character key 10a is identified, there is executed a process on the line buffer 52. As shown in FIG. 20, the SPACE and RETURN keys are considered to belong to the character keys 10a. On the other hand, in case a control key 10b, 10c is found, said control key 10b, 10c is further identified and a corresponding control sequence is executed.

Figure 24:
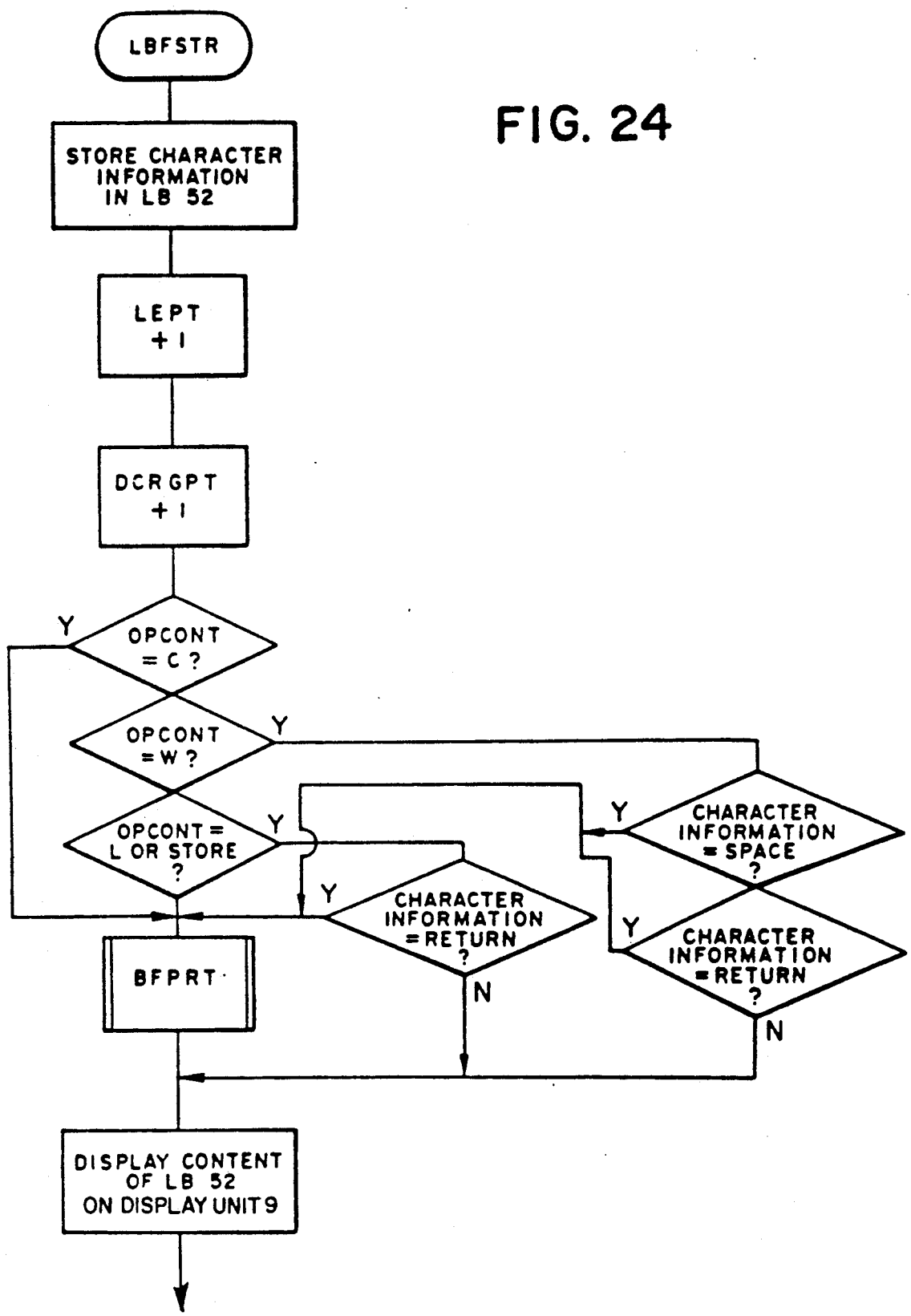
FIGS. 24 and 25 are control flow charts for said line buffer.
Figures 25, 26:
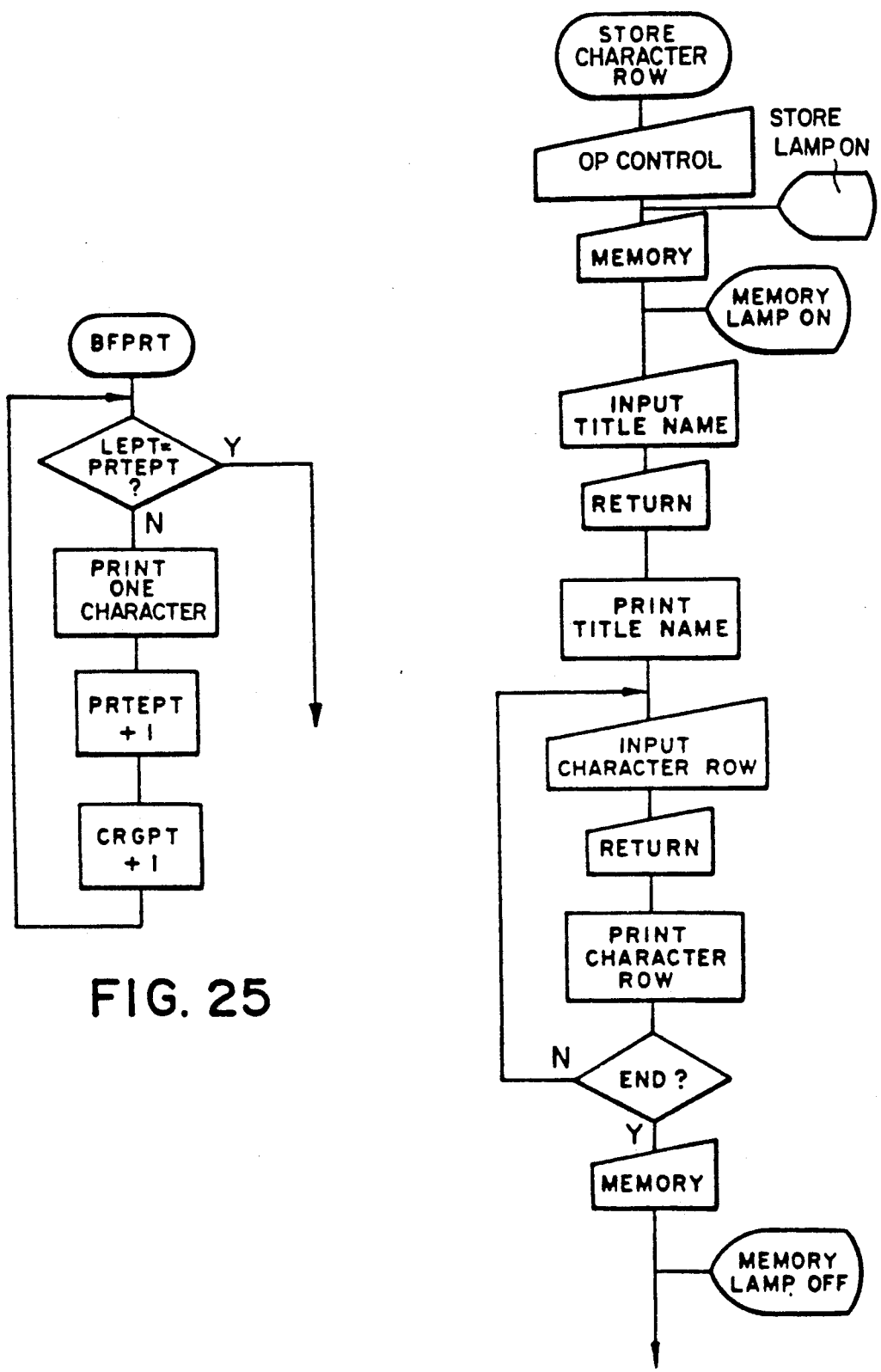
FIG. 26 is a control flow chart for key operations at the registration of characters or a sentence.

FIGS. 24 and 25 show the basic control sequences of the line buffer storage process LBFSTR. In the LBFSTR sequence shown in FIG. 24, in response to the entry of the kind of character, printing pitch, and kind of type from a character key 10a to the line buffer (LB) 52, the registers LEPT and DCRGPT are step increased. Then the LBFSTR sequence is branched according to the content of the register OPCONT shown in FIG. 22. In case the register OPCONT indicates C-mode or character-unit printing, there is immediately initiated a print sequence BFPRT with consecutive display on the display unit 9. In the case of W-mode (word-unit printing), the entered key is identified if it is the SPACE or RETURN key, and, if it is not, the consecutive display alone is given without printing. In the case of L-mode (line-unit printing), the entered key is identified if it is the RETURN key, and, if it is not, the consecutive display alone is given without printing. In the word-unit printing mode the printing is initiated upon actuation of the RETURN or SPACE key, while in the line-unit printing mode the printing is initiated upon actuation of the RETURN key. In this manner is achieved character-unit printing and display, word-unit printing and display, or line-unit printing and display.

In case a new character is entered after the line buffer (LB) 52 is filled with the kind of character, printing pitch, and kind of type over the entire memory areas 0-n, the stored data are shifted three steps to the left and the contents of registers LEPT and PRTEPT are step reduced. In this manner the three data stored in the 0th area at the left-hand end of the buffer memory 52 are removed and the nth right-hand end memory area is emptied to accept the kind of character, printing pitch, and kind of type for the (n+1)th character. Also in response to the actuation of the SPACE or RETURN key, the related data are successively stored in the line buffer 52 as shown in FIG. 23, so that the correction of characters is possible as long as they are stored in said line buffer 52. Since the data for the SPACE or RETURN key are in this manner stored as character information together with the associated printing pitch and non-print information, it is possible to make corrections by tracing the print backward in any mode of printing.

The buffer printing (BFPRT) process is conducted according to the print control sequence BFPRT shown in FIG. 25. In said BFPRT sequence the contents of the registers LEPT and PRTEPT are compared, and, if they are mutually different, a character is printed and the registers PRTEPT and CRGPT are both step increased. This sequence is repeated until the contents of the registers LEPT and PRTEPT become mutually equal. In this manner said sequence BFPRT performs the printing of unprinted characters stored in the buffer 52. Upon completion of said sequence BFPRT, the contents of the registers PRTEPT and LEPT are mutually the same, and the contents of the registers CRGPT and DCRGPT are also mutually the same.

The procedures of storage of a character row or a sentence and of display and printing from such stored sentence will now be explained.

The key operations for the write-in of a character row or a sentence into the sentence memory 54 are conducted as shown in FIG. 26.

At first the OP CONTROL key is actuated to light the STORE lamp. Then the MEMORY key is actuated to light the MEMORY key lamp, thus indicating a state for sentence storage. Then entered are the characters for the title name, which are displayed on the display unit 9, followed by the actuation of the RETURN key, whereby the printing of the thus entered title name, the return of the carriage 26, and the line feed of the printing sheet are executed. At this point an alarm is given from loudspeaker 42 if the entered title name already exists. Thereafter are entered the characters to be stored, and the RETURN key is actuated to print and store said characters. Upon actuation of the MEMORY key, the title name is recorded in association with the entered characters and the MEMORY key lamp is extinguished. The key, if actuated during the entry of characters, will function as a temporary stop signal in the printing of the characters recalled from the memory 54.

In the following the process of character storage is explained.

Figure 27:
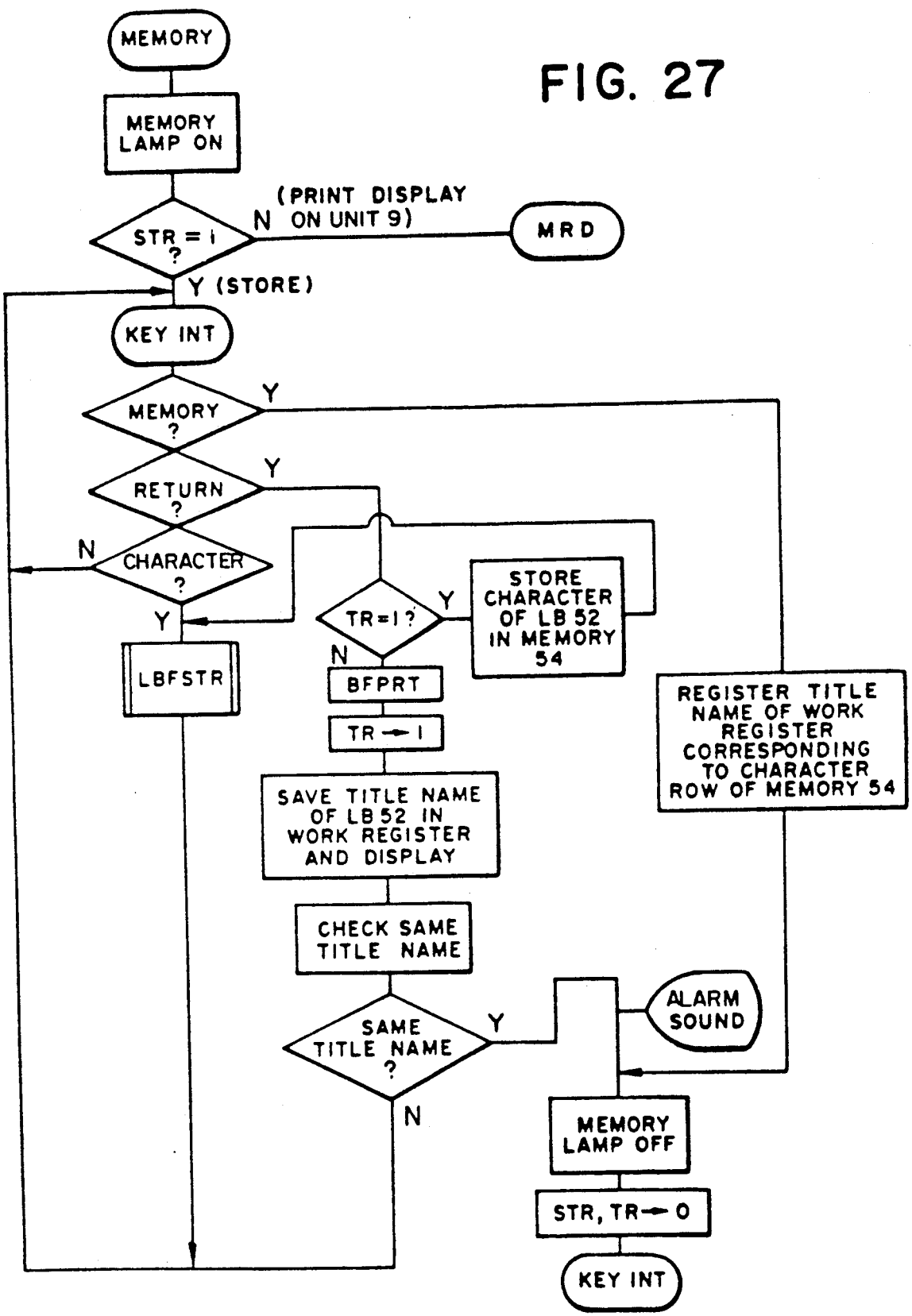
FIG. 27 is a flow chart showing the function thereof.

In FIG. 27, the MPU 44 shown in FIG. 6-1 lights the MEMORY key lamp in response to the first actuation of the MEMORY key, and checks the register STR of the register group 50 to see if the storage (STR=1) or readout (STR=0) of characters is requested. Said flag STR is set by the actuation of the OP CONTROL key to the STORE mode. In case of the character readout the program proceeds to the memory readout control sequence MRD shown in FIGS. 29-1 and 29-2. In case of character storage, the program proceeds to the next KEY INT step for awaiting key actuation, and, since the MEMORY or RETURN key is not yet actuated in this state, the program further proceeds to the next character entry step. In response to the key entry of the title name, the aforementioned buffer process routine LBFSTR shown in FIG. 22 is executed to store the characters in succession into the line buffer 52, with simultaneous display on the display unit 9. Upon completion of the entry of the title name, the RETURN key is actuated as shown in FIG. 26, and the program in FIG. 27 proceeds to the branch from the step "RETURN?". Then checked is the state of the flag TR. Since said flag TR is reset in the initial state, the program proceeds to the buffer printing routine BFPRT for printing the title name. Then the flag TR is set, the title name in the line buffer (LB) 52 is diverted into the WORK register, and the title name thus diverted is compared in the MPU 44 with all the title names stored in the sentence memory 54.

If the same title name is already registered in the sentence memory 54, an acoustic alarm is generated from the loudspeaker 42, and the MEMORY key lamp is extinguished.

If the same title name does not exist, the program awaits the following key entry at the KEY INT step. The title name in the line buffer 52 is extinguished when it is diverted into the WORK register, but the display of the title name on the display unit 9 is continued since the title name in said WORK register is supplied to the display control unit 48.

Also in response to the actuation of the RETURN key, the printing sheet having the printed title name is advanced by a line, and the carriage 26 is returned to the left margin stop position.

At this point the carriage return command, distance of carriage displacement from the left-end position, and amount of line feed are stored in the line buffer 52 in the order of key actuations as shown in FIG. 23.

Also in the carriage advancement without printing by the actuation of the SPACE key, the data for space, printing pitch, and non-print information are stored as shown in FIG. 23. Such data relating to the printing are serially transferred, together with the data for title name and characters, to the WORK register and the sentence memory 54. Also in the readout from the memory 54 for display or printing, said data are eliminated and the character information alone are displayed and/or printed.

Upon entry of characters for storage, the program proceeds to the sequence LBFSTR according to which the characters are sequentially stored in the line buffer 52 and displayed in succession on the display unit 9. Upon actuation of the RETURN key after the entry of a character row or a sentence, since the flag TR is set in this state, the characters in the line buffer 52 are stored in the sentence memory 54, and the program again enters the sequence LBFSTR and proceeds to the sequence BFPRT for printing the characters.

Succeeding storage of the sentence is achieved by the repetition of the above-mentioned procedure. During this operation, the content of the line buffer 52 is not cleared but is extinguished from the leading end only in case of overflow, and this process is effective for permitting use of the character correction process as explained in the foregoing.

In response to the actuation of the MEMORY key at the end of the entry of characters, the title name is registered in association with the thus entered characters. At the same time, the MEMORY lamp is extinguished and the flags STR and TR are reset.

Figure 28:
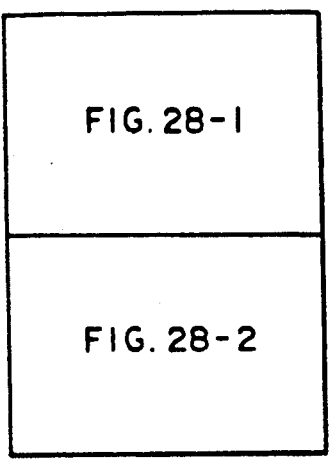
FIG. 28 shows the manner in which FIGS. 28-1 and 28-2 should be arranged.

FIG. 28 shows the manner in which FIGS. 28-1 and 28-2 should be arranged. Now reference is made to FIGS. 28-1 and 28-2 showing the key operations in the display and printing of the characters read from the memory 54.

At first the OP CONTROL key is actuated to turn off the STORE lamp. Then actuated is the MEMORY key, whereby the MEMORY key lamp is lighted to indicate the stand-by state for the display and printing of characters read from the memory 54. The display or printing is selected by the operator. In case of display the NONPRT key is actuated, whereby the corresponding NONPRT key lamp is lighted to indicate that the display mode for the characters read from the memory 54 is initiated.

In said mode, first entered is the title name, which should naturally be the same as the registered title name. Then, in case of display from a particular character row in the sentence, the operator performs the actuation of the key, entry of said particular character row, and the actuation of the RETURN key. Also, in case of the display from the start of said sentence, the operator merely actuates the RETURN key following the entry of the title.

Upon actuation of the RETURN key there are displayed for example 20 characters from the beginning of the sentence. At this state the cursor position on the display unit 9 can be displaced by word units with the ← or → key, and deletion, insertion, etc. is made possible by the BACK SPACE and X keys. The display is terminated by the actuation of the MEMORY key. Also the entire display of characters can be delected by the actuation of the key CLR while said characters are displayed on the display unit 9. Upon actuation of the MEMORY or CLR key, the NONPRT and the MEMORY key lamp are extinguished.

The printing of stored characters can be achieved in at least in three forms, i.e., the printing of the entire sentence without title, the printing of the entire sentence with title, or the printing of the first two lines of said sentence with title. These printing forms are respectively achieved by the entry of the title name, followed by the entry of "/0", "/1", or "/2" further followed by the actuation of the RETURN key. Also the entry of "/0" may be omitted in the first form. The printing is initiated immediately after the RETURN key is pressed. Also as explained in the foregoing, the printing can be temporally interrupted at a position of the key entered in the course of character entry. Also the printing can be interrupted at any point by the actuation of the key during the course of printing. After the completion of printing of a sentence corresponding to a title name, said printing can be repeated by simply actuating the RETURN key. Also by actuating "/2" without title name in the third form, there are printed all the registered title names respectively accompanied by two lines of sentence. The present mode can be terminated by actuating the MEMORY key, whereupon the MEMORY key lamp is turned off to indicate the termination of said mode. In the following are explained the internal functions corresponding to the above-mentioned key operations.

As explained in the foregoing, the memory readout sequence MRD is initiated in case of the flag STR=0 in FIG. 27. The sequence MRD starts from a key actuation waiting step KEY INT, and the entered key signal is thereafter identified.

As shown in FIGS. 28-1 and 28-2 the operator determines whether the sentence readout is made on the display unit 9 or by the printing unit 43.

By actuating the NONPRT key followed by the entry of the title name, the sentence stored in the sentence memory 54 is displayed on the display unit 9.

Also the entry of the title name without actuating the NONPRT key provides the printing of said sentence on the printing sheet by the printing unit 43. In this manner the stored sentence can be reproduced for enabling the operator to identify if such stored sentence can be utilized for preparing a new sentence. Also correction can be easily made on the display unit 9.

The sentence readout by printing is useful in making corrections, etc. because in the readout by display it is sometimes difficult for the operator to understand the entire sentence because of the limitation in the capacity of the display unit 9.

Figure 29:
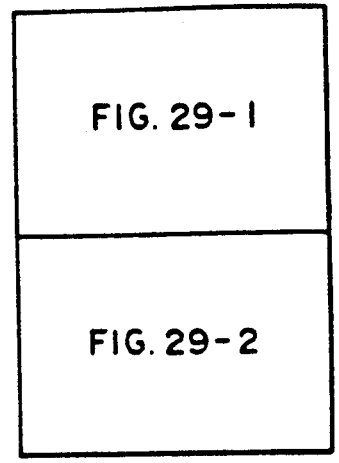
FIG. 29 shows the manner in which FIGS. 29-1 and 29-2 should be arranged.

FIG. 29 shows the manner in which FIGS. 29-1 and 29-2 should be arranged. FIGS. 29-1 and 29-2 show the key operations in the memory sequence MRD.

In case of the readout by the display unit 9, the NONPRT key is actuated to set the flag NP. Then the title name, for example "NO3" or "NEW YEAR'S CARD", of the sentence to be recalled is entered from the keyboard 10.

Upon the entry of said title name, the program proceeds to the aforementioned line buffer storage process routine LBFSTR to store the entered title name in the line buffer 52 and to display said title name on the display unit 9.

Then the operator confirms the title name displayed and actuates the RETURN key.

The program checks the state of the flag TR, which is reset in the initial state, and sets said flag TR.

Then the title name stored in the line buffer 52 is diverted into the WORK register to continue the display, and said line buffer 52 is cleared. Since the flag NP is already set by the actuation of the RETURN key, the display unit 9 displays the sentence corresponding to said title name, by comparing the title name stored in the work memory 112 with the title names in the sentence memory 54 in the MPU 44. Such display on the display unit 9, having for example a capacity of 20 characters, allows the operator to approximately confirm if the stored sentence is usable for the purpose of the operator. Also the entire sentence corresponding to the title name displayed on the display unit 9 can be erased by actuating he CLR key. In this operation the program proceeds in a step CLR? to the branch YES, then in a step TR=1? to the branch YES since the flag TR is already set by the actuation of the RETURN key, and the title name and the corresponding sentence are all cleared from the sentence memory 54.

Also, during the display of the title name or the sentence on the display unit 9, it is possible to delete or correct the words displayed by means of the ← or → key.

Furthermore, after the entry and display of the title name, it is possible to cause the display of the sentence from the beginning thereof or from an interim position thereof. In this case the operator actuates the key, and the program checks the state of the flag TR. As TR=0 in this state since the RETURN key has not been actuated, the program sets said flag TR, then also sets the flag SC, diverts the displayed title name to the WORK register, and clears the line buffer 52. However the display of the title name is continued by the signal from the WORK register. Then the characters for searching from an interim position of the sentence are entered and stored in the line buffer 52 according to the aforementioned sequence LBFSTR with the simultaneous display on the display unit 9. Upon actuation of the RETURN key, the program checks the state of the flag TR, which is already set by the key, then proceeds in a step SC=1? to the YES branch as the flag SC is also set, and diverts the character for search in the WORK register to continue the display. As the flag NP is set by the NONPRT key, the program further proceeds to the YES branch to display the sentence from an interim position on the display unit 9.

More specifically, in case the characters "NEW" for search are stored in the WORK register, the MPU 44 searches the same characters from the beginning of the sentence stored in the sentence memory 54, and displays the sentence following said same characters. In this manner it is rendered possible to rapidly locate the desired part of the sentence. In case another part of the sentence starting from the same characters "NEW" is desired, the key is again actuated whereby the program goes through the steps TR=1? and SC=1?, then checks the state of the flag NP which is set in this state, and displays another part of the sentence also starting from the characters "NEW". The above-mentioned procedure is also achievable with the printing unit 43, in which case the title name is entered without actuating the NONPRT key, and the key is actuated.

Thus, in the same manner as explained in the foregoing, the program sets the flags TR and SC and diverts the title name in the buffer 52 into the WORK register for maintaining the display of the title name on the display unit 9. Then, upon entry of the characters for search, the display of the title name is replaced by said characters, and, upon the actuation of the RETURN key, said characters for search are diverted into the WORK register and displayed because TR=1 and SC=1 in this state. Since the NONPRT key is not actuated in this state, the program proceeds in the step NP=1? to the NO branch to cause the printing unit 43 to print a part of the sentence starting from said characters for search. During said printing the characters for search are maintained on the display unit 9, so that the printing can be immediately interrupted by the key in case an error is found in the characters. Also, in the case of merely recalling the stored sentence by the printing unit 43, the operator has the freedom of selecting one of three printing forms mentioned in the foregoing.

In the first printing form in which the entire sentence is printed without the title name, the keys "/", "0" and "RETURN" are actuated in succession after the entry of the title name. Thus the program proceeds in the step TR=1? to the NO branch, since the flag TR is not set in the beginning, then sets the flag TR and diverts the title name in the WORK register. Then the program proceeds in the step NP=1? to the NO branch, as the flag NP is not set in this case, and the MPU 44 identifies the data "/0" and executes the printing by supplying the entire sentence and the related print data from the sentence memory 54 to the line buffer 52. In this state the format at the sentence registration can be exactly reproduced, since all the data such as space, carriage return, printing pitch, sheet line feed, etc. are stored in the sentence memory 54 together with the character information.

In this manner, the registered sentence can be immediately utilized for the preparation of a new sentence.

Also the display of the title name is maintained on the display unit 9 during said printing without title name so that the printing can be interrupted by the key in case an error in the title name or in the key entries is discovered, thus allowing the operator to avoid waste in time and in the printing sheet. Also, any number of copies can be prepared by repeating the actuation of the RETURN key.

Also, in the second or third printing form, the MPU 44 identifies the data "/2" or "/3" entered after the title name entry and causes the printing of the entire sentence with title name or of two lines of sentence with title name. The display of the title name on display unit 9 is maintained also in these printing forms. Furthermore, in the first or second printing form, the printing is automatically interrupted at a point where the key is actuated in the course of the registration of the sentence.

The above-mentioned mode is terminated by the actuation of the MEMORY key, whereby the MEMORY and NONPRT lamps are turned off. Also, if the title name entry is omitted in the third printing form, the MPU 44 identifies the absence of title name at the diversion of the title name into the WORK register by the actuation of the RETURN key, and causes the printing of all the title names stored in the sentence memory 54 and two lines of sentence respectively belonging to said title names, thus allowing rapid review of the registered information. The number of lines to be printed can be arbitrarily selected by a numeral key "2", "3", etc. actuated successive to the "/" key.

Figure 30:
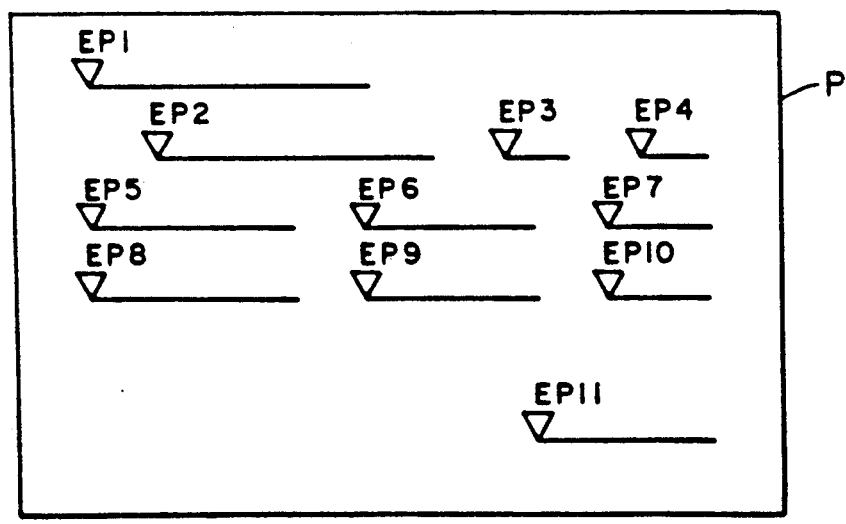
FIG. 30 is a schematic view showing an example of the printing sheet.
Figures 1, 28:
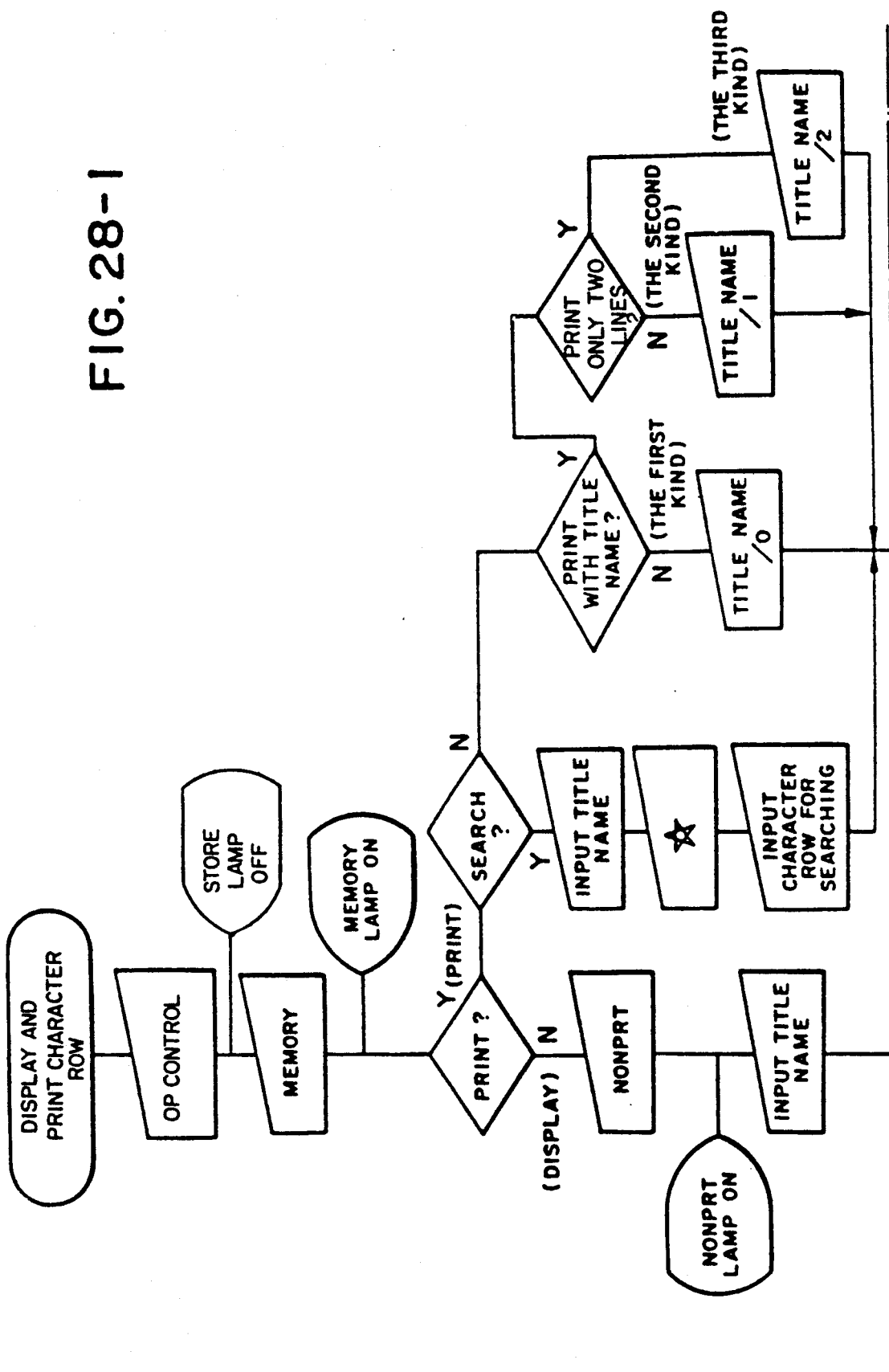
Figures 2, 28:
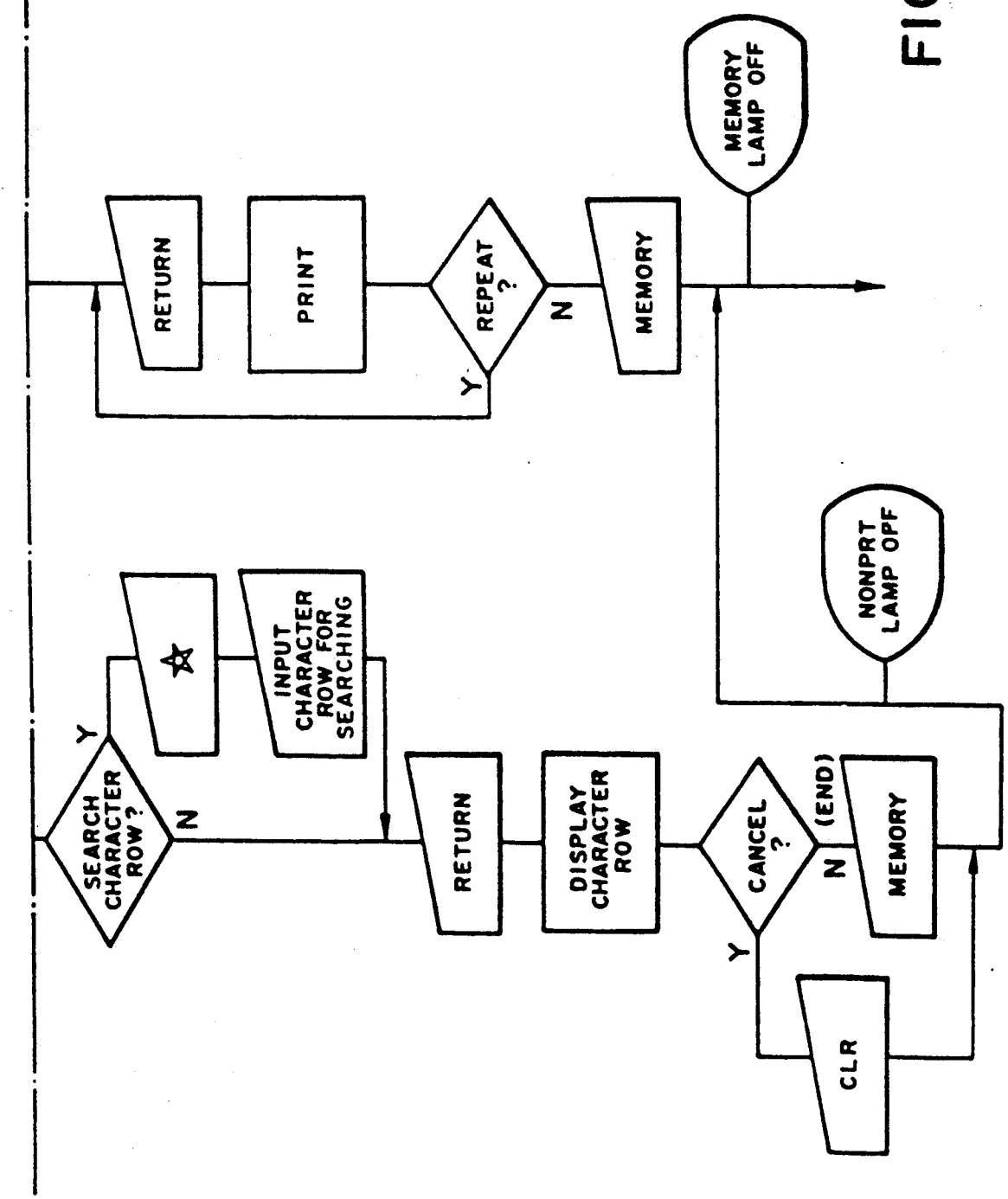
Figures 1, 29:
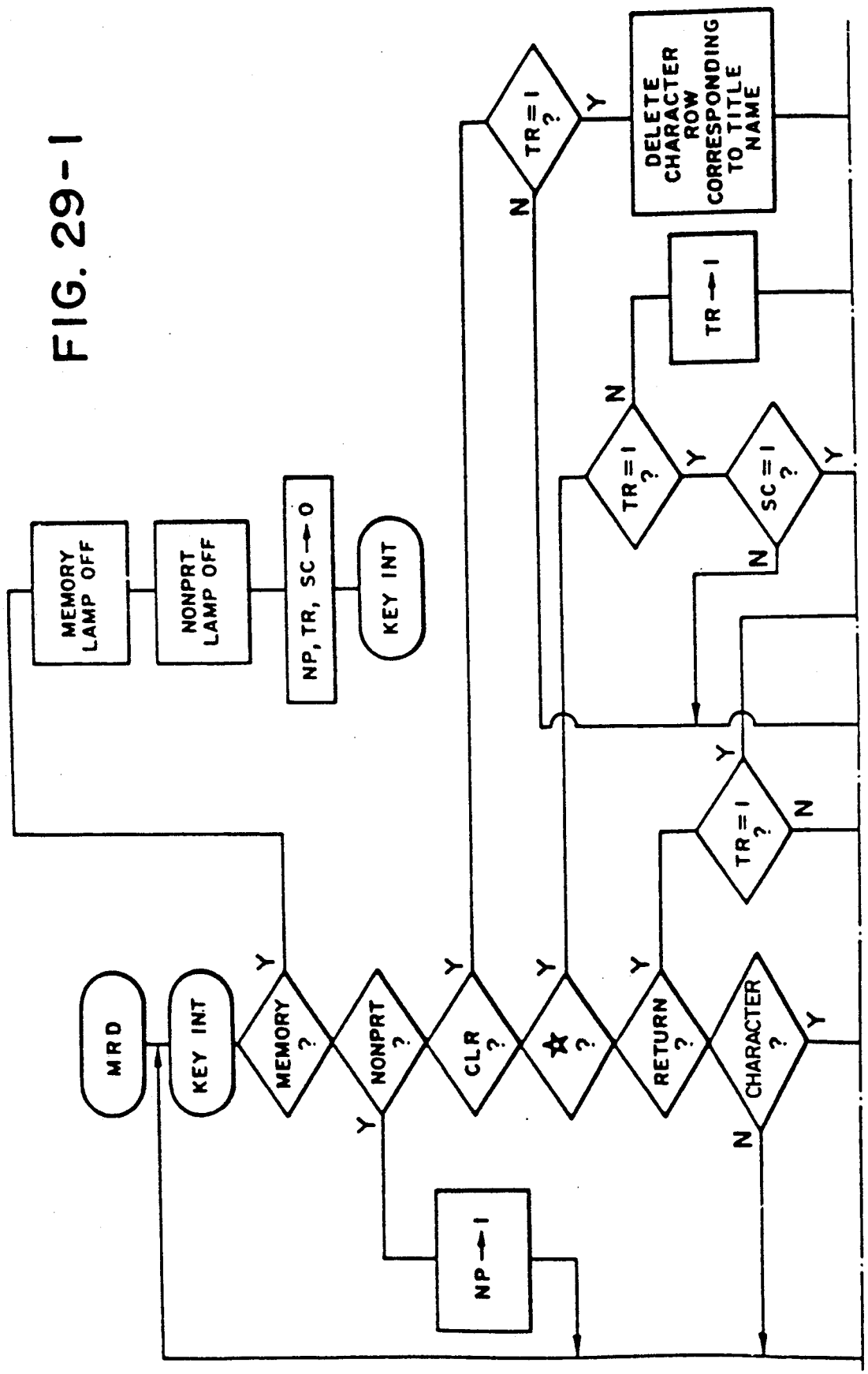
Figures 2, 29:
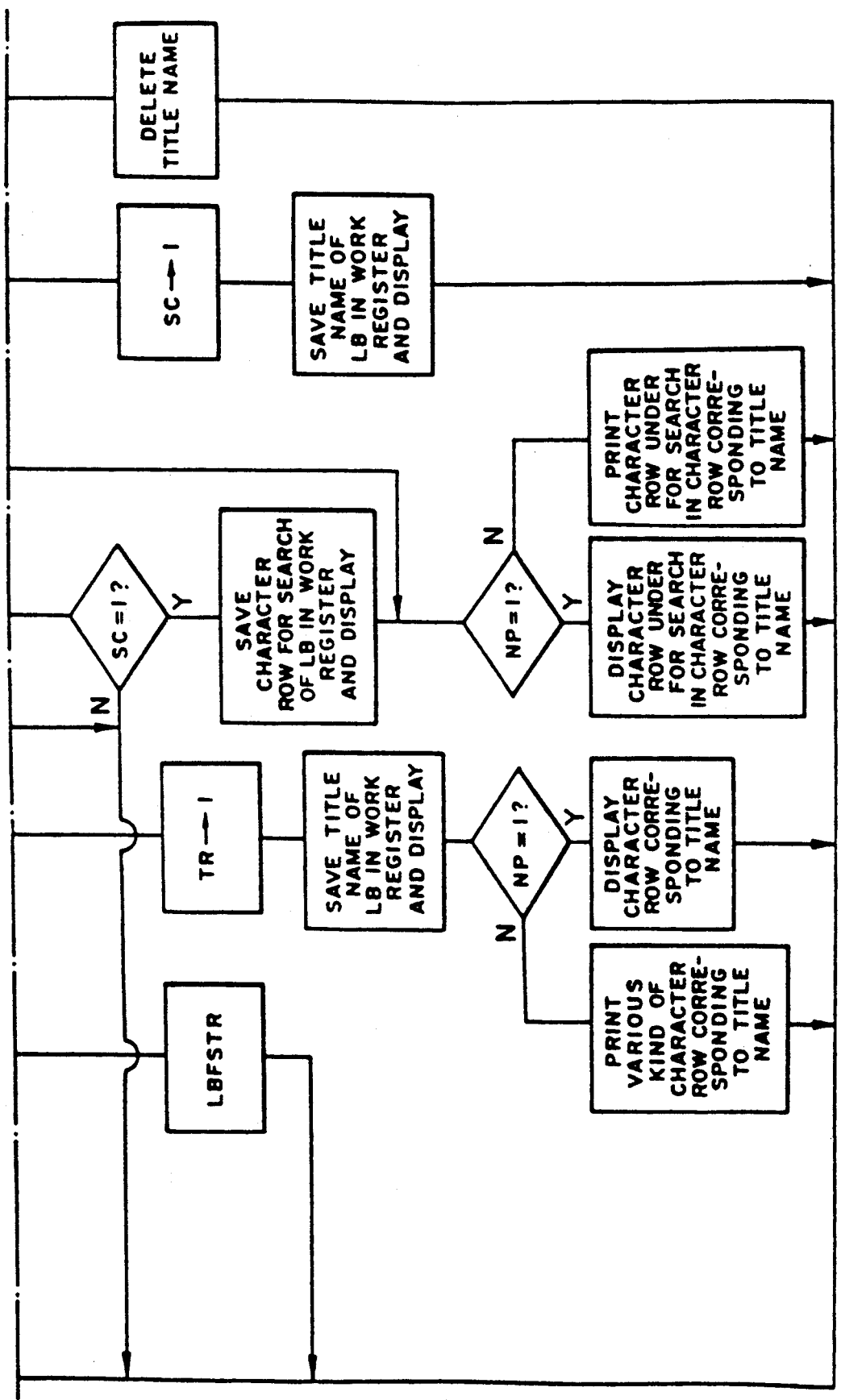

In the following the registration and readout of page formats are explained. In case the entry points EP1--EP11 on the printing sheet P are different from line to line as shown in FIG. 30, it is convenient if these entry points EP1-EP11 can all be registered and the carriage 26 can be brought automatically to these entry points EP1-EP11 at the printing and line feed. In order to meet such requirement the present embodiment is further provided with the functions of registration and readout of the page formats.

Figure 31:
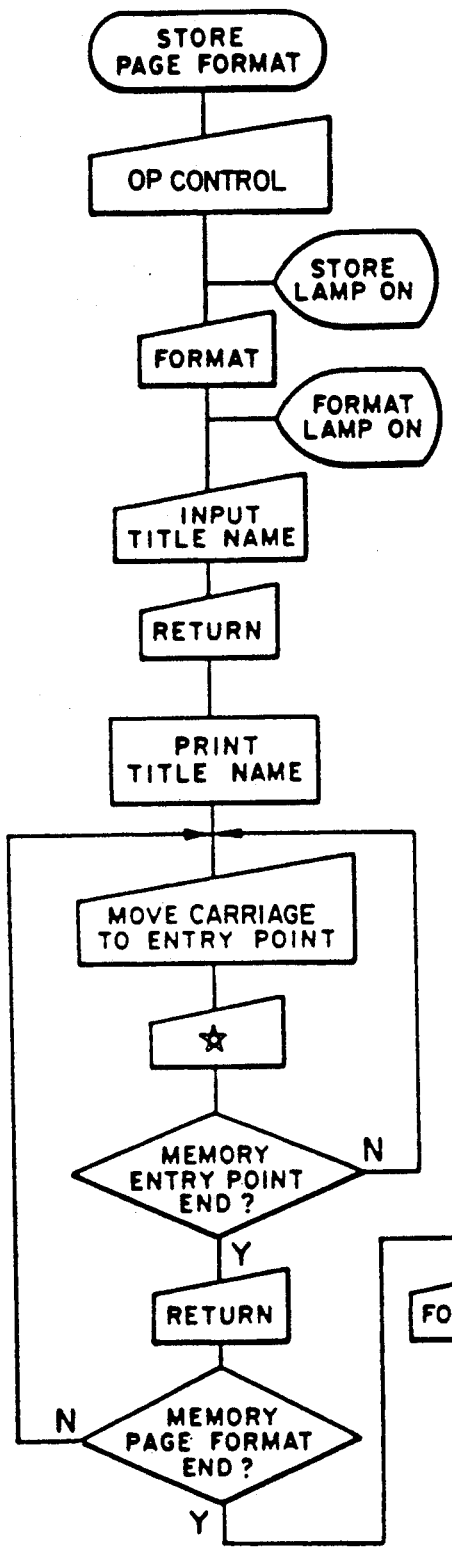
FIG. 31 is a control flow chart for key operations at the registration of page format.

The registration of the page format is effected according the sequence shown in FIG. 31, in which the OP CONTROL key is at first actuated to light the STORE lamp. Then the FORMAT key is actuated to establish the page format registration mode, whereupon the FORMAT key lamp is turned on to indicate said mode. Then entered is the title name for the page format, which should start from a character in order to distinguish said title name from that for the registration of the tabulator stop positions to be explained later. The title name entry is terminated by the actuation of the RETURN key. Thereafter the title name is printed and the printing sheet P is advanced by a line to indicate that the entered title name has been accepted. However, if the entered title name already exists, there will be given an alarm in the same manner as explained in the foregoing, and the entered title name is not accepted. The operator displaces the carriage 26 to the entry point EP1 in the first line by means of the SPACE key, etc., and actuates the key to designate the entry point EP1. Upon completion of the registration of the entry points (EP1 only in the example shown in FIG. 30) in the first line, the RETURN key is actuated to instruct the storage of all the entry points (EP1) in the first line, and this procedure is repeated for the 2nd through nth lines (n=6 in the example shown in FIG. 30). Upon completion of the storage of the page format, the FORMAT key is actuated to terminate the registration procedure, whereby the FORMAT key lamp is turned off to indicate that the entry reception is terminated. In the illustrated example there is a blank line between the entry points EP10 and EP11, and such blank line can be obtained by actuating the RETURN key without the key after the RETURN key is actuated following the registration of EP10.

Figure 32:
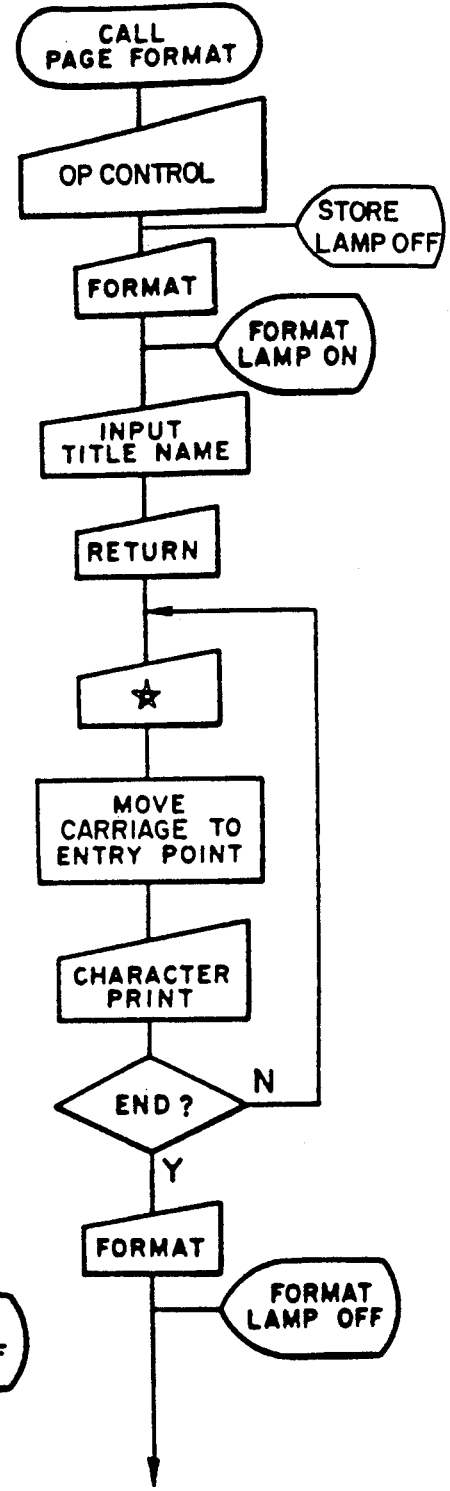
FIG. 32 is a control flow chart for key operations at the recalling of page format.

Now FIG. 32 shows the procedure of readout of the thus registered page format. In said procedure the OP CONTROL key is actuated at first to turn off the STORE lamp. Subsequently the FORMAT key is actuated, whereby the FORMAT key lamp is turned on in the same manner as in the registration of the page format. Then the title name is entered, and the entry is completed by the actuation of the RETURN key. At this point the registered page format is recalled so that the carriage 26 is shifted to the next entry point EP1, EP2, etc. upon each actuation of the key. Thus a document of the form shown in FIG. 30 can be prepared by entering characters following the actuation of the key. This mode is terminated by the actuation of the FORMAT key, whereby the FORMAT key lamp is turned off.

Figure 33:
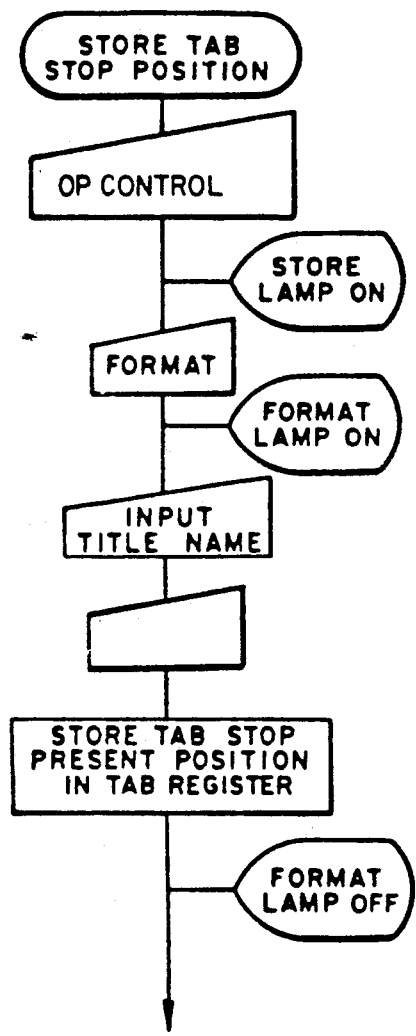
FIG. 33 is a control flow chart for key operations at the registration of tabulator stop positions.
Figure 34:
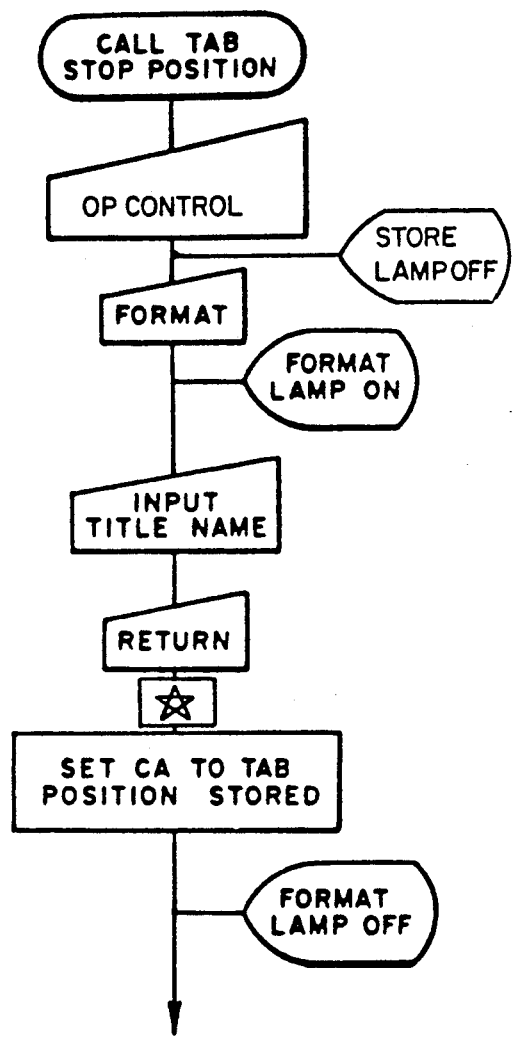
FIG. 34 is a control flow chart for key operations at the recalling of tabulator stop positions.

In the following are explained the registration and readout of the tabulator stop positions. The tabulator stop positions, for example set at EP6, EP9 and EP7, EP10 in the format shown in FIG. 30, are cancelled when the tabulator stop positions are set for another line. Thus in case it is desirable to retain the tabulator stop positions, a function of registering such stop positions and recalling them later is quite useful. FIG. 33 shows the procedure of registering the tabulator stop positions, in which the OP CONTROL key is actuated to light the STORE lamp, then the FORMAT key is actuated to light the FORMAT lamp, and a particular title name which should start with a numeral is entered. If the same title name already exists, an alarm is given in the same manner as explained in the foregoing and the entered title name is not accepted. Upon actuation of the RETURN key after the entry of the title name, the data for tabulator stop positions already stored in the registers TAB1-TABn by the SPACE or SET key are registered in the sentence memory 54. FIG. 34 shows the procedure of recalling such stop positions, in which executed in succession are the actuation of the OP CONTROL key to turn off the STORE lamp, actuation of the FORMAT key to turn on the FORMAT lamp, entry of the title name for the registered tabulator stop positions, actuation of the RETURN key and the key, whereupon the carriage 26 is automatically shifted to the first of the registered tabulator stop positions.

Figures 2, 35:
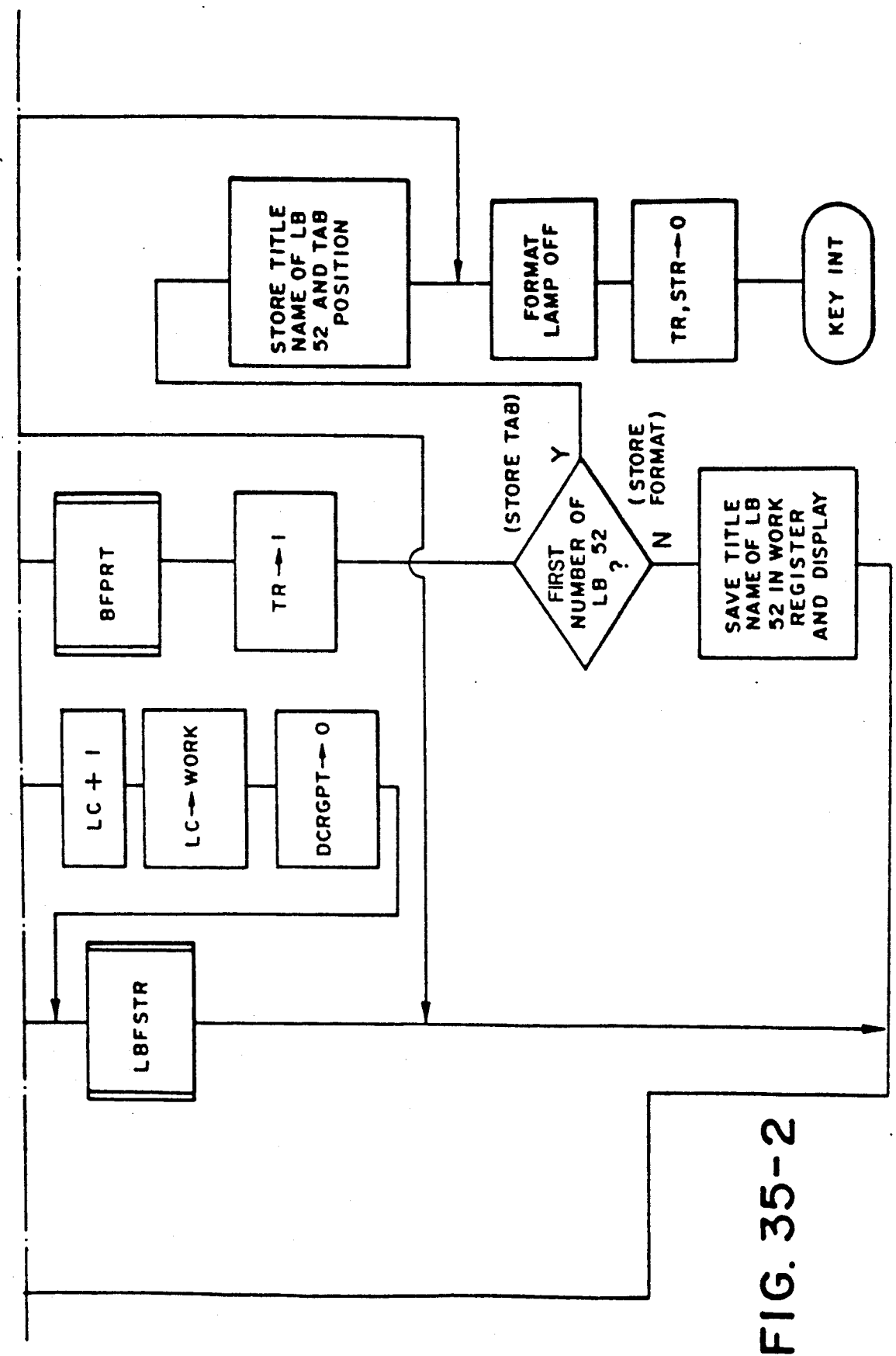
FIG. 35 shows the manner in which FIGS. 35-1 and 35-2 should be arranged.

The functions of the above key operations are explained in the following. FIG. 35 shows how FIGS. 35-1 and 35-2 should be arranged.

Upon detection of the actuation of the FORMAT key by the MPU 44, the program proceeds to the sequence FORMAT shown in FIGS. 35-1 and 35-2. The program first clears a line counter LC for counting the number of lines on the printing sheet P, then checks the flag STR, and, if said flag is set by the STORE mode of the OP CONTROL key, executes the registration of the page format or the tabulator stop positions. In case said flag STR is not set, there is conducted the readout of the page format or the tabulator stop positions according to the format readout sequence FMRD shown in FIG. 36. In the sequence FORMAT shown in FIGS. 35-1 and 35-2, if the flag STR is set, the program enters a key entry waiting step KEY INT.

In response to the entry of the title name, the line buffer storage routine LBFSTR is initiated to store the title name in the line buffer 52 and display the same on the display unit 9. Then actuated is the RETURN key in order to indicate the completion of the title name entry. Since the flag TR is not set in this state, the buffer printing sequence BFPRT is executed to print the title name, to return the carriage 26 to the left margin stop position, to advance the printing sheet P by a line, and to set the flag TR. Then the program checks the content of the first digit of the line buffer (LB) 52, and, if it is a numeral, proceeds to the YES branch to store the title name of the line buffer (LB) 52 starting with a numeral and the data of tabulator stop positions stored in the registers TAB1-TABn into the sentence memory 54.

In case said title name starts with a character indicating the registration of a page format, the title name in the line buffer (LB) 52 is diverted into the WORK register for continuing the display. Then the carriage 26 is displaced to an entry point EP1, EP2, etc. by means of the SPACE key, etc. and the key is actuated to divert the content of the register CRGPT, indicating the carriage distance from the left-end reference point, into the WORK register. In case there are plural entry points EP1-EP11 as shown in FIG. 30, the content of the register CRGPT is stored in the WORK register in succession by repeating the actuations of the SPACE key and the key. Upon completion of the registration of entry points EP1, etc. in a line, the RETURN key is actuated. Since the flag TR is set in this state, the program proceeds to the YES branch to set the line counter LC from 0 to 1, and stores the content thereof in the WORK register corresponding to the storage of the entry point EP1, etc.

The above-mentioned procedure is repeated for the number of lines in the page format, thereby storing the entry point data of every line in the WORK register. Upon actuation of the FORMAT key, the content of said WORK register, including the title name, line number, and entry points EP1, etc. in each line, is registered in the sentence memory 54, and the FORMAT lamp is turned off to complete the registration of the page format.

In the readout of the thus registered page format, the OP CONTROL key is set to a mode other than the STORE mode to reset the flag STR. Thus in response to the actuation of the FORMAT key, the program proceeds, in the step STR=1?, to the NO branch to execute the format readout sequence FMRD shown in FIG. 36. In response to the entry of the title name of the page format or tabulator stop positions the line buffer storage sequence LBFSTR is executed to display the title name, and in response to the actuation of the RETURN key the program proceeds, in the step TR=1?, to the NO branch in the aforementioned manner. Then the first digit of the line buffer (LB) 52 is checked, and, if it is a numeral indicating a title name for the tabulator stop position, the data of the tabulator stop positions in the sentence memory 54 corresponding to said title name are transferred to the registers TAB1-TABn for again setting the tabulator stop positions. The contents of said registers TAB1-TABn are sensed by the MPU 44 to restore the data of the previous tabulator stop positions, thus enabling automatic tabulator setting of the carriage 26.

Also in case of a title name starting with a character indicating a page format, the page format corresponding to said title name in the sentence memory 54 is transferred to the WORK register and the flag TR is set. Thereafter in response to the actuation of the key, the data for the entry points EP1-EP11 in the WORK register are supplied to the MPU 44 to automatically displace the carriage 26 to the entry point EP1 for example. Thus, in the example shown in FIG. 30, automatic carriage displacement and sheet feeding for the entry points EP1-EP11 is effected by actuating the key eleven times without touching the RETURN key. This is due to the fact that the sentence memory 54 remembers the carriage return commands and the amount of sheet feeding instructed by the RETURN key at the registration of the page format.

Figure 36:
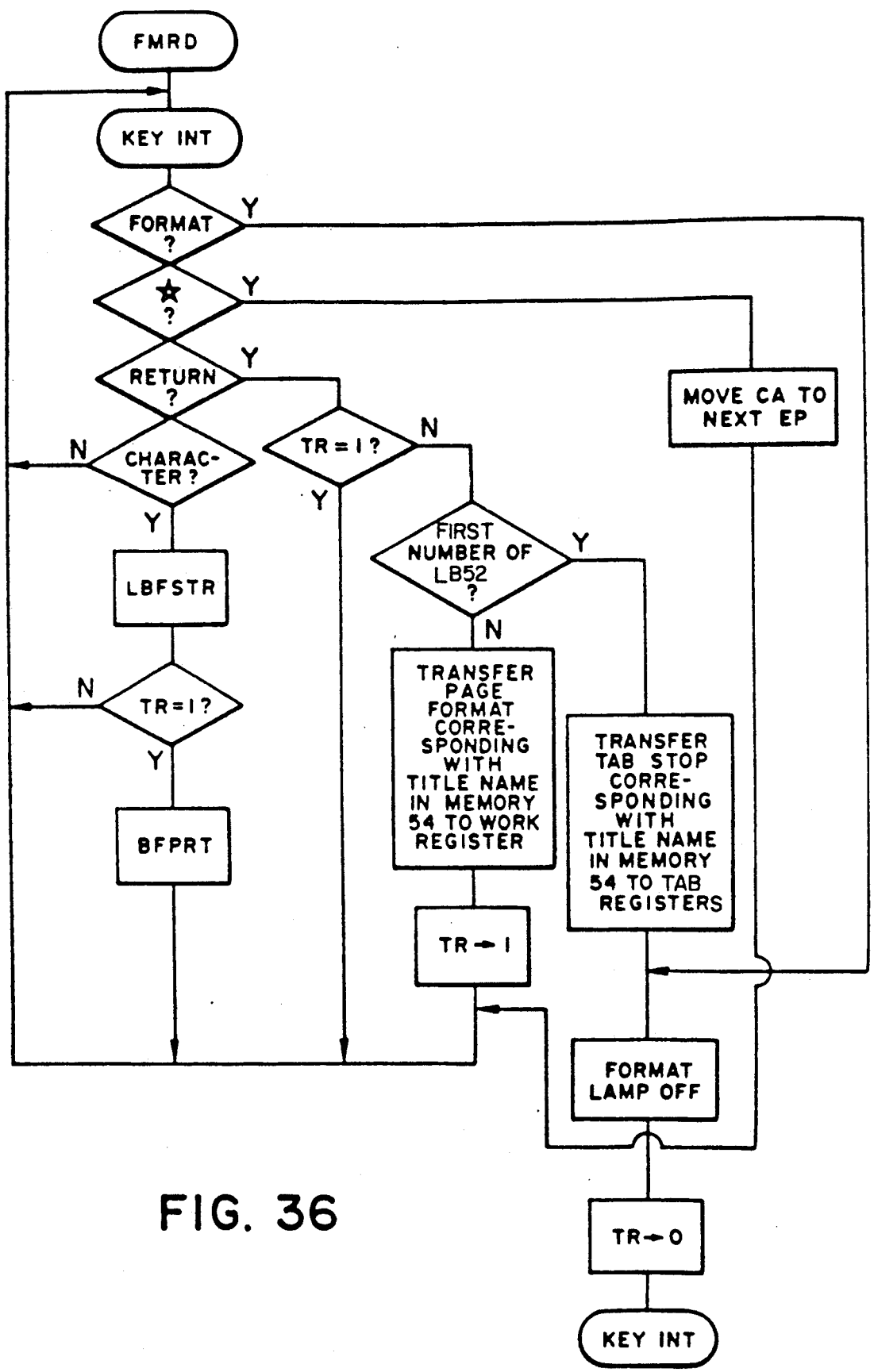
FIG. 36 is a flow chart showing the functions of recalling of page format and tabulator stop positions.

Also at the readout from the sentence memory 54, the data stored therein override the state of the PITCH, LINE SPACE, and OP CONTROL keys selected at the keyboard 10. For example, when the page format is recalled and the carriage 26 is displaced to an entry point EP1 for example by the key, the actuation of a character key 10a provides the character-unit printing mode (C-mode) even if the OP CONTROL key is set at the W-mode for the word-unit printing, since the sequence BFPRT in LBFSTR in FIG. 36 is not executed as shown in FIG. 24 but is executed the next time because of the state TR=1.

In this manner the printing from the entry point EP1 for example can be conveniently conducted in response to each entry of the character. Also during the readout function of the page format the title name of said page format is continuously displayed by the sequence LBFSTR so that it is possible to locate a mistake in the selection of the registered page format.

Now reference is made to FIGS. 37 to 39-2 showing an embodiment allowing easy correction or insertion of printed characters.

In the print unit equipped in the conventional office computer or calculator or in the key-controlled printer such as an electronic typewriter, the correction or insertion of printed characters can only be made by the displacement of the carriage or printing sheet through visual observation or by manual operation with special correcting utensils on the printing sheet removed from the printer and has therefore been an extremely cumbersome operation even for an experienced operator.

The present embodiment explained in the following is capable of avoiding such difficulties.

Figure 37:
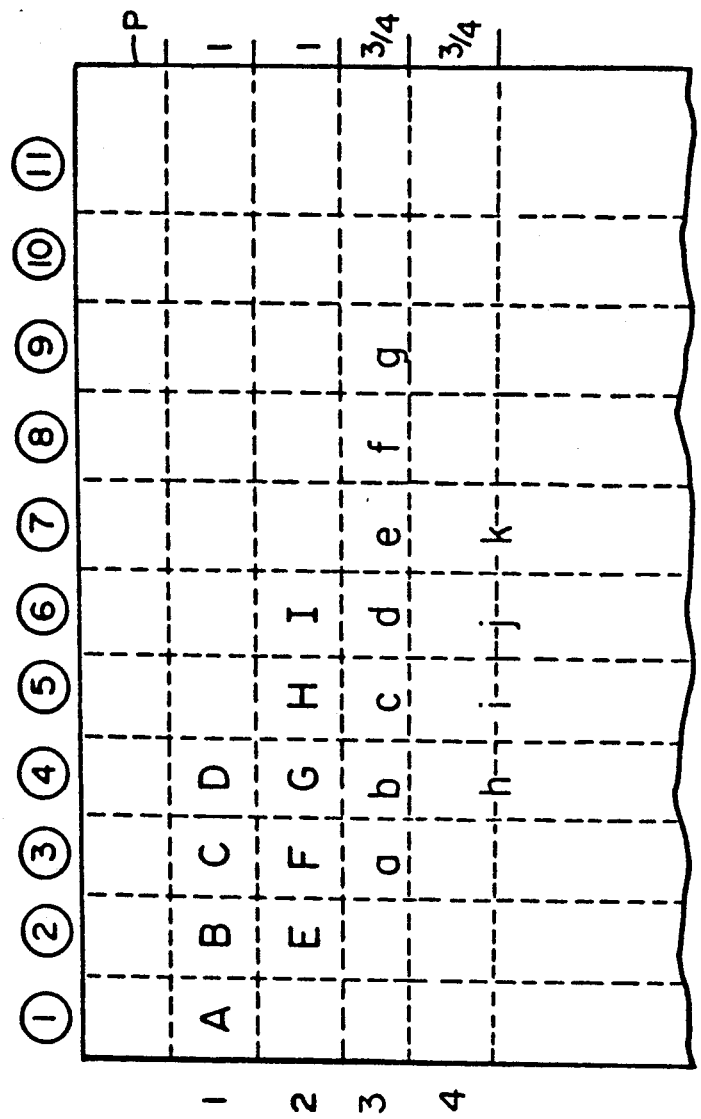
FIG. 37 is a schematic view showing an example of printing.

FIG. 37 shows an example of printing on a printing sheet P, in which the characters, A, B, a, b, etc. are printed at arbitrary positions under the key instructions, by means of the displacement from left to right of a carriage 26 supporting for example a daisy typefont wheel 30.

For the lower case characters a, b, etc. the line spacing can be reduced for example to ¾.

Figure 38:
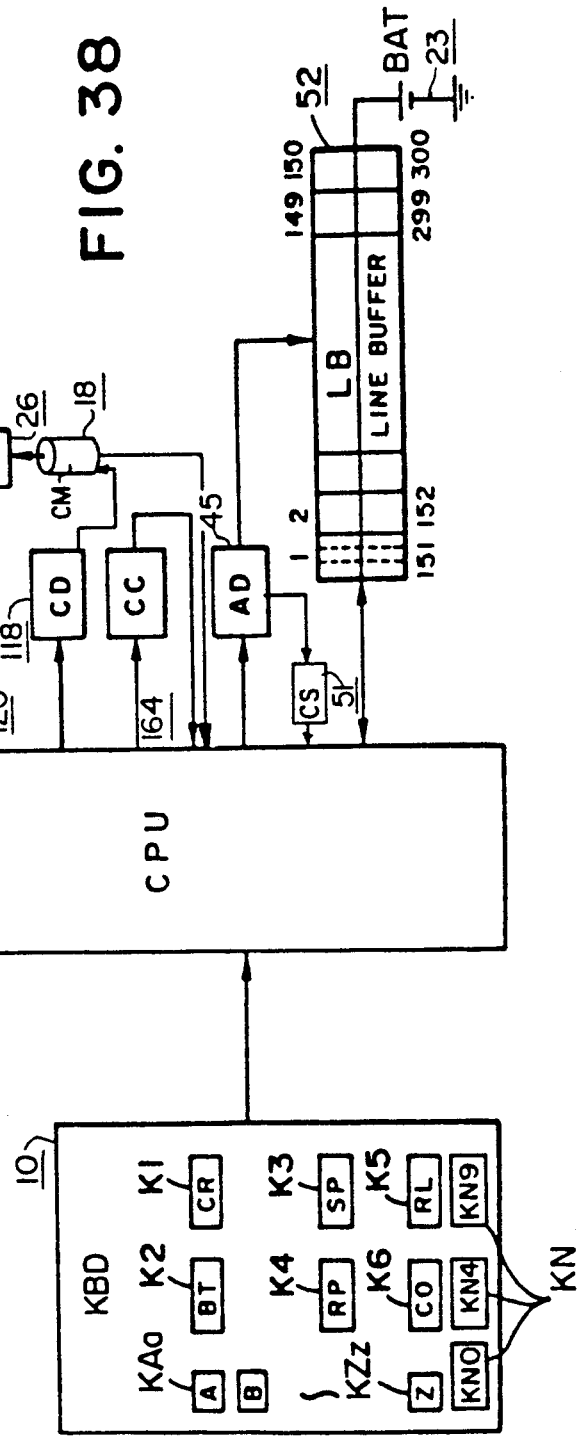
FIG. 38 is a block diagram of an embodiment for obtaining the contents of a line buffer as shown in FIGS. 39-1 and 39-2.

FIG. 38 shows an embodiment of the printer in a block diagram, wherein letters are used to designate block representations of units which were designated by numerals in the more detailed Figures. The block diagram shows a keyboard KBD comprising alphabet keys KAa-KZz, numeral keys KN0-KN9 shown in FIG. 44, and control keys K1-K6 for giving various commands to the carriage CA; a central processing unit CPU; a paper feed control PF which controls a roller RO for the feeding of the printing sheet P; a drive control unit HD for a typefont wheel WH; a carriage CA supporting said typefont wheel WH and performing displacement in the lateral direction; and a drive control unit CD for the carriage CA. A carriage position counter CC for detecting the carriage position stores the displacing distance of the carriage CA by counting the drive pulses for a stepping motor CM for said carriage CA. Also provided is a memory or line buffer LB for the correction or insertion of the printed characters and provided with a capacity for 300 characters over 2 lines. Inside said memory LB each memory area for a character is divided into three addresses I, II, and III, wherein the address I stores the kind of character such as A, B, a, b, =, $, etc. in coded form, the address II stores the printing pitch or the amount of carriage displacement corresponding to the size of each printed character, even when said printing pitch is the same as that for the neighboring characters, and the address III stores the kind of type such as printing with an underline.

It is now assumed that the printing pitch is equal to a constant unit pitch 1PT regardless of the size of the printed character, that the kind of type does not include special printing type such as underlined printing but is limited to an ordinary printing of characters NMP, and that the feed pitch of the printing sheet P is limited to an ordinary unit pitch 1PF. By the actuation of a carriage return (CR) key K1 the carriage CA is displaced to the left-hand end of the sheet P, which is simultaneously advanced by a line. Now, upon entry of a character A from the keyboard KBD, an address circuit AD instructs the storage of a code representing the character A in the address I of the first memory area 1 in the line buffer LB, a code 1PT representing said constant printing pitch in the address II, and a code NMP representing a simple printing in the address III.

When the type A is brought to the printing position by the rotation of the typefont wheel WH, the CPU reads the content of the address I of the first memory area 1 of said line buffer LB to print the character A in the 1st line and in the 1st column as shown in FIG. 37, and the carriage CA is displaced to the right by one digit amount under the control of the carriage drive control unit CD. Then, upon entry of the next character B from the keyboard KBD the address circuit AD is step advanced to store a code for the character B in the address I of the second memory area 2 in the line buffer LB and to store the data 1PT and NMP in the addresses II and III in the same manner as for the preceding character A.

The CPU receives the data from the address I of the second memory area 2 indicated by the address circuit AD, and prints the character B in the 1st line and 2nd column as shown in FIG. 37 through a known coincidence procedure.

In this state the content of the carriage position counter CC is step advanced to "2" indicating the distance of the carriage CA from the left-end position.

Similarly in response to the entries of characters C and D from the keyboard KBD the address circuit AD stores the codes for C and D in the addresses I of the 3rd and 4th memory areas 3, 4 and the codes 1PT and NMP in the addresses II and III. The CPU prints said characters C and D in the 3rd and 4th columns of the 1st line as shown in FIG. 37, and the carriage position counter CC stores "4" indicating the distance of the carriage CA from the left-end position. Then in response to the actuation of the carriage return (CR) key K1 in the keyboard KBD, the address circuit AD stores a code RET representing the returning or reverse displacement of the carriage CA in the address I of the 5th memory area 5 in the line buffer LB. It also stores, in the address II, a code 4ST representing the carriage displacement "4" from the left-end position obtained from the carriage position counter CC, and, in the address III, a code 1PF representing the ordinary sheet feeding pitch.

Figure 39:
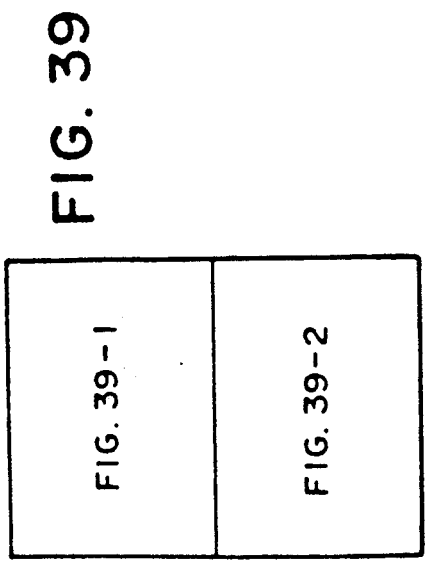
FIG. 39 shows the manner in which FIGS. 39-1 and 39-2 should be arranged.

FIG. 39 shows how FIGS. 39-1 and 39-2 should be arranged. FIGS. 39-1 and 39-2 show the state of data storage in the line buffer LB. At this point the carriage CA is returned to the left-end position, and the printing sheet P is advanced upwards in the known manner by the rotation of a rubber roller RO by an ordinary line pitch 1PF. Also the carriage position counter CC in the carriage drive control unit CD is reset. Then a space (SP) key K3 in the keyboard KBD is actuated to displace the carriage CA to the right by one character in order to form a space in the 2nd line as shown in FIG. 37. Simultaneously the address circuit AD stores a code SPA representing a blank space in the address I of the 6th memory area 6 in the line buffer LB, a code 1PT indicating the printing pitch in the address II, and a code NOP indicating absence of printing in the address III. Also the carriage position counter CC has a count "2" in the same manner as explained in the foregoing. Then in response to the entries of the characters E and F, the corresponding character codes, printing pitches, and kinds of type are stored in the addresses I, II, and III in the 7th and 8th memory areas 7, 8 of the line buffer LB. The characters E and F are printed as shown in FIG. 37, and the carriage position counter CC stores "3". Let us assume that it is found at this point that the character C in the 3rd column of the 1st line needs to be corrected for example to a character Y. Upon actuation of a back trace (BT) key K2 provided exclusively for correction or insertion, the CPU reads, by stepwise reversing the address circuit AD, the content of the 7th memory area 7 of the line buffer LB to obtain the codes NMP and 1PT as shown in FIGS. 39-1 and 39-2, whereby the CPU shifts the carriage CA to the left by one character pitch 1PT. Upon another actuation of the back trace (BT) key K2, the address circuit AD is changed from "7" to "6" to indicate the sixth memory area 6 in the line buffer LB, in response to which CPU shifts the carriage CA by one pitch 1PT toward the left-end position. Upon one more actuation of the back trace (BT) key K2, the CPU decodes the 5th memory area 5 to find the data for line feed for one pitch 1PF, carriage displacement for 4 steps, and carriage return command, whereby the carriage CA is displaced 4 steps, to the right and is stopped automatically at the character D in the 4th column of the 1st line shown in FIG. 37. At the same time the printing sheet P is inversely fed downwards by the inverse rotation of the rubber roller RO.

In this manner the carriage CA can be automatically brought to the position of the last character in the preceding line. Thus, upon a further actuation of the back trace (BT) key K2, the carriage CA is displaced leftwards by one pitch 1PT to the position of the character C at the 3rd column in the 1st line, whereupon it is rendered possible to erase the character C with the correcting ribbon 33 by actuating the correction (CO) key K6 and to print the character Y anew by entering said character, and the data in the line buffer LB is changed from C to Y by the function of the address circuit AD. After the correction is completed by repetitive actuations of the back trace (BT) key K2 and the correction (CO) key K6, a relocate (RL) key K5 is actuated whereby the CPU reads the address "8" immediately before the actuation of the back trace (BT) key K2, calculates the distance in the lateral direction and that in the sheet feed direction from the present address to the original address "8", and returns the carriage CA to a position immediately before the actuation of the key K2. Thereafter the characters G, H, and I are similarly entered and stored in succession in the line buffer LB through the address circuit AD, and the carriage position counter CC is advanced to "6". Upon completion of the printing of characters G, H, and I, the carriage return (CR) key K1 is actuated to return the carriage CA to the left-end position and to advance the printing sheet P by one line 1PF. In case the lower-case characters are to be printed in the 3rd line, the line spacing for sheet advancement by the key K1 is changed from 1 line for example to ¾ line by giving a corresponding instruction from the keyboard KBD prior to the actuation of the key K1. Thereafter the lower-case characters a, b, c, ... are printed in the similar manner, and the lower-case characters h, i, ... are printed in the 4th line after the sheet advancement of ¾ line to obtain the print as shown in FIG. 37. As explained in the foregoing, the line buffer LB in succession stores the character information, carriage return command, carriage displacing distance, and sheet feed amount as shown in FIGS. 39-1 and 39-2. Also the backward displacement of the carriage CA in the correcting operation can be achieved by actuating the back trace (BT) key K1 once and steadily pressing the repeat (RP) key K4, whereby the address circuit AD repeats the subtraction to supply the contents of the line buffer LB in succession to the CPU and to repeat the reversing motion of the carriage CA. In this manner it is possible to reach the position of correction at a high speed. Furthermore it is possible to return the carriage CA to the previously printed lines by instructing the number of lines of reversing motion with numeral keys KN in the keyboard KBD and by using the back trace (BT) key K2 and the repeat (RP) key K4.

More specifically it is possible, regardless of the number of lines, to return the carriage CA within a range of 300 characters.

As an example, when the carriage CA is at the 5th line in FIG. 37, it is possible to return the carriage CA to the position of the character A at the 1st column in the 1st line, by pressing the numeral key KN4 and by actuating the keys K2 and K4. For this purpose there can be provided a register CS for storing said number "4", and the carriage CA is not stopped at each carriage return command but only at such carriage return command when the number of said commands coincides with the number stored in said register CS.

The control method with a line buffer LB as employed in the present embodiment is practically useful, since the case of printing a maximum of 150 characters on a sheet is rather seldom.

Furthermore it is in fact not necessary to store every carriage return command, displacing distance, and amount of sheet feeding as shown in the 34th and 35th memory areas in FIGS. 39-1 and 39-2, since the sheet feeding may be conducted manually and the carriage return command itself can be included in the data of distance of carriage displacement.

Also the line buffer LB is preferably backed up with a battery BAT as shown in FIG. 38, in order to retain the content even when the power supply is interrupted for some reason and thus to facilitate the correction, after the re-start of the function, on the work done before the interruption of the power supply.

Figure 40:
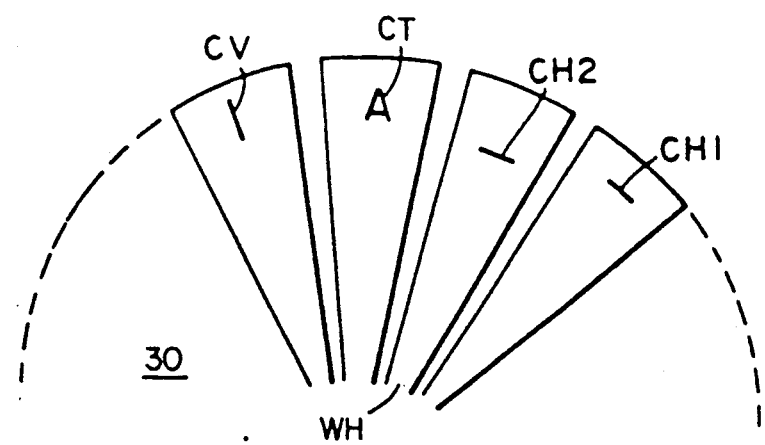
FIG. 40 is a schematic view of an example of the printing head of the present embodiment.
Figure 41:
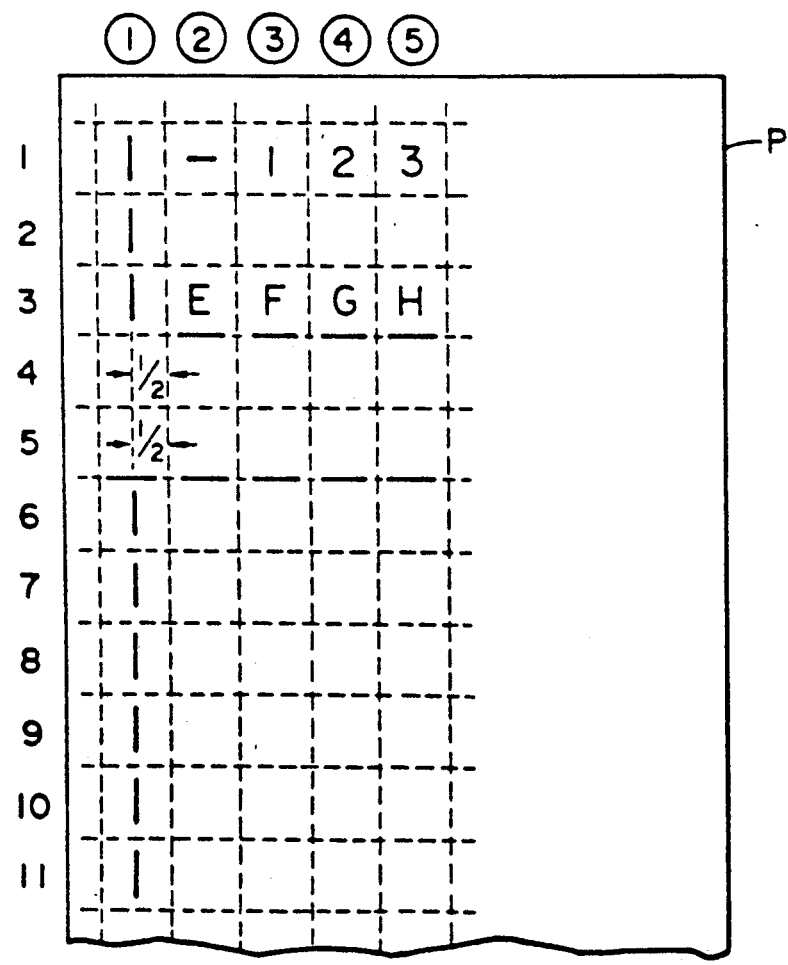
FIGS. 41 and 42 are schematic views showing examples of printing.
Figure 42:
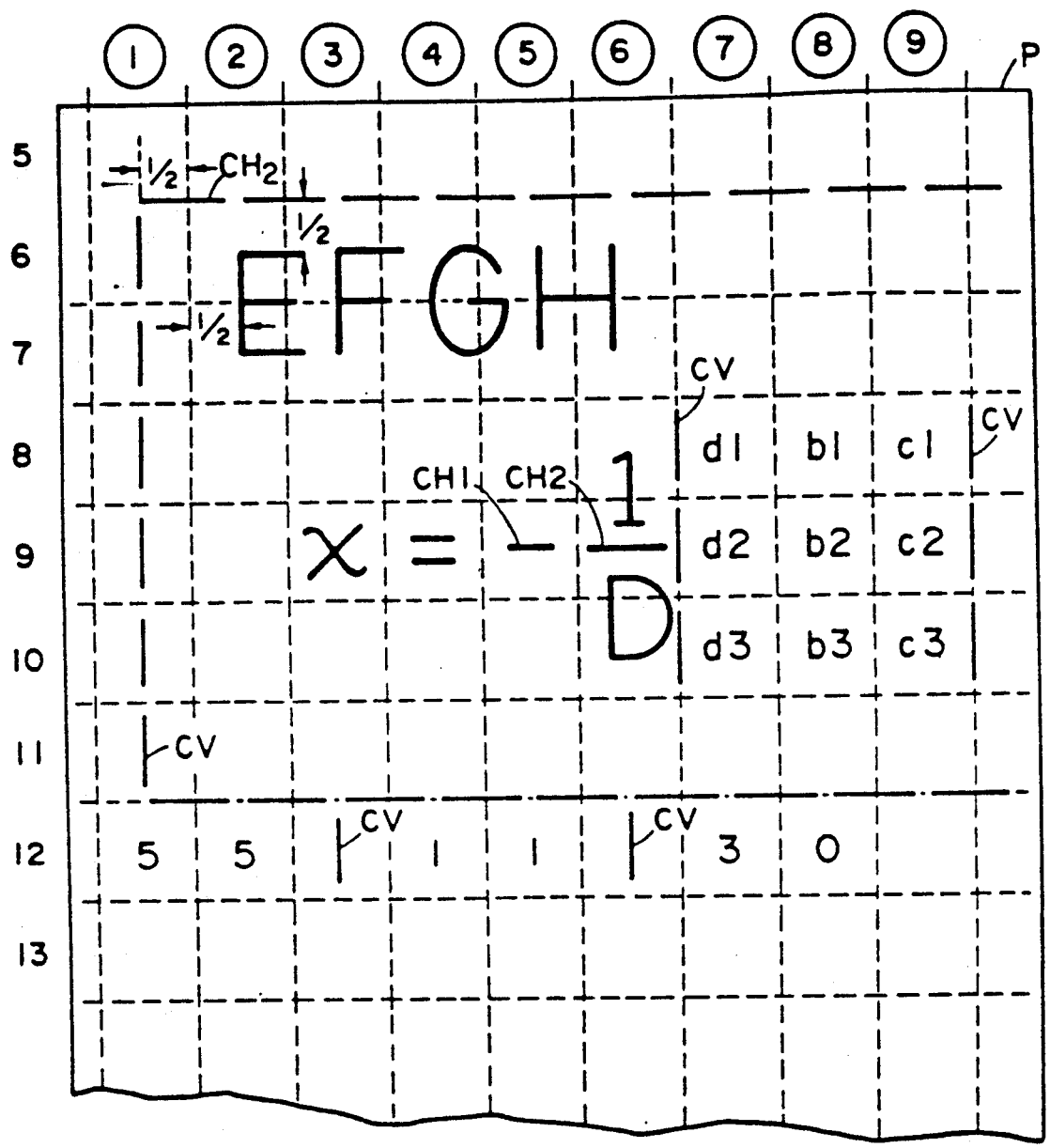

Now reference is made to FIGS. 40, 41, and 42 showing a printer capable of printing form lines by the key operations. FIG. 40 shows an embodiment WH of part of a typefont wheel 30. FIGS. 41 and 42 show samples of printing on a printing sheet P.

Conventionally patterns other than characters and numerals, such as form lines, must be inscribed with a scale and a ball-point pen, etc. and therefore cannot be made neatly.

In consideration of the foregoing difficulty, the present embodiment enables the printing of form lines with neatly formed corners by selective use of vertical-line and horizontal-line types with key operations.

FIG. 40 shows a part of an example of a daisy typefont wheel WH adapted for use in the present embodiment. Said typefont wheel WH is provided, in addition to the ordinary types CT, with a vertical-line type CV and horizontal-line types CH1, CH2 for forming the vertical and horizontal form lines as show in FIGS. 41 and 42. The type CH1 is provided approximately in the center of a type area and is utilized for printing a minus symbol "—" as shown in the 2nd column in the 1st line in FIG. 41, whereas the type CH2 is provided at the lower part of a type area and is utilized for printing an underline as shown in the 2nd, 3rd, 4th, and 5th columns in the 3rd line in FIG. 41. Also the type CV is utilized for printing various vertical lines as shown at the 1st column in the 1st to 3rd lines and 6th to 11th lines in FIG. 41, and at the 1st column in the 7th to 11th lines, at the 7th and 9th columns in the 8th to 10th lines, and at the 3rd and 6th columns in the 12th line in FIG. 42. As shown in FIGS. 41 and 42, the printer of the present embodiment is capable of forming vertical and horizontal lines with types controlled by key operations and without particular scale or other writing utensils.

However, in the form line printing shown in FIG. 41, the obtained form is not aesthetic in that the horizontal line at the 1st column in the 3rd line is broken by a half pitch, that the horizontal line at the 1st column in the 5th line is excessively long, and that the horizontal line constituting the underline for the characters E, F, G, and H in the 3rd line is too close to said characters.

Figure 43:
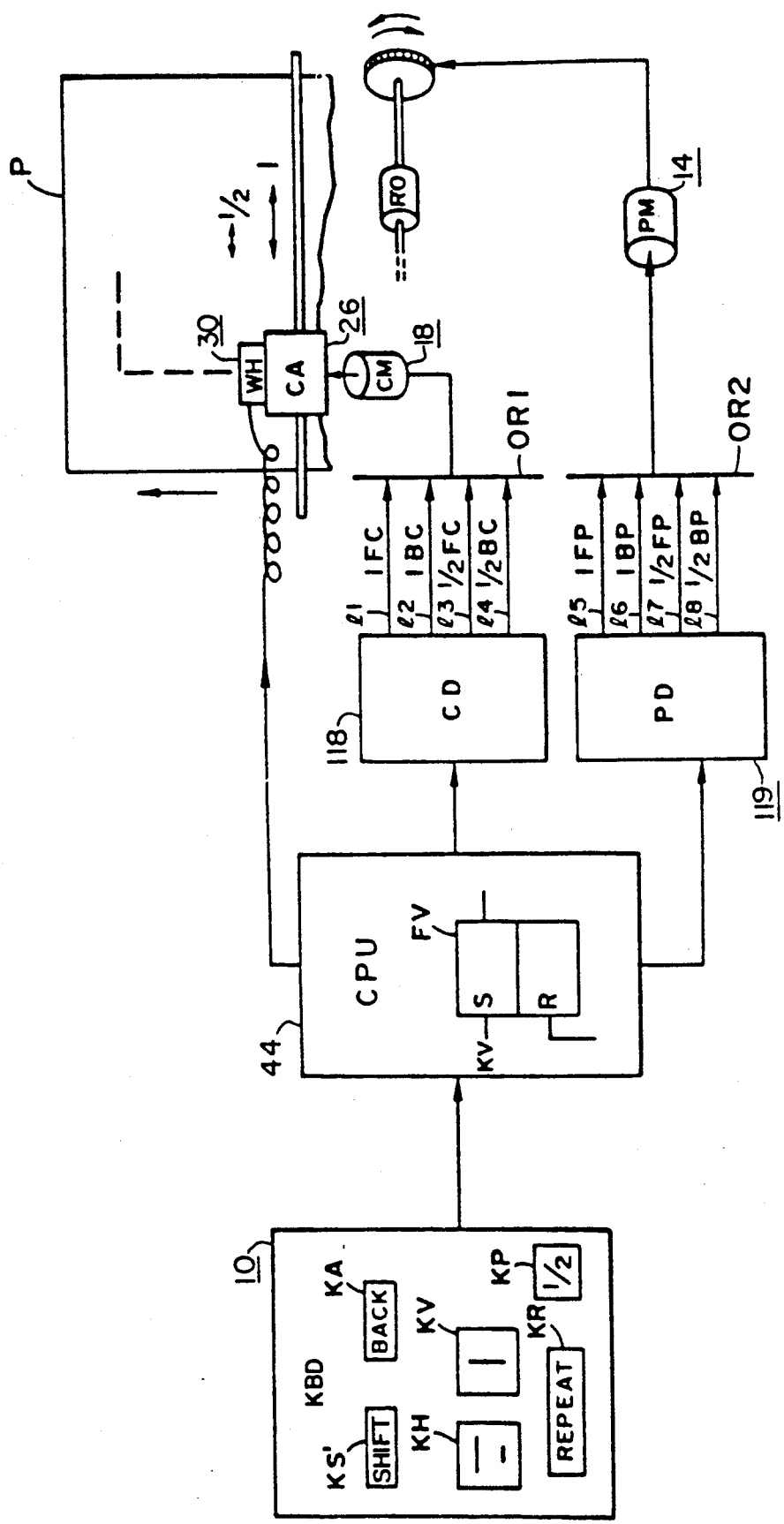
FIG. 43 is a block diagram showing a circuit for conducting said printing.

These drawbacks can also be prevented by the present embodiment shown in FIG. 43 in a block diagram, wherein letters are used to designate block representations of units which were designated by numerals in the more detailed Figures. In said block diagram, a keyboard KBD is provided with a vertical-line print key KV, a horizontal-line print key KH, a repeat print key KR, a line spacing key KP for changing the type spacing or line feeding to a half, a backspace key KA, a shift key KS for using said keys KP, KH, etc. for two purposes, in addition to other known character keys, numeral keys, control keys, etc. (not shown).

Also there are provided a central processing unit CPU, a control circuit CD for a carriage drive motor CM, a control circuit PD for a sheet feed motor PM, a carriage CA supporting the typefont wheel WH shown in FIG. 40, and a printing sheet P. In case of printing the vertical line as shown in FIGS. 41 and 42, the known control keys are actuated for displacing the carriage CA to the right or to the left. In response the CPU activates the drive circuit CD and releases a right-shift (forward) signal 1FC or a left-shift (backward) signal 1BC through a signal line 11 or 12 respectively to rotate the carriage drive motor CM in the forward or backward direction respectively through an OR gate OR1 thereby stepwise displacing the carriage CA to a desired position for example in the 1st column. Then in response to the actuation of the key KV, a flip-flop FV in the CPU is set and a vertical line "|" is printed for example at the 1st column in the 7th line on the printing sheet P.

Then in response to the actuation of the repeat key KR, the CPU releases a forward sheet feed signal 1FP through a line 15 of the control circuit PD to drive the sheet feeding motor PM through an OR gate OR2, thereby advancing the printing sheet P by one line through the rotation of the roller RO.

Then upon actuation of the repeat key KR the vertical line "|" is printed in the same column of the next line since the flip-flop FV is maintained in the set state. In this manner said vertical line is printed at the same column position in response to each actuation of the key KR. Also an excessive printing eventually made can be erased in the known manner with the correcting ribbon 33 through corresponding key operation.

In case of printing the horizontal line "—", in response to the actuations of the shift key KS and the key KH in this order, the CPU resets the flip-flop FV. However, the printing of a horizontal line with the carriage CA positioned at the 1st column as shown before will result in a form line as shown in the 1st column, 5th line in FIG. 41. In order to avoid such defective line printing, the key KP is actuated after the shift key KS is actuated. In response the CPU releases a half-space right-shift (forward) signal ½FC to the line 13 of the control circuit CD to displace the carriage CA to the right by ½ space. In this manner the carriage CA becomes positioned between the 1st and 2nd column, so that the horizontal line "—" obtained by the actuation of the key KH is positioned between the 1st and 2nd columns as shown in the 5th and 11th lines in FIG. 42. Also in case the carriage CA is originally positioned in another place, it can be brought to a position between the 1st and 2nd columns by actuating the known back space key KA for a desired number of times followed by the actuation of the key KP, whereby the left-shift (backward) signal 1BC and the half-space left-shift (backward) signal ½BC are supplied to the lines 12 and 14 respectively of the control circuit CD. Also as shown in the 7th and 9th columns in the 8th to 10th lines in FIG. 42, the vertical line "|" can be suitably shifted by a half space to the left or to the right by the keys KV, KP, and eventually KA to provide vertical lines for a matrix well balanced with the positions of the printing d1-d3, c1-c3, etc. The above-mentioned half-space process can further be applied to the sheet advancement to provide an easily legible printed form. For this purpose the control circuit PD for the sheet advancement is provided with signal lines 15 to 18 for selectively providing the one-line forward or backward advance signals 1FP and 1BP respectively and half-line forward or backward advance signals ½FP and ½BP respectively.

For example in response to the actuation of the key KP, the CPU provides the signal ½FP through the output line 17 of the control circuit PD to advance the printing sheet P by a half line. Also in response to the actuations of the shift key KS and key KP, the carriage CA is moved to the right by a half space through the output line 13 of the control circuit CD. By actuating character keys E, F, G, and H, these characters are printed in the middle positions of the columns and lines as shown in FIG. 42, maintaining suitable spaces from the form lines above and at left. Also by said half-line sheet feeding the horizontal line at the 9th column in the 9th line becomes suitably positioned with respect to the characters "D" and "1" in spite of the fact that the type for said horizontal line is positioned at the lower end of the type area as shown in FIG. 42.

Also the vertical line "|" can additionally be used for various purposes such as in indicating the date as shown at the 3rd and 6th columns in the 12th line in FIG. 42.

As explained in the foregoing, the present embodiment allows obtaining easily legible print formats by the use of vertical-line and horizontal-line type in combination with a half-space displacement of the carriage CA and a half-line displacement of the printing sheet P under suitable key control, and such print formats are more legible than those obtained by dot matrix printing.

FIGS. 44, 45, 46A, and 46B show an embodiment of the electronic device capable of increasing the print processing speed and providing more legible print forms.

For example in the conventional desk-top electronic calculator with a printer, an entered number is printed only when an operand key, such as "+", is actuated following the entry of numerals, and for this reason the printing of the entire number requires a certain time.

This drawback is prevented by the present embodiment in which the printing of the integer part of a number is initiated at the entry of the decimal point, with appropriate punctuation in said integer part. In this manner it is rendered possible to shorten the processing time as the integer part can be printed while the decimal fraction part of the number is entered by the numeral keys KN, to reduce errors in key entry as the numerals are printed with appropriate punctuation, and to avoid useless entries of the decimal fraction part in case an error is found in the entry of the integer part.

Figure 44:
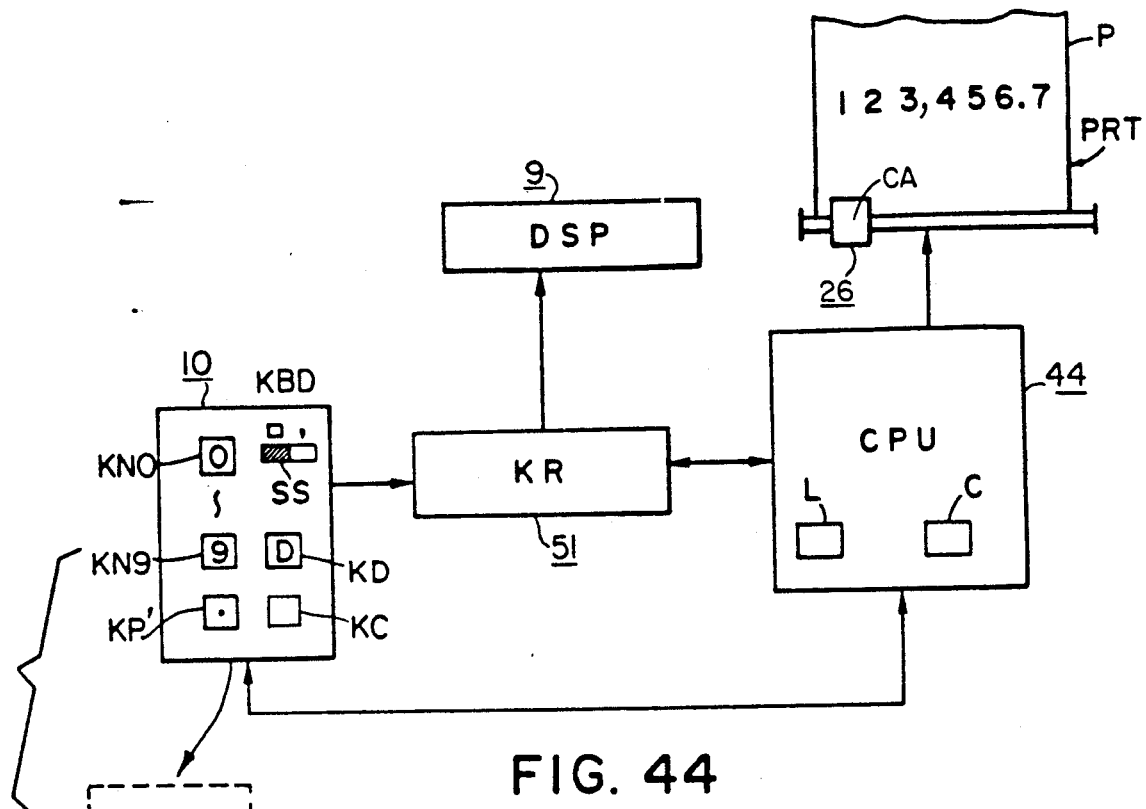
FIG. 44 is a block diagram showing an embodiment of the invention.
Figure 45:
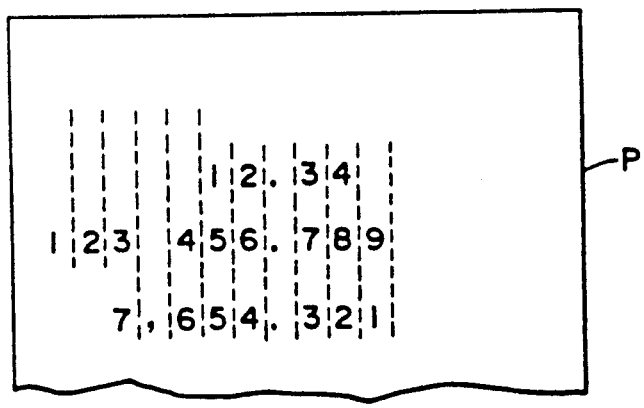
FIG. 45 is a schematic view showing the thus obtained print.

FIG. 44 shows the present embodiment in a block diagram, in which letters are used to designate block representations of units which were designated by numerals in the more detailed Figures. The block diagram shows a keyboard KBD which is provided with numeral keys KN0-KN9, a decimal point key KP', a slide switch SS for selecting punctuation by blank or by a particular symbol (,), a control key KD for numeral printing with a fixed decimal point position, and control keys KC (K+, K−, KX, K÷, K%, K=). Also there are shown a register KR for storing the key signals from the keyboard KBD, a number display unit DSP, a central processing unit CPU, and a printer PRT having a serial printing head H for printing from left to right on a printing sheet P. FIG. 45 shows an example of the printing, and FIGS. 46A and 46B illustrate the order of the display and printing.

By first manipulating for example a numeral key KN8 followed by the control key KD, the datum "8" is stored in a latch L in the CPU to fix the position of the decimal point at the 8th column from the left-hand end of the printing sheet P.

Now, upon actuation of the numeral key KN1, the numeral "1" is stored in the register KR and displayed on the display unit DSP, and then upon actuation of the numeral key KN2, the numeral "2" is also stored in the register KR and a number "12" is displayed on the display unit DSP as shown in FIG. 46A, part I. No printing is made at this stage.

Also a counter C in the CPU stores a number "2" indicating the number of numeral key actuations. Then, in response to the actuation of the decimal point key KP', the CPU subtracts "2" stored in the counter C from "8" stored in the latch L to obtain the difference "6", and displaces the printing head H to the 6th column from the left-hand end of the printing sheet P to print a numeral "1" at this position, then to print a numeral "2" to the right, and then to print the decimal point "." further to the right as shown in FIG. 46B, part I. During said printing the fraction part "34" can be entered by the numeral keys KN and is displayed on the display unit DSP as shown in FIG. 46A, part II. Upon subsequent actuation of a control key KC the printing head H is displaced in succession to the right to print the numerals "3" and "4" as shown in FIGS. 45 and 46B, part II. During said printing it is possible to enter the numerals for the printing in the next line. At this point the counter C is cleared but the content "8" of the latch L is retained. Upon completion of the printing "34" the printing sheet P is advanced by a line, and the printing head H is in a stand-by state for the printing of the next line. Then the numerals in "123456" are entered by the numeral keys KN1-KN6 and are displayed on the display unit DSP (FIG. 46A, part III) through the register KR as explained in the foregoing, and the counter C stores a number "6". Upon actuation of the decimal point key KP', the CPU senses the possibility of punctuation from the number "6" in the counter C, adds "1" to the counter C to obtain "7", and subtracts said number "7" from "8" stored in the latch L to obtain "1" in the foregoing manner, whereby the printing head H initiates the printing from the left-hand end of the printing sheet P. At the same time the CPU senses the state of the slide switch SS, which is set at the blank punctuation state in FIG. 44, to execute the printing with blank punctuations (FIG. 46B, part III). The entry and printing of the fraction part and the line feed operation are conducted as explained in the foregoing.

In case the slide switch SS is set at ",", the print is punctuated with the symbol "," as exemplified by "7,654.321" in FIGS. 45 and 46B, part VI.

As explained in the foregoing the present embodiment is advantageous in reducing the errors in operation as the integer part is immediately printed with appropriate punctuation in response to the actuation of the decimal point key KP', thus providing an easily legible print with a fixed decimal point position and increasing the processing speed. Thus the present embodiment has a wide range of applications, particularly including electronic typewriters.

Figures 1, 47:
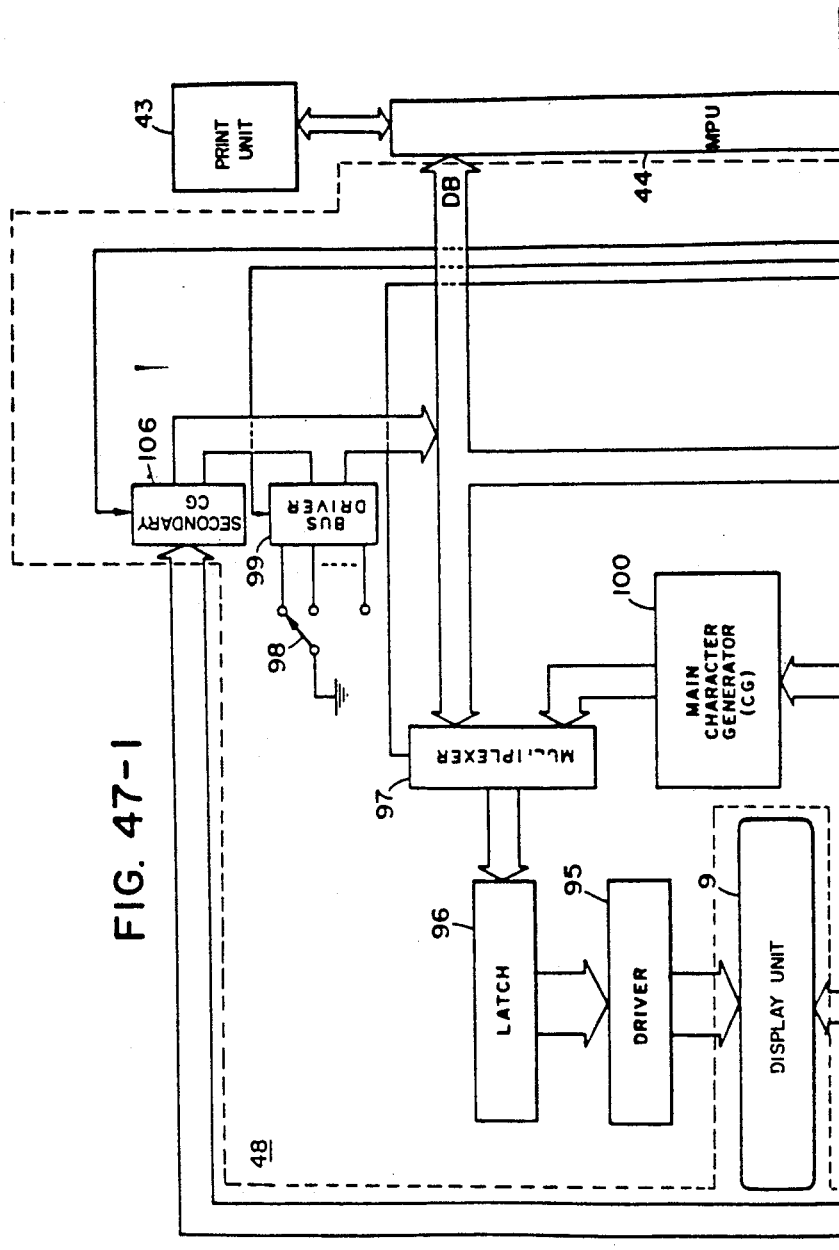
FIG. 47 shows the manner in which FIGS. 47-1 and 47-2 should be arranged.

FIG. 47 shows the manner in which FIGS. 47-1 and 47-2 should be arranged. FIGS. 47-1 and 47-2 show an embodiment of the electronic typewriter, particularly the electronic typewriter provided with a display unit 9 for displaying the characters to be printed and a character generator 100 for generating character information for display.

The use of character generators in the electronic typewriter is already known, but for displaying the characters used in various countries there have been required a character generator and a control circuit of a very large capacity. For this reason it has been a common practice to mount a character generator suitable for the country of destination, although this complicates the specifications of the typewriter and necessitates the operation of replacement work.

Thus, the present embodiment provides an electronic typewriter capable of displaying the characters of various countries without increasing the capacity of the memory.

Now reference is made to FIGS. 47-1 and 47-2 showing the basic structure of such an electronic typewriter, in which a keyboard 10 is provided with character keys 10a common to various countries and with character keys 10h exclusive to the country of destination. The entered key signals for printing are first displayed on a display unit 9.

There are provided an oscillator 90 for generating a basic frequency for dynamic drive of the display unit 9; a counter 91 of a capacity of the number of digits of the display unit 9; a decoder 92 for generating a digit signal corresponding to the count of said counter 91; a digit driver 93; and a multiplexer 102 for supplying the count of the counter 91 or a signal supplied from the MPU 44 through an address bus AB to a display buffer 101 as an address signal thereto. Said display buffer 101 is capable of storing the character signals entered from the keyboard 10 at least for the capacity of the display unit 9, for example 20 characters. By designating the display buffer 101 from the address decoder 105, the multiplexer 102 provides the signal of the address bus AB to the display buffer 101 as the address signal therefor, and the character signal in the display buffer 101 is made changeable by the signal from the data bus DB. A main character generator (CG) 100 for common characters converts the character signals from the display buffer 101 into character font represented in dot matrix form. A secondary character generator 106 stores the typefonts for particular countries and has a capacity corresponding to the countries of destination. A multiplexer 97 provides the character font from the main character generator 100 or from the data bus DB to the latch 96. A driver 95 drives the display unit 9 in response to the signal from said latch 96. A manual switch 98 composed for example of selectable diodes in a matrix array is utilized for selecting a country in the secondary character generator 106. A bus driver 99 transmits the information of the switch 98 to the MPU 44. In case of displaying the common characters 10a, the digit signal indicated by the count of the counter 91 is supplied to the display unit 9 through the decoder 92 and the digit driver 93, and the corresponding character signal is read from the display buffer 101 addressed by the count of said counter 91 through the multiplexer 102. Said character signal is converted into a character pattern by the main character generator (CG) 100, then latched in the latch 96 through the multiplexer 97 and supplied to the display unit 9 through the driver 95 for display in cooperation with the digit signal corresponding to the content of the counter 91. A dynamic display is achieved by repeating the above-mentioned procedure with the frequency of the oscillator 90. There are also provided a memory 103 for storing the reference character signal and a comparator 104.

Since certain vowels, currency marks, etc. are different from country to country, the character generator 100 needs to have an enormous capacity if all these characters are to be incorporated therein, and the character generator 100 itself needs to be remade if a country of destination is added. However, in the present embodiment the character generator 100 only contains the characters, numerals, and symbols common to all the countries, and the memory 103 and comparator 104 inspect for characters not contained in the character generator 100, and, upon detection of such a character, set a flip-flop 107 to supply an interruption signal INT to the MPU 44. The MPU 44, already identifying the country of designation by the state of the switch 98 through the bus driver 99, discriminates the character signal for which the interruption signal INT is given. Based on said character signal the MPU 44 generates the address signal for the secondary character generator 106 and supplies the character signal therefrom through the data bus DB and multiplexer 97 to the latch 96. In this manner the adjustment for the change of country of destination can be simply accomplished by appropriately positioning the switch 98 in the secondary character generator 106.

Let us assume now that the main character generator 100 stores a common character font composed of A, B, C, D, E, and F each composed of 5×12 dots, and that the following codes are allotted for the characters in the display buffer 101:

A: 000
B: 001
C: 010
D: 011
E: 100
F: 101

Also it is assumed that the following codes are allotted for the currency marks of specified countries:

: 110
$: 111

In this case a reference signal "101" is stored in the memory 103, and the comparator 104 is so structured as to set the flip-flop 107 for initiating the interruption procedure upon receipt of a signal larger than said signal "101".

The secondary character generator 106 stores the character font corresponding to the currency marks and $.

The keyboard 10 shown in FIG. 47-2 is designed for Japan and is provided with common keys 10a and exclusive key 10h, a Yen currency key " ", and the switch 98 is set for Japan.

In response to the actuation of the " " key 10h, the MPU 44, being already aware that the switch 98 is set for Japan, stores a code "110" in the display buffer 101, and the comparator 104 compares said code with the reference signal "101" stored in the memory 103 and, the latter being smaller, sets the flip-flop 107 thereby sending an interruption signal INT to the MPU 44 indicating a character other than those stored in the main character generator 100. Simultaneously receiving the code =110 through the data bus DB, the MPU 44 generates an address signal for calling the character in the secondary character generator 106 through the address bus AB and supplies said character into the multiplexer 97 through the bus driver 99 to display the character on the display unit 9.

Figures 2, 47, 48:
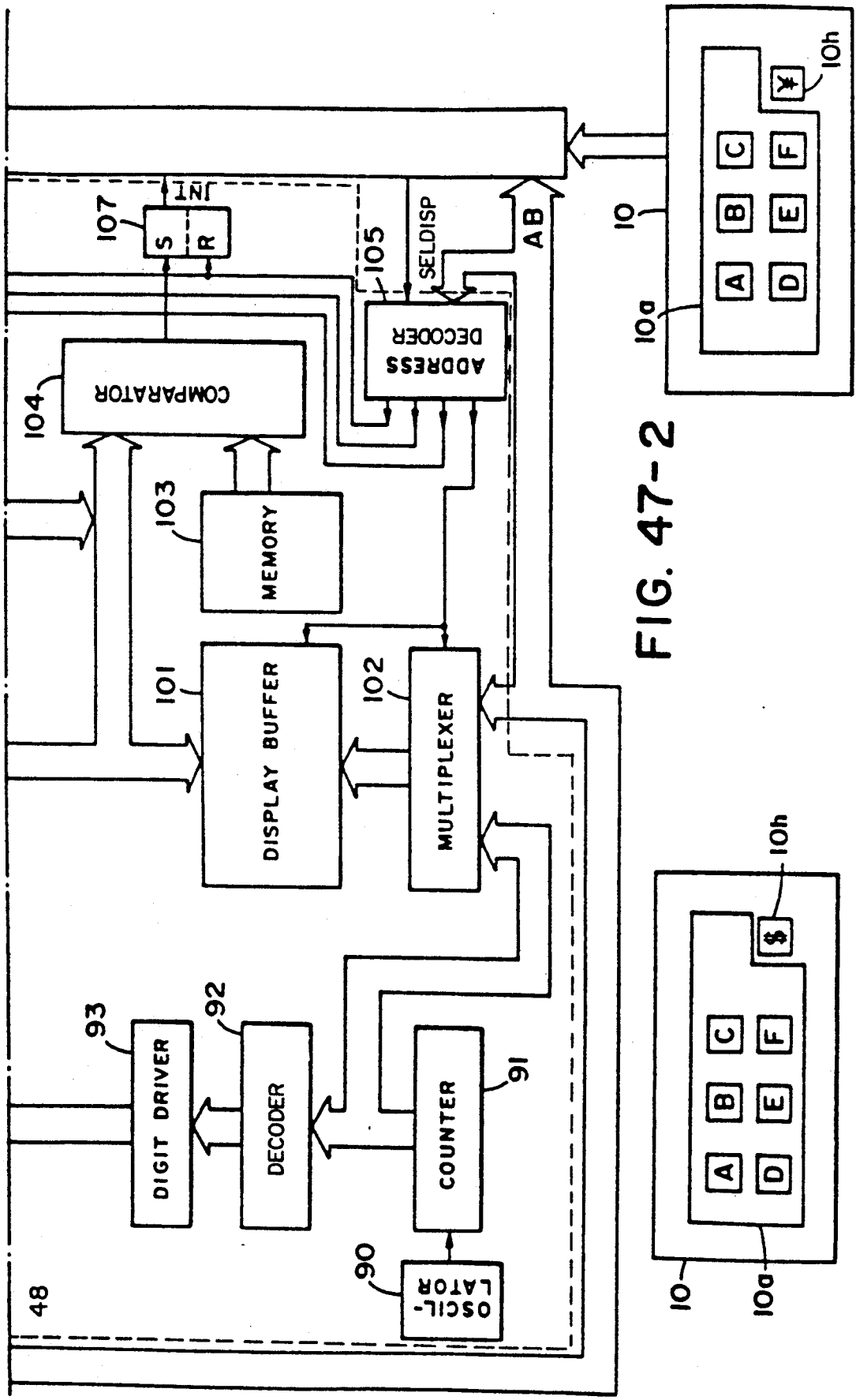
FIG. 48 is a view showing another embodiment of the keyboard.

On the other hand the switch 98 is set to the United States when the keyboard 10 for the United States shown in FIG. 48 is mounted. In this manner the MPU 44 knows that the apparatus is adjusted for the United States and, in response to the actuation of the exclusive "$" key 10h, generates a code "111" for storage in the display buffer 101. The comparator 104, similarly identifying that the reference code "101" is smaller, releases the interruption signal INT in the same manner as explained in the foregoing. In this case the MPU 44 receives the code "111" through the data bus DB and thus addresses the character $ in the secondary character generator 106.

As explained in the foregoing the present embodiment employs a main character generator storing common characters and symbols and a secondary character generator storing characters and symbols changing from country to country, and performs the display usually with the main character generator but with the secondary character generator only when the desired character is not present in the main character generator. Consequently the adjustment for each country can simply be achieved by appropriate positioning of the switch.

We claim:

1. Printing apparatus comprising:
   means for printing indicia mounted for lateral shifting movement;
   means for selecting one of different print pitches and generating a signal representative of the selected print pitch;
   means responsive to the signal representative of the selected print pitch for controlling said printing means so that the printed indicia have the selected printed pitch; and
   indicating means mounted on said printing means for lateral shifting movement therewith, said indicating means including a plurality of indication elements that are respectively disposed at different positions in the direction perpendicular to the direction of lateral shifting movement of said printing means but are disposed at the same position in the direction of lateral shifting movement of said printing means.

2. Printing apparatus according to claim 1, further comprising means for storing the print pitch information generated by said print pitch selecting means.

3. Printing apparatus according to claim 1, wherein said indicating means includes display means mounted on said printing means.

4. Printing apparatus according to claim 1, further comprising a member provided with a plurality of scales extending laterally, the scales being respectively arranged to correspond in position to said plurality of indication means.

5. Printing apparatus according to claim 1, wherein said pitch selection means is a latchless key.

6. Electronic apparatus for drawing up documents, comprising:
   means for printing indicia mounted for shifting movement;
   position indicating means mounted on said printing means for indicating a print position;
   means for entering indicia and print pitch information;
   means comprising a first area for storing the indicia information and a second area for storing the print pitch information;
   processing means for discriminating between the indicia information entered by said entering means and the print pitch information entered by said entering means to store the indicia information in the first area of said storing means and the print pitch information in the second area of said storing means; and
   control means for controlling the amount of shifting movement of said printing means according to the print pitch information stored in said second area of said storing means, and for controlling the selection and printing of indicia by said printing means according to indicia information stored in said first area of said storing means.

7. Electronic apparatus according to claim 6, wherein said position indication means indicates the print pitch information in accordance with which control is exercised by said control means.

8. Electronic apparatus according to claim 6, wherein said position indicating means comprises a plurality of indicating elements respectively arranged at vertically different positions.

9. Electronic apparatus according to claim 6, wherein said first and second areas constitute a buffer for storing a predetermined amount of said entered indicia and pitch information.

10. Electronic apparatus according to claim 9, wherein said indicia and pitch information is entered into the buffer in a FIFO mode so that an amount greater than the predetermined amount is discarded from the buffer.

11. Electronic apparatus according to claim 6, wherein said entering means is a latchless key.

12. Electronic apparatus according to claim 6, wherein said first and second areas constitute a sentence memory RAM for storing said entered indicia and pitch information.

13. Electronic apparatus according to claim 6, further comprising a member provided with a plurality of scales, the scales being arranged in position to be associated with said position indicating means.

14. Electronic apparatus according to claim 6, further comprising means for generating information to indicate the indicia information stored in said storing means that has not yet been printed.

15. Electronic apparatus for drawing up documents comprising:
    means for entering indicia and print pitch information;
    storing means having a first area for storing entered indicia information, a second area for storing entered print pitch information associated with the indicia information stored in said first area and a third area for storing the print pitch information associated with a registered indicia information; and
    processing means for printing the indicia information according to the print pitch information stored in said second area, and for controlling the printing of the registered indicia information according to the print pitch information stored in said third area.

16. Electronic apparatus according to claim 15, further comprising means for displaying a print pitch corresponding to the print pitch information stored in the second area of said storing means.

17. Electronic apparatus according to claim 15, further comprising a latchless key for inputting said print pitch information.

18. Electronic apparatus according to claim 17, further comprising display means arranged in the vicinity of said key to display the pitch information input by said key.

19. Electronic apparatus according to claim 15, further comprising print means provided with a plurality of display units, wherein during the print operation said processing means controls one of said plurality of display units in accordance with the input print pitch information stored in said first area.

20. Electronic apparatus according to claim 19, further comprising a member having a plurality of scales with different pitches arranged to correspond in position to said plurality of display units.

21. Electronic apparatus according to claim 15, wherein said first and second areas constitute a buffer for storing a predetermined amount of said entered indicia information and print pitch information.

22. Electronic apparatus according to claim 21, wherein said indicia information and the print pitch information are entered into said buffer in a FIFO mode so that an amount greater than the predetermined amount is discarded from said buffer.

23. Electronic apparatus according to claim 15, further comprising means for printing indicia, mounted for shifting movement on said apparatus.

24. Electronic apparatus according to claim 23, further comprising position indicating means mounted on said printing means for indicating a print position.

25. Electronic apparatus according to claim 24, further comprising a member provided with a plurality of scales, the scales being arranged in position to be associated with said position indicating means.

26. Electronic apparatus according to claim 15, further comprising means for generating information to indicate the indicia stored in said storing means that has not yet been printed.

27. Electronic apparatus according to claim 15, wherein said third area and said second area respectively comprises distinct memory members.

28. Electronic apparatus according to claim 15, further comprising means for indicating the registration of indicia information and print pitch information stored in said storing means.

29. Electronic apparatus according to claim 28, wherein said registration indicating means comprises an index to read out the registered indicia information.

30. Electronic apparatus according to claim 29, further comprising means for reading out the entered indicia information stored in said third area and means for indicating whether the registered indicia information read out by said reading means is output with the index.

31. Electronic apparatus according to claim 30 further comprising position indicating means mounted on said printing means for indicating a print position.

32. Printing apparatus for printing indicia in any one of a plurality of print pitches, comprising:
a platen;
a carriage shiftable in a lateral direction relative to said platen;
a print unit mounted on said carriage;
a printing apparatus cover provided with a plurality of different pitch scales which are disposed in parallel in a direction perpendicular to said lateral direction;
a plurality of light indicators mounted on said carriage at the same position in the lateral direction but at the different positions in the direction perpendicular to the lateral direction, said light indicators respectively indicating the position of said carriage relative to said pitch scales; and
control means for energizing a selected one of said plurality of light indicators provided on said carriage.

33. Printing apparatus according to claim 32, wherein the selected one of said plurality of light indicators corresponds to one of said plurality of pitch scales.

34. Printing apparatus according to claim 32, further comprising input means for selectively inputting one of a plurality of different pitches.

35. Printing apparatus according to claim 34, wherein said input means is a latchless key.

36. Printing apparatus according to claim 34, further comprising display means arranged in the vicinity of said input means to display the pitch information input by said input means.

37. Printing apparatus for printing data indicia in any one of a plurality of print pitches, comprising:
a platen;
a carriage shiftable in a lateral direction relative to said platen;
a print unit mounted on said carriage;
key means for selecting one of the plurality of printing pitches and for generating a pitch signal indicating the selected printing pitch;
memory means for storing a pitch code representative of the selected printing pitch in response to the pitch signal;
scale indication means having a plurality of different pitch scales which are disposed in parallel with a direction perpendicular to the lateral direction;
a plurality of light indicators mounted on said carriage at the same position in the lateral direction but at different positions in the direction perpendicular to the lateral direction, said light indicators respectively indicating the position of said carriage relative to said pitch scales;
first control means responsive to the pitch code selected by said key means and stored in said memory means for energizing a selected one of said plurality of light indicators provided on said carriage; and
second control means responsive to the pitch code selected by said key means and stored in said memory means for controlling the shift of said carriage.

38. Printing apparatus according to claim 37, wherein said key means is a type of latchless key which transiently generates a pitch signal.

39. Printing apparatus according to claim 37, further comprising a plurality of display elements in the vicinity of said key means, said display elements indicating the selected printing pitch.

40. Printing apparatus according to claim 37, wherein a single common control processor unit serves as both said first and second control means.

41. Printing apparatus according to claim 37, further comprising indicia key means for inputting information of indicia to be printed, wherein said memory means stores the indicia input by said indicia key means and the pitch signal input by said key means for selecting one of the plurality of printing pitches and for generating a pitch signal indicating the selected printing pitch.

42. Printing apparatus according to claim 41, wherein said memory means is a buffer of a predetermined storage capacity with a FIFO storing mode.

43. Printing apparatus according to claim 41, wherein said indicia key means and said key means for selecting one of the plurality of printing pitches and for generating a pitch signal indicating the selected printing pitch are constituted in the same key-matrix, and a key-on information is electrically latched by a memory cell corresponding to a depressed key detected through key scanning.

44. Printing apparatus according to claim 43, wherein said memory means is a buffer with a predetermined storage capacity in a FIFO mode.

45. Printing apparatus for printing data indicia in any one of a plurality of print pitches, comprising:
- a platen;
- a carriage shiftable in a lateral direction relative to said platen;
- a print unit mounted on said carriage;
- latchless key means for selecting one of the plurality of printing pitches and for generating a pitch signal indicating the selected printing pitch;
- memory means for storing a pitch information representative of the selected printing pitch in response to the pitch signal;
- scale indication means having a plurality of different pitch scales which are disposed in parallel with a direction perpendicular to the lateral direction;
- drive means operable in response to said pitch information for driving said carriage in the lateral shift direction;
- display means disposed in the vicinity of said latchless key means for displaying the printing pitch selected by said latchless key means;
- position indication means mounted on said carriage for indicating, at a face opposite to said scale indication means, the position of said carriage which shifts in accordance with the selected printing pitch; and
- controlling means for controlling said display means to display the pitch in accordance with the pitch information which is selected by said latchless key means and stored in said memory means and further for controlling said carriage shift in accordance with the pitch information so that the carriage shift position is indicated by said scale indication means and said position indication means.

46. Printing apparatus according to claim 45, wherein said latchless key means transiently generates a pitch signal.

47. Printing apparatus according to claim 45, wherein said position indication means comprises a plurality of indicating elements arranged in a line vertical to the carriage shift direction.

48. Printing apparatus according to claim 47, wherein said controlling means selectively drives one of said plurality of indicating elements according to said pitch information.

49. Printing apparatus according to claim 45, wherein said scale indication means is placed on an apparatus cover.

50. Printing apparatus according to claim 45, further comprising indicia key means for inputting an indicia to be printed, wherein said memory means stores the indicia input by said indicia key means and the pitch input by said latchless key means.

51. Printing apparatus according to claim 50, wherein said indicia key means and said latchless key means are constituted in the same key matrix, and a key-on information is electrically latched by a memory cell corresponding to a depressed key deleted through key scanning.

52. Printing apparatus according to claim 45, wherein said controlling means comprises a control unit for controlling the input processing of the pitch information from said latchless key means and the pitch indication by said display means and a printer side control unit for controlling the shift of said carriage according to said pitch information.

53. Electronic apparatus for drawing up documents comprising:
- means for indicating registration of information;
- means for entering indicia and print pitch information;
- storing means comprising a first area for storing entered indicia information, a second area for storing entered print pitch information, and a third area for storing registration information according to an indication by said indicating means; and
- store control means for, in response to the registration indication, storing the indicia information stored in said first area, and the pitch information stored in said second area, as registration information in said third area.

54. Electronic apparatus according to claim 53, further comprising means for printing indicia, mounted for shifting movement on said apparatus.

55. Electronic apparatus according to claim 54, further comprising position indicating means mounted on said indicia printing means for indicating a print position and a member provided with a plurality of scales, the scales being arranged in position to be associated with said position indicating means.

56. Electronic apparatus according to claim 53, further comprising means for generating information to indicate the indicia stored in said storing means that has not yet been printed.

57. Electronic apparatus according to claim 53, wherein said third area and said second area respectively comprises distinct memory members.

58. Electronic apparatus according to claim 53, wherein said registration indicating means comprises an index to read out registered indicia information stored in said third area.

59. Electronic apparatus according to claim 58, further comprising means for reading out the registered indicia information stored in said third area and means for indicating whether the registered indicia information read out by said reading means is output with the index.

* * * * *

UNITED STATES PATENT AND TRADEMARK OFFICE
CERTIFICATE OF CORRECTION

PATENT NO. : 5,037,223
DATED : August 6, 1991
INVENTOR(S) : HIROYUKI UEDA, ET AL.

It is certified that error appears in the above-identified patent and that said Letters Patent is hereby corrected as shown below:

Title page, item,

[56] "vol.24, " should read -- Cronch et al., vol. 24, --.

COLUMN 1

Line 34, "FIGURES" should read -- DRAWINGS --.

COLUMN 9

Line 33, "type ","," should read -- type "," --.

COLUMN 13

Line 29, "counter 149" should read -- counter 144 --.

COLUMN 15

Line 13, "also" should read -- are also --.

COLUMN 17

Line 43, " "" " should read -- "¶" --.

COLUMN 18

Line 5, " "XX" " should read -- "XX" --.
    Line 7, " "Y " should read -- "YY" --.
  Line 8, " Y" " (1st occurrence) should be deleted.
    Line 33, "printing; for" should read -- printing; for --.

UNITED STATES PATENT AND TRADEMARK OFFICE
CERTIFICATE OF CORRECTION

PATENT NO. : 5,037,223
DATED : August 6, 1991
INVENTOR(S) : HIROYUKI UEDA, ET AL.

It is certified that error appears in the above-identified patent and that said Letters Patent is hereby corrected as shown below:

COLUMN 21

Line 67, "The key," should read -- The * key, --.

COLUMN 23

Line 36, "the key" should read -- the * key --.
    Line 64, "the    " should read -- the * --.
    Line 67, "the key" should read -- the * key --.

COLUMN 24

Line 65, "he" should read -- the --.

COLUMN 25

Line 10, "the key," should read -- the * key, --.
    Line 23, "the key," should read -- the * key, --.
    Line 38, "the key" should read -- the * key --.
    Line 45, "the key" should read -- the * key --.
    Line 61, "the key" should read -- the * key --.

COLUMN 26

Line 19, "the key" should read -- the * key --.
    Line 32, "the key" should read -- the * key --.

UNITED STATES PATENT AND TRADEMARK OFFICE
CERTIFICATE OF CORRECTION

PATENT NO. : 5,037,223
DATED : August 6, 1991
INVENTOR(S) : HIROYUKI UEDA, ET AL.

It is certified that error appears in the above-identified patent and that said Letters Patent is hereby corrected as shown below:

COLUMN 27

Line 9, "the key" should read -- the * key --.
Line 22, "the    " should read -- the * --.
Line 35, "the key." should read -- the * key. --.
Line 38, "the key." should read -- the * key. --.
Line 66, "the    " should read -- the * --.

COLUMN 28

Line 38, "the key" should read -- the * key. --.
Line 45, "the key" should read -- the * key. --.

COLUMN 29

Line 19, "the    " should read -- the * --.
Line 25, "is" should read -- are --.
"the    " should read -- the * --.
Line 36, "the key" should read -- the * key --.

COLUMN 38

Line 40, "  :110" should read -- ¥:100 --.
Line 48, "marks  " should read -- marks ¥ --.
Line 52, "  "  "  " should read -- "¥", --.
Line 54, "  "  "  " should read -- "¥" --.
Line 63, "   =110" should read -- ¥=110 --.
Line 64, "character   " should read -- character ¥ --.
Line 66, "character   " should read -- character ¥ --.
Line 68, "character   " should read -- character ¥ --.

UNITED STATES PATENT AND TRADEMARK OFFICE
CERTIFICATE OF CORRECTION

PATENT NO. : 5,037,223
DATED : August 6, 1991
INVENTOR(S) : HIROYUKI UEDA, ET AL.

It is certified that error appears in the above-identified patent and that said Letters Patent is hereby corrected as shown below:

COLUMN 41

Line 40, "comprises" should read -- comprise --.

COLUMN 44

Line 49, "comprises" should read -- comprise --.

Signed and Sealed this

Thirteenth Day of July, 1993

Attest:

MICHAEL K. KIRK

Attesting Officer

Acting Commissioner of Patents and Trademarks